(12) United States Patent
Fong et al.

(10) Patent No.: US 9,752,513 B2
(45) Date of Patent: Sep. 5, 2017

(54) VALVE

(71) Applicant: LightSail Energy, Inc., Berkeley, CA (US)

(72) Inventors: Danielle A. Fong, Oakland, CA (US); Stephen E. Crane, Santa Rosa, CA (US); Edwin P. Berlin, Jr., Oakland, CA (US)

(73) Assignee: LightSail Energy, Inc., Berkeley, CA (US)

( * ) Notice: Subject to any disclaimer, the term of this patent is extended or adjusted under 35 U.S.C. 154(b) by 780 days.

(21) Appl. No.: 14/071,499

(22) Filed: Nov. 4, 2013

(65) Prior Publication Data

US 2014/0060467 A1   Mar. 6, 2014

Related U.S. Application Data

(63) Continuation of application No. 13/617,451, filed on Sep. 14, 2012, now Pat. No. 8,601,992, which is a continuation of application No. 13/552,580, filed on Jul. 18, 2012, now Pat. No. 8,613,267.

(60) Provisional application No. 61/509,511, filed on Jul. 19, 2011, provisional application No. 61/529,543, filed on Aug. 31, 2011.

(51) Int. Cl.
*G06F 19/00* (2011.01)
*F02D 13/02* (2006.01)
*F16K 3/08* (2006.01)
*F16K 11/10* (2006.01)

(52) U.S. Cl.
CPC .............. *F02D 13/02* (2013.01); *F16K 3/085* (2013.01); *F16K 11/10* (2013.01); *Y10T 137/87096* (2015.04)

(58) Field of Classification Search
CPC .................................. F01L 15/14; F01L 1/28
USPC ................. 123/190.11, 90.16, 90.15, 90.28; 701/101
See application file for complete search history.

(56) References Cited

U.S. PATENT DOCUMENTS

| | | | | |
|---|---|---|---|---|
| 3,898,962 A | * | 8/1975 | Honig | F02D 41/1482 123/486 |
| 5,103,792 A | * | 4/1992 | Winkler | F02D 41/2403 123/494 |
| 7,603,858 B2 | * | 10/2009 | Bennett | F01L 1/46 60/517 |
| 8,191,360 B2 | * | 6/2012 | Fong | F01K 25/06 60/370 |
| 9,267,462 B1 | * | 2/2016 | Alsudairawi | F01K 27/005 |

(Continued)

*Primary Examiner* — Marguerite McMahon
*Assistant Examiner* — James Kim

(57) ABSTRACT

Embodiments relate to valves comprising a member such as a plate or poppet, that is moveable relative to a stationary seat. The state of the member may be maintained against opposing forces with relatively little expenditure of energy. According to one embodiment, a poppet displaced from seating in the valve seat, may be held in position against opposing forces tending to close the valve, until a desired flow of gas through the valve has taken place. The poppet may then be released as desired, such that those opposing forces serve to passively close the valve. The valve may be secured in position utilizing mechanical, magnetic, electromagnetic, pneumatic, electrostatic, or hydraulic approaches. Valve embodiments may be particularly suited to controlling gas flows for compression and/or expansion in an energy storage system.

18 Claims, 41 Drawing Sheets

(56) References Cited

U.S. PATENT DOCUMENTS

| | | | |
|---|---|---|---|
| 2004/0089254 A1* | 5/2004 | Pomerlau | F01L 1/08 123/90.6 |
| 2007/0175218 A1* | 8/2007 | Harrison | F01K 7/36 60/670 |
| 2010/0051003 A1* | 3/2010 | Negre | B60K 6/12 123/70 R |
| 2014/0261288 A1* | 9/2014 | Coney | F02G 3/00 123/197.1 |

* cited by examiner

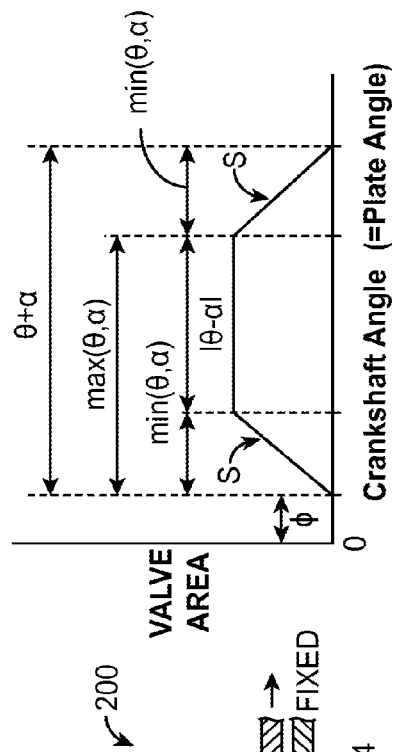
FIG. 2A
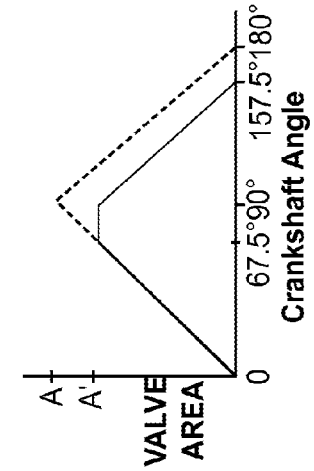
FIG. 2B
FIG. 2C
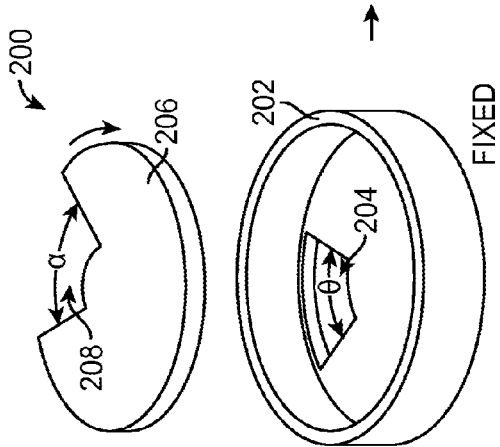
FIG. 2DA
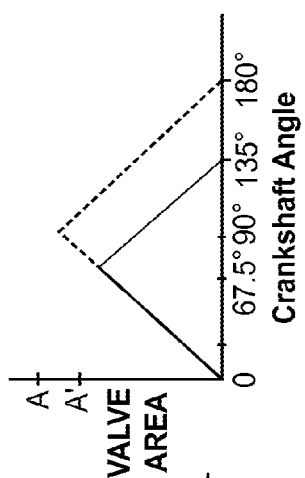
FIG. 2DB
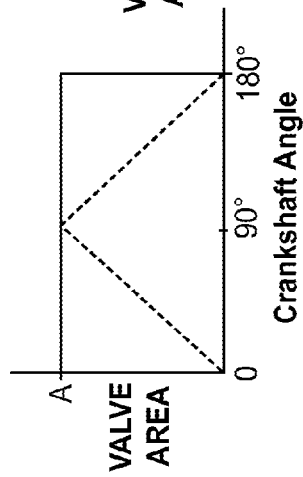
FIG. 2DC

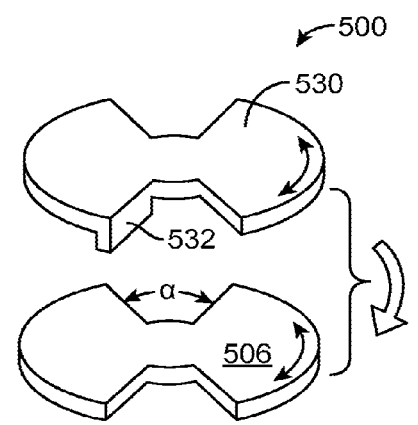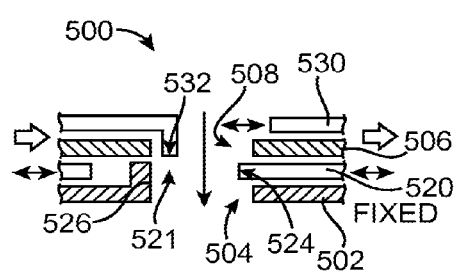
FIG. 5B
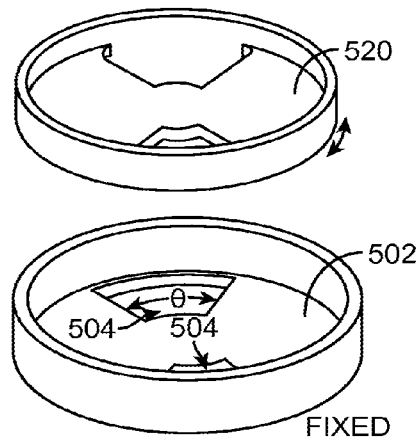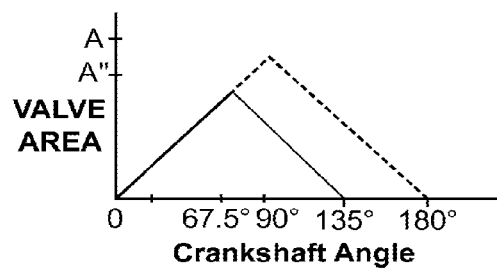
FIG. 5A
FIG. 5C

- Combinations of Configurations are Possible
- (Parenthesis) indicate optional functionality or optional presence of element

| Configuration | ID | 1 | 2 | 3 | 4 |
|---|---|---|---|---|---|
| | Description | Energy Storage | Energy Delivery | Heat Engine | Heat Engine |
| | Storage | to storage | from storage | No storage | No storage |
| | Gas Flow | Open System; Fig. 9BA; upward to storage | Open System; Fig. 9BB; downward from storage | Closed Circuit; Fig. 9BC; counter-clock-wise/clockwise | Open System; Fig. 9BD; Left→Right/ Right→Left |
| Cylinder No. | 14502 | Compressor | Expander | Compressor/ Expander | Compressor/ expander |
| | 14504 | Compressor | Expander | Expander/ Compressor | Expander/ compressor |
| Valve No. Connection: Port a - port _ | 14506 | b | c | d | b |
| | 14508 | c | b | d | d |
| | 14510 | b | c | d | d |
| | 14512 | c | b | d | b |
| Counterflow Heat Exchanger 14538 | Side 1 | N/A | N/A | Cold/Hot | N/A |
| | Side 2 | | | Hot/Cold | |
| Gas-Gas Heat Exchanger | 14514 | -- | -- | -- | -- |
| | 14516 | (act as heater) | (act as cooler) | (act as heater/ act as cooler) | (act as heater/ act as cooler) |
| | 14518 | -- | -- | -- | -- |
| | 14520 | (act as heater) | (act as cooler) | (act as cooler/ act as heater) | (act as cooler/ act as heater) |
| Liquid-Gas Heat Exchanger | 14522 | (act as heater) | (act as cooler) | (act as heater/ act as cooler) | (act as heater/ act as cooler) |
| | 14524 | (act as heater) | (act as cooler) | (act as cooler/ act as heater) | (act as cooler/ act as heater) |
| External Thermal Node | 14526 | (Heat Sink) | (Heat Source) | (Heat Sink/ Heat Source) | (Heat Sink/ Heat Source) |
| | 14528 | (Heat Sink) | (Heat Source) | Heat Sink/ Heat Source | Heat Sink/ Heat Source |
| | 14530 | (Heat Sink) | (Heat Source) | Heat Sink/ Heat Source | (Heat Sink/ Heat Source) |
| | 14532 | (Heat Sink) | (Heat Source) | (Heat Source/ Heat Sink) | (Heat Source/ Heat Sink) |
| | 14534 | (Heat Sink) | (Heat Source) | (Heat Source/ Heat Sink) | (Heat Source/ Heat Sink) |
| | 14536 | (Heat Sink) | (Heat Source) | (Heat Source/ Heat Sink) | (Heat Source/ Heat Sink) |
| | 14540 | N/A | N/A | Heat Sink or Heat Source | Heat Sink or Heat Source |

FIG. 9A

Heat engine + Compressor (storage)

Heat engine + expander (energy delivery)

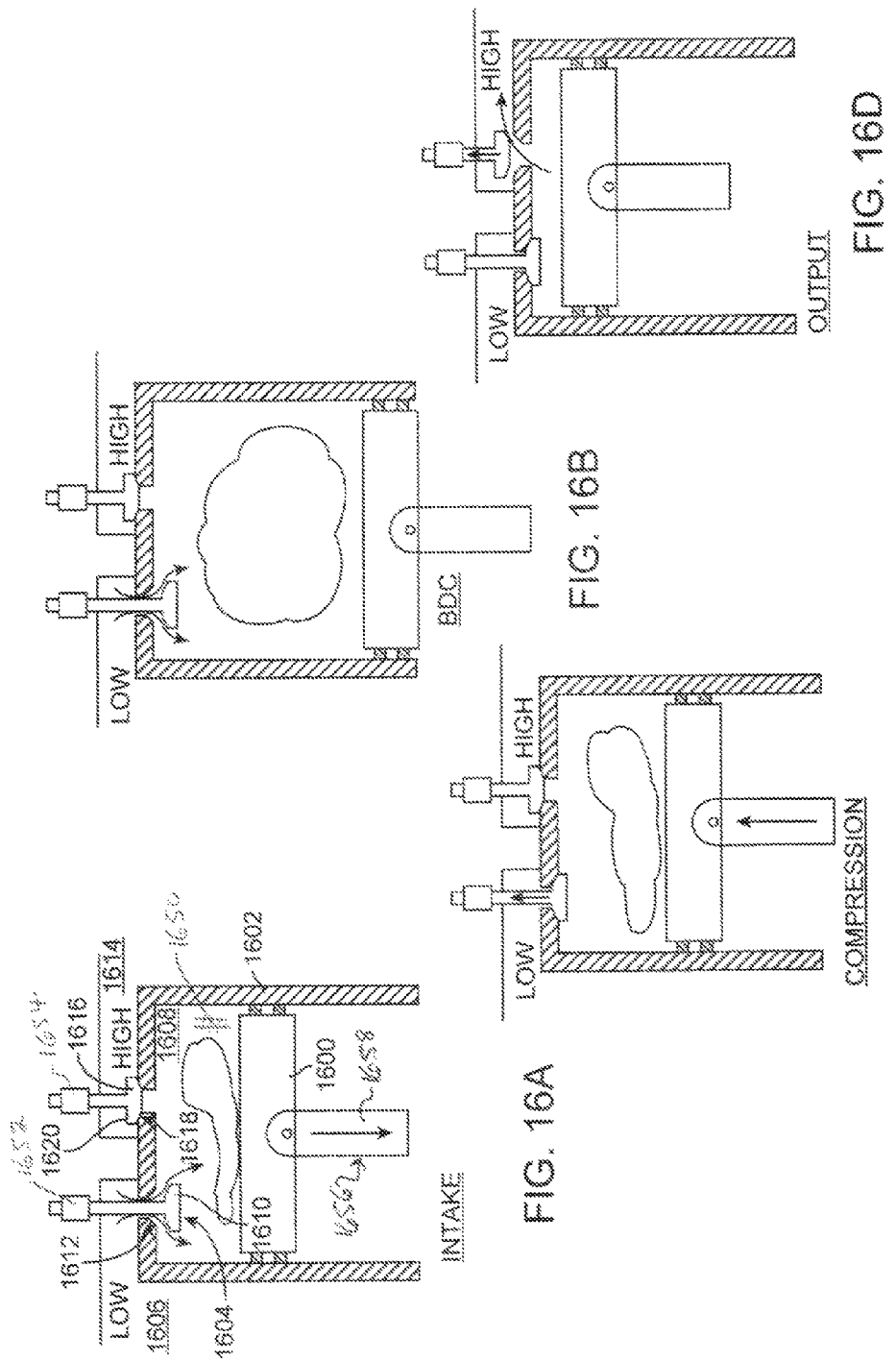

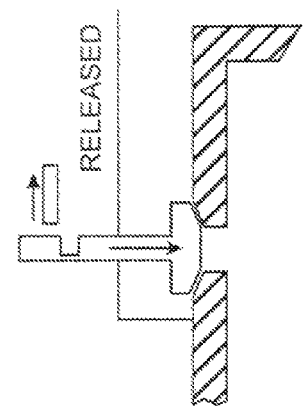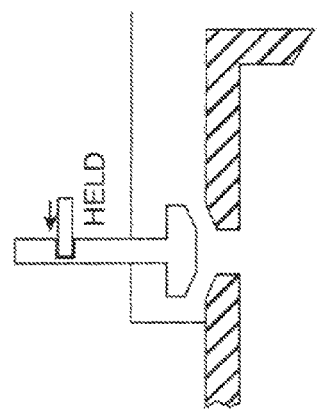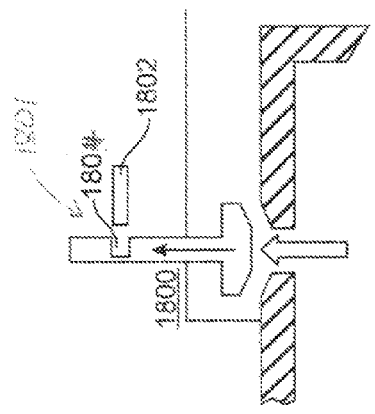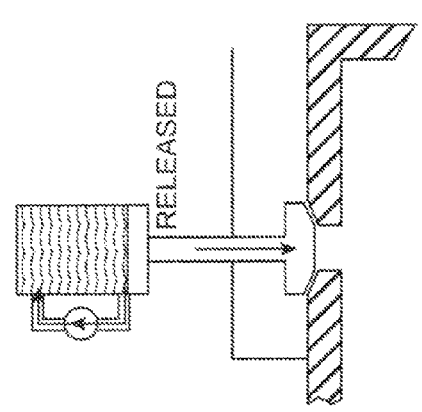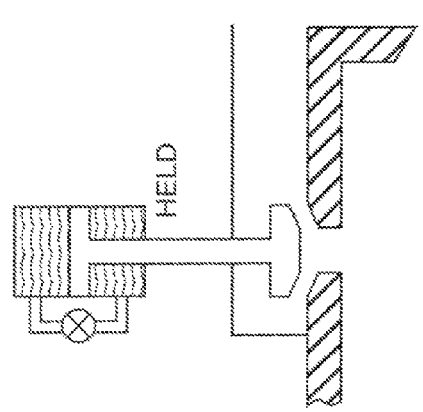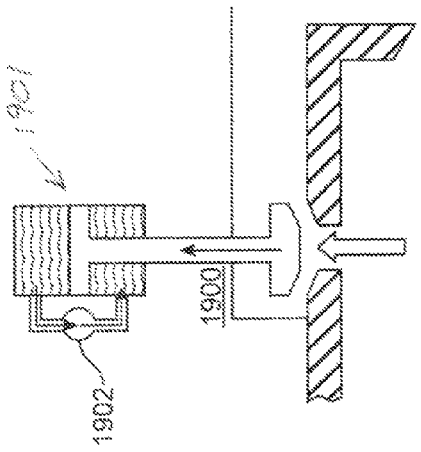

VALVE

CROSS-REFERENCE TO RELATED APPLICATIONS

The instant application claims priority to and is a continuation of U.S. Nonprovisional patent application Ser. No. 13/617,451 filed on Sep. 14, 2012, which is a claims priority to and is a continuation of U.S. Nonprovisional patent application Ser. No. 13/552,580 filed Jul. 18, 2012, which claims priority to and is a nonprovisional of U.S. Provisional Patent Application No. 61/509,511 filed Jul. 19, 2011 and incorporated by reference in its entirety herein for all purposes. The instant application also claims priority to U.S. Provisional Patent Application No. 61/529,543 filed Aug. 31, 2011 and incorporated by reference in its entirety herein for all purposes.

BACKGROUND

Valves allowing the selective flow of gas or gas-liquid mixtures, find use in a variety of applications.

SUMMARY

Particular embodiments relate to a valve structure for use in flowing gas or gas-liquid mixtures. In certain embodiments the valve comprises a fixed housing having port(s) present therein. A plate having opening(s) is moveable relative to the fixed housing. Motion of the plate resulting in alignment of the respective ports and openings, permits the rapid movement of a gas or a gas-liquid mixture through the valve, with low resistance and reduced coalescence of any entrained liquid droplets. Particular embodiments relate to rotary valves employing rotation of the plate relative to the housing. The valve may be actively controlled.

Certain embodiments relate to fluid flow valves comprising a member (such as a poppet or plate) moveable relative to a stationary seat, where the state of the member may be maintained against countervailing forces with relatively small expenditure of energy. In one embodiment, a poppet displaced from seating in the valve seat, may be held in that position against opposing forces tending to close the valve, until a desired flow of gas through the valve has taken place. The poppet may then be released as desired, such that those opposing forces serve to passively close the valve. The moveable member may be secured in position against the countervailing forces utilizing mechanisms operable based upon mechanical, magnetic, electromagnetic, hydraulic, pneumatic, and/or electrostatic principles. Valve embodiments may be particularly suited to control flows of gases for compression and/or expansion in an energy storage system.

BRIEF DESCRIPTION OF THE DRAWINGS

FIG. 2A shows a simplified perspective view of one valve embodiment.

FIG. 2B shows a simplified cross-sectional view of the embodiment of FIG. 2A.

FIG. 2C is a generalized plot of valve area versus crank angle for the valve embodiment of FIG. 2A.

FIGS. 2DA-2DC are plots of valve area versus crank angle for various embodiments.

FIG. 5A shows a simplified perspective view of another valve embodiment.

FIG. 5B shows a simplified cross-sectional view of the embodiment of FIG. 5A.

FIG. 5C is a generalized plot of valve area versus crank angle.

FIG. 9A shows various basic operational modes of the system of FIG. 9.

FIGS. 16A-D show operation of a valve embodiment during a compression cycle in a cylinder housing a reciprocating piston.

FIGS. 18A-C show a valve embodiment utilizing a mechanical mechanism to maintain valve state against countervailing forces.

FIG. 19A-C show a valve embodiment utilizing a hydraulic mechanism to maintain state against countervailing forces.

DESCRIPTION

U.S. Patent Publication No. 2011/0115223 ("the '223 Publication") describing an energy storage and recovery system employing compressed gas as an energy storage medium, is incorporated by reference in its entirety herein for all purposes. Certain apparatuses and methods described in the '223 Publication employ a reversible mechanism comprising a reciprocating piston within a cylinder, to compress gas and in turn recover energy from expanding gas. Valving regulates the flow of gases into and out the cylinder.

Rotary Valve

Figure 1A:
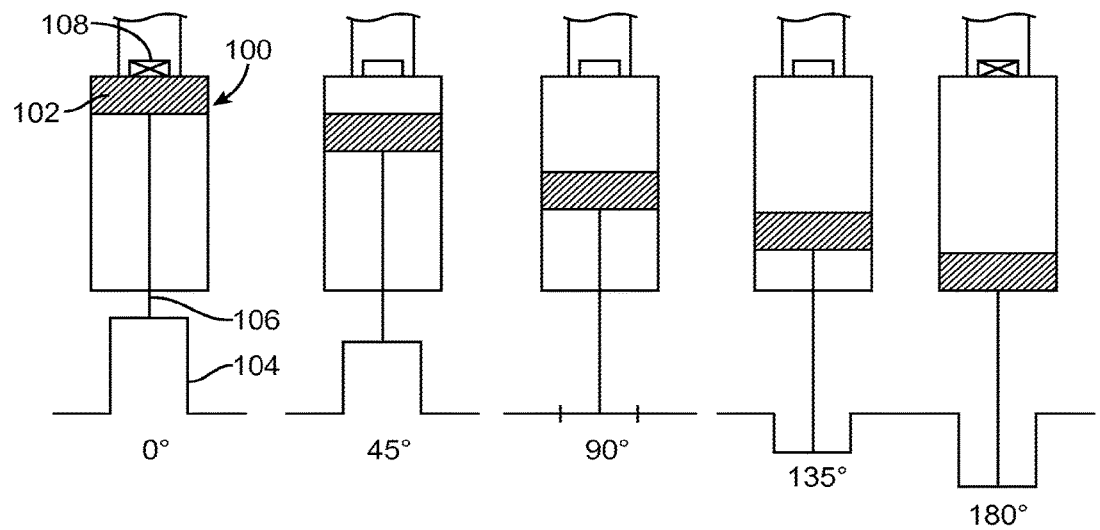
FIG. 1A shows a simplified view of an embodiment of a cylinder device including an inlet valve, acting as a gas expander.

FIG. 1A shows a simplified view of an embodiment of a cylinder device 100 having piston 102 disposed therein. Piston 102 is in physical communication with crankshaft 104 via piston rod 106.

The cylinder device may act as a compressed gas expander. In particular, inlet valve 108 may be actuated to allow compressed gas from a compressed gas source (such as a storage tank or a compressor) to begin to flow into cylinder device 100 when piston 102 is in the Top Dead Center (TDC) position corresponding to a crank angle of 0 degrees of the crankshaft. The expansion of this compressed gas within the cylinder device drives the piston and piston rod, allowing useful work to be recovered (in some cases in the form of electricity produced by a generator).

In the highly simplified case shown in FIG. 1A, the inlet valve 108 is maintained in the open position through the crank angle reaching 180 degrees, corresponding to the Bottom Dead Center (BDC) position of the piston within the cylinder. As discussed at length in the '223 Publication, it may be desirable to close the inlet valve prior to reaching BDC. It may also be desirable to open the inlet valve earlier or later than TDC. The optimum valve timing depends on many factors in a practical machine, including the considerations for active valve actuation discussed below in connection with FIGS. 6A-I. Thus, FIG. 1A is being provided for purposes of illustration only, and the relationship between valve actuation and crank angle is not limited to being as shown in that figure.

Figure 1B:
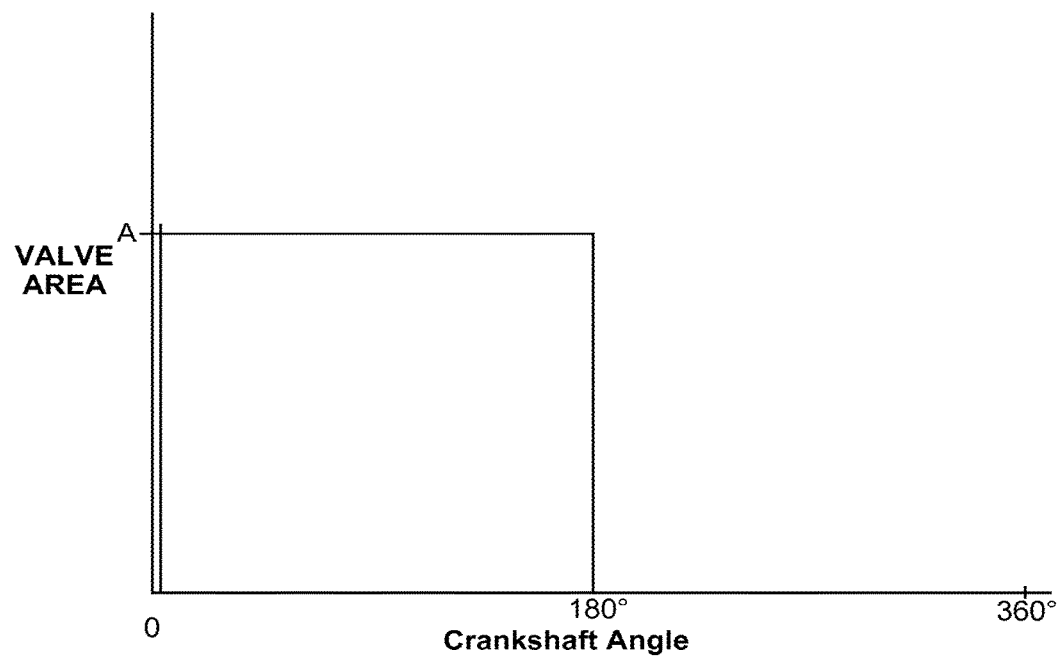
FIG. 1B plots valve area versus crank angle for an idealized inlet valve for the expander of FIG. 1A.

Ideally, the inlet valve 108 would exhibit the profile shown in FIG. 1B. That is, the valve would shift from being fully closed (valve area=0) to being completely open (valve area=A) at TDC (crank angle=0°), and then shift from being fully open (valve area=A) to being fully closed (valve area=0) at BDC (crank angle=180°).

Such an idealized valve actuation profile would afford extremely precise control over the volumes of compressed gas admitted to the cylinder and expanded. In reality however, such instantaneous valve actuation is difficult to achieve.

Instead, an actual valve would operate over some amount of time (characterized here in terms of crank angle) to move between open and closed positions. Accordingly, embodiments of valve structures may allow control over valve actuation to determine the shape of opening and closing profile shown in idealized form in FIG. 1B.

FIG. 2A shows a perspective view of one embodiment of a valve. FIG. 2B shows a simplified cross-sectional view of the embodiment of FIG. 2A.

Valve 200 comprises a circular housing 202 defining a port 204 in a shape of a truncated arc segment, occupying an amount of arc designated as theta ($\theta$). The port 204 defines the fully open area (A) of the valve. The housing 202 and the corresponding port 204 are fixed in place.

Valve 200 further comprises a circular plate 206 overlying the housing 202. The circular plate defines an opening 208 in the shape of a truncated arc segment occupying an amount of arc designated as alpha ($\alpha$).

The plate 206 is rotatable in the clockwise direction (for example by a shaft) relative to the fixed housing. In this particular embodiment, the angle of rotation of the plate (plate angle), corresponds to the crank angle.

Rotation of the plate 206 resulting in complete alignment of the opening 208 with the port 204, opens the valve and allows the passage of gas. Rotation of the plate 206 resulting in no overlap between the opening and the port, closes the valve and blocks the passage of gas. Rotation of the plate resulting in less than complete alignment between the opening and the port, produces a partially open valve state allowing some passage of gas.

Specifically, FIG. 2C is a generalized plot of valve area versus crank angle for the valve embodiment of FIG. 2A. Again, in this particular embodiment the crankshaft angle corresponds to the angle of the rotating plate. This figure shows various features of the curve, in relation to the sizes ($\theta$, $\alpha$) of the ports and openings.

FIG. 2C also shows that the time of opening of the valve may be offset by some amount or phase shift, here designated by the greek letter phi ($\phi$). This phase shift corresponds to the location of the leading edge of the opening relative to the leading edge of the port, at the crank angle of zero (0). Where the leading edge of the opening is exactly aligned with the edge of the port at a crank angle of zero, then $\phi=0$.

The generalized plot of FIG. 2C may be better understood with reference to some specific examples. For example, FIG. 2DA compares the plot of FIG. 1B for an idealized valve, with the valve of FIG. 2A where $\theta=\alpha=90°$, and $\phi=0$.

The particular plot of FIG. 2DA is in the shape of a triangle, owing to the exact same size of the port ($\theta$) and plate opening ($\alpha$). In other words, due to these relative sizes, there exists complete overlap between the port and opening (and a full valve area of A) for only one instant of crank angle.

A change in the size of the port and/or opening, will affect the profile of the curve. For example, FIG. 2DB shows a plot wherein the sizes of both the port and opening have been reduced by the same amount ($\theta=\alpha=67.5°$), thereby resulting in a smaller peak valve area A'. Again, the plot here is of a triangle, owing the exact correspondence in size between the port and the opening.

FIG. 2DC shows a plot characteristic of a change in the size of only one of the port or the opening. Here $\theta$ or a has been reduced from 90° to 67.5°. This plot is in the shape of a plateau, with the flat portion reflecting a prolonged duration of the valve in the fully open state owing to the greater size of one of the port or opening relative to the other. Note that this fully open state is A', corresponding to a smaller port or opening angle of only 67.5°.

In this and other embodiments described herein, the correlation between movement of the plate/opening and movement of crank may be fixed. That is, the plate/opening rotates predetermined amount based upon the crank angle. Such embodiments may be realized utilizing a physical connection (for example a mechanical, hydraulic, or other type linkage) present between the valve and the crank to coordinate their action. Such configurations may offer the potential benefits of fast response and relative simplicity of structure.

Figure 3A:
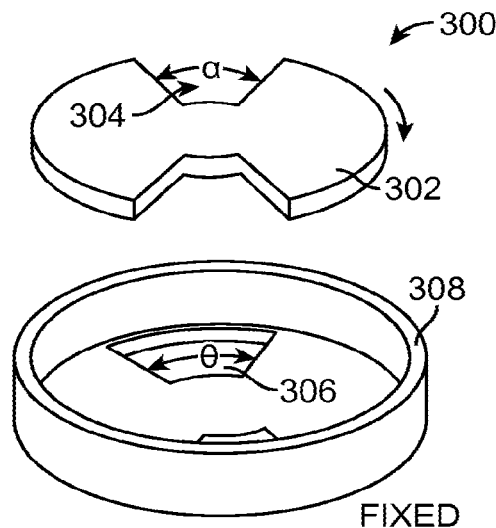
FIG. 3A shows a simplified perspective view of an alternative valve embodiment.
Figure 3B:
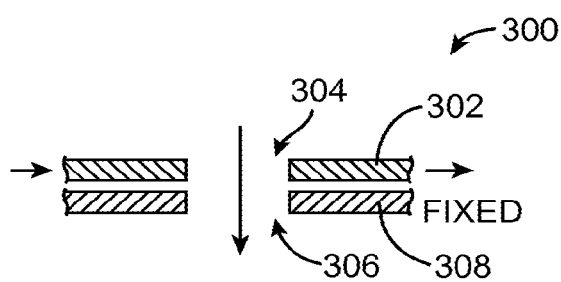
FIG. 3B shows a simplified cross-sectional view of the embodiment of FIG. 3A.

FIG. 3A shows a simplified perspective view of an alternative valve embodiment which may employ a fixed relation between crank angle and amount of valve area. The specific embodiment of FIG. 3A includes two ports 306 that each occupy no more than 45°, and which are located 180° apart on the fixed housing 308. The rotating valve plate 302 also features two openings 304 occupying no more than 45° and located 180° apart. FIG. 3B shows a simplified cross-sectional view of the embodiment of FIG. 3A.

Figure 3C:
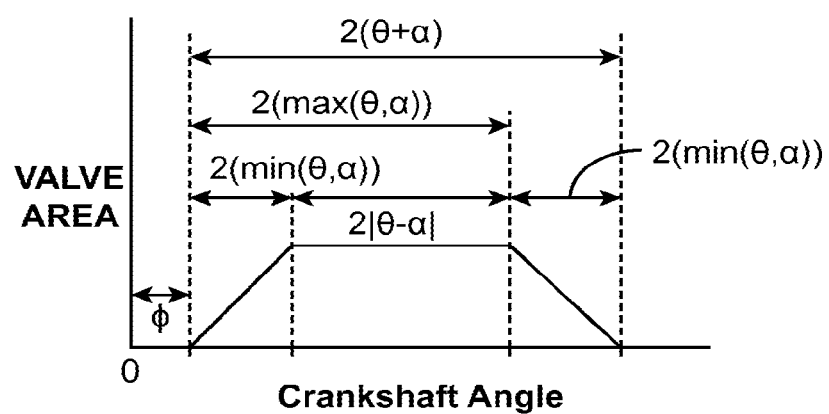
FIG. 3C is a generalized plot of valve area versus crank angle.

The valve plate of the embodiment of FIGS. 3A-B is also configured to rotate a fixed amount relative to the crank, here: plate angle (mod 180°)=(crankshaft angle−ϕ)/2. This relationship means the valve plate rotates at one-half the speed of the crank. FIG. 3C accordingly shows a generalized plot of valve area versus crank angle for the valve embodiment of FIGS. 3A-B.

A valve configuration featuring a valve plate with more than one opening, may offer certain benefits. One benefit of having the rotary valve turn at the compressor speed divided by an integer not less than two, is that the valve plate is now radially symmetric and vibration is significantly reduced. In addition, as in the embodiment of FIGS. 3A-C, having the rotary valve turn at half compressor speed reduces the power consumed operating the valves. This can improve the efficiency and cost-effectiveness of the device.

The embodiment of FIGS. 3A-C also reduces maintenance costs. In particular, symmetrical positioning of the openings in the valve plate, balances the plate during rotation and thereby reduces wear. Wear is also reduced by the need to rotate the valves less quickly.

While not explicitly shown, changing the size of the ports and/or openings of such multi-port/opening embodiments can result in plots of valve area vs. crank angle, that are similar to those shown in FIGS. 2DA-DC.

Figure 4A:
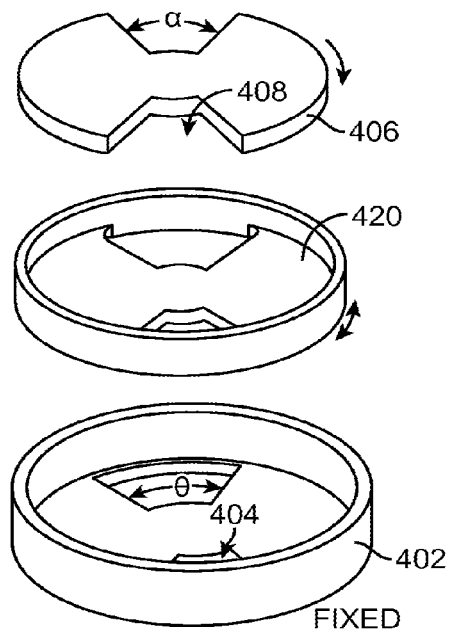
FIG. 4A shows a simplified perspective view of another valve embodiment.
Figure 4B:
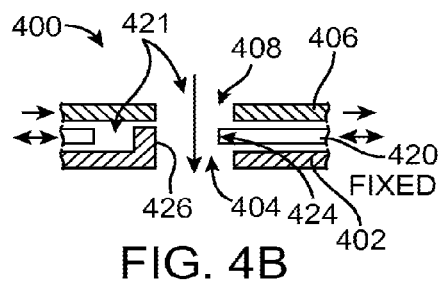
FIG. 4B shows a simplified cross-sectional view of the embodiment of FIG. 4A.

Still other valve embodiments are possible. For example, FIGS. 4A-B show simplified exploded and cross-sectional views of another rotary valve structure, in which valve area can be changed dynamically.

Similar to the embodiment of FIG. 3, the valve 400 of FIG. 4 comprises a circular fixed housing 402 defining two ports 404 that each occupy approximately 45° of arc.

The ports 404 define the fully open area (A) of the valve. The housing 402 and the corresponding ports 404 are fixed in place.

Valve 400 further comprises a circular plate 406 overlying the housing 402. The circular plate defines two openings 408 that each also occupy approximately 45° of arc.

Again, the valve plate 406 is rotatable in the clockwise direction (for example by a shaft) relative to the fixed housing. Rotation of the plate 406 resulting in complete alignment of the openings 408 with the ports 404, opens the valve and allows the passage of gas. Rotation of the plate 406 resulting in no overlap between the openings and the ports, closes the valve and blocks the passage of gas. Rotation of the plate resulting in less than complete alignment between the openings and the ports, results in a partially open valve state.

The valve embodiment of FIGS. 4A-B differs from the embodiment of FIGS. 3A-B, however, in the inclusion of a fixed aperture 420 having cutouts 421, that is imposed between the rotatable plate and the fixed housing. Specifically, the fixed aperture is selectively rotatable in front of the port to effectively change the area of the valve.

While the embodiment of FIGS. 4A-B shows the fixed aperture as being positioned between the rotating plate and the housing, this is not required. Alternative embodiments could position the fixed aperture distal from the chamber side, on the other side of the valve plate, thereby potentially reducing an amount of dead volume attributable to structure of the valve.

Details of the operation of the operation of the valve of FIGS. 4A-B, may be understood with reference to FIGS. 10A-10I. Specifically, as shown in those figures, in a fully closed position an edge of the fixed aperture rests against a raised surface of the fixed housing in order to block an undesired leak pathway. FIGS. 10A-10I are discussed in detail further below.

Figure 4C:
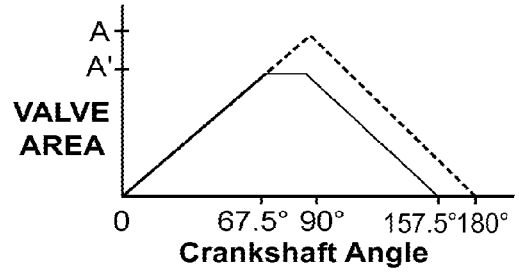
FIG. 4C is a generalized plot of valve area versus crank angle.

FIG. 4C plots the profile of valve area vs. crank angle for the configuration of FIGS. 4A-B, with the fixed aperture rotated to occlude approximately 22.5° of the arc of the port. This results in reduced area for the valve, indicated in FIG. 4C as area A".

Moreover, actuation of the fixed aperture has also altered the shape of the valve area/crank angle profile. In particular, the profile has changed from a triangle to a trapezoid. This reflects the fact that the effective shape of the port no longer exactly matches the full area offered by valve plate opening, so that even complete overlap between the two yields only the reduced valve area A' (but over an extended range of crank angles–the 'plateau' in this curve).

While the plot of FIG. 4C shows a phase shift (ϕ) of zero, this is not required. For example, in certain embodiments the phase shift may be chosen to open the valve at TDC for suction, or at BDC for discharge.

Moreover, the phase shift might be advanced (or retarded) from those particular positions in order to optimize flow through the cylinder. For example, opening the valve earlier when the piston is moving slowly represents a small loss, but the valve may be opened longer (assuming the same closing time), thereby making the effective area larger for a net improvement.

The inclusion of the fixed aperture feature disclosed in the embodiment of FIGS. 4A-B, changes the performance of the valve in a non-ideal way. In particular, the change in valve duration is accompanied by a reduction in valve area.

In certain applications however, it may be desirable to effect a change in valve duration while maintaining the largest valve area possible. FIGS. 5A-C accordingly show an alternative embodiment of a valve structure that is capable of achieving this goal.

In particular, the valve embodiment of FIGS. 5A-C also includes a moving aperture mechanism for controlling the effective area (α) of the rotating opening, so that it matches the effective area (θ) of the port (as occluded by the fixed aperture). Being able to vary both theta and alpha in this manner, allows varying of the valve duration while maintaining a large valve area. This happens when theta and alpha are equal.

Specifically, FIGS. 5A-B show simplified exploded and cross-sectional views of the valve embodiment. As with the earlier embodiments, valve 500 comprises a circular housing 502 defining ports 504, each occupying approximately 45° of arc. The ports 504 define the fully open area (A) of the valve. The housing 502 and the corresponding ports 504 are fixed in place.

Valve 500 further comprises a circular plate 506 overlying the housing 502. The circular lower plate defines openings 508 that also each occupy approximately 45° of arc.

Again, the plate 506 is rotatable in the clockwise direction (for example by a shaft) relative to the fixed housing. Rotation of the plate 506 resulting in complete alignment of the openings 508 with the ports 504, opens the valve and allows the passage of gas. Rotation of the plate 506 resulting in no overlap between the openings and the ports, closes the valve and blocks gas passage. Rotation of the plate resulting in less than complete alignment between the openings and the ports, produces a partially open valve state allowing some passage of gas.

The valve 500 also includes a fixed aperture as described in the embodiment of FIGS. 4A-C. In particular this fixed aperture 520 including cutouts 521, is present between the rotatable plate and the fixed housing. Specifically, the fixed aperture is selectively rotatable in front of the port to effectively reduce its area.

Unlike the previous embodiments, the valve 500 further includes a moving aperture 530. The moving aperture spins together with the valve plate, but can also be rotated relative to the valve plate to occlude part or all of the openings thereof. A raised control surface 532 of the moving aperture projecting into and moveable within the opening 508 of the lower plate, serves to block a possible leakage pathway in the complete valve occlusion state.

Details of the operation of the operation of the valve of FIGS. 5A-C, may be understood with reference to FIGS. 12A-I, which are discussed in detail below. While the embodiment of FIGS. 12A-I shows the fixed aperture as being positioned between the rotating plate and the fixed housing, this is not required. Alternative embodiments could position the fixed aperture distal from the chamber side (for example on the other side of the valve plate and moving aperture), thereby potentially reducing an amount of dead volume attributable to valve structure.

Performance of the valve embodiment shown in FIGS. 5A-5B may be favorably contrasted with that shown in FIGS. 4A-C, with reference to an example where the valve is to be open over 135° of crank angle.

Figure 4D:
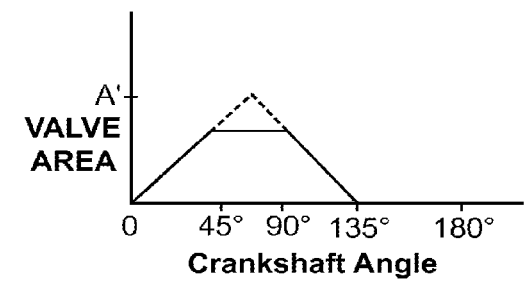
FIG. 4D is a generalized plot of valve area versus crank angle.

In a valve embodiment where the value of alpha is fixed (for example at 45° as in FIGS. 4A-C), theta would need to be set to 22.5° degrees in order to achieve the desired opening over 135° of crank angle. The area plot for such an embodiment is shown in FIG. 4D, where the valve area ramps up between crank angles of 0-45°, remains constant over 45-90° interval of crank angle, and then ramps down between crank angles of 90-135°.

In contrast FIG. 5C is the area plot for a corresponding valve embodiment that can vary both theta and alpha. In particular where theta=alpha=33.75°, the valve would ramp up between 0-67.5° and then ramp down from 67.5-135°. Such valve performance increases the effective area by 12.5%, as is indicated in the dashed line in FIG. 4D for comparison.

Similarly, if a valve opening duration of 100° is desired, varying both alpha and theta yields an effective area that is nearly 2.8× greater than that of the corresponding valve in which only theta is varied. If a valve open time of 180° or less is desired, being able to reduce alpha to below 45° may be useful.

Embodiments described so far may relate to valves having a fixed relationship between crank angle and valve area. However this is not required, and alternative embodiments may not necessarily employ fixed correlation between valve movement and crank motion.

For example, certain embodiments could include sensor(s) allowing the relative crank position to be indexed. Specifically, a sensor could detect the relative position of the crank and in turn send electrical signals to a motor (such as a stepper motor) that is responsible for controlling movement of the valve elements.

Embodiments allowing variation in valve state relative to crank angle, may offer benefits by allowing flexibility between movement of the crank and corresponding movement of the valve. For example, the opening/closing profiles of the valve embodiments of FIGS. 2A-B and 3A-B are correlated to crankshaft rotation according to the respective profiles in FIGS. 2C and 3C. As described in the '233 Publication, however, in certain applications it may be desirable to change valve actuation to deviate from these profiles.

Figure 6A:
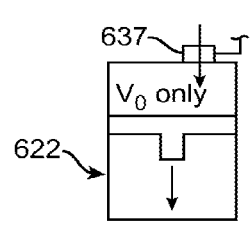
FIGS. 6A-I show various active valve actuation schemes.
Figure 6D:
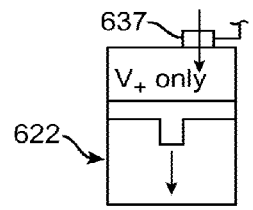
Figure 6G:
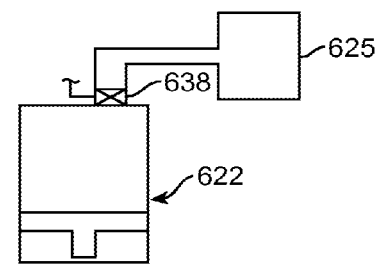
Figure 6B:
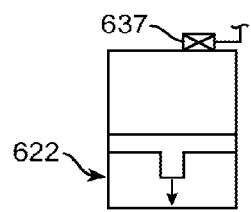
Figure 6E:
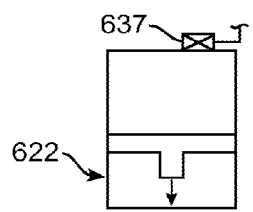
Figure 6H:
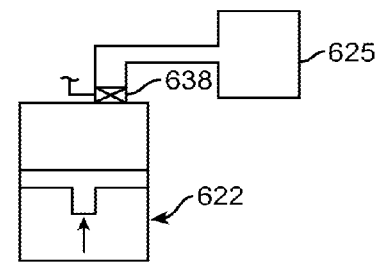
Figure 6C:
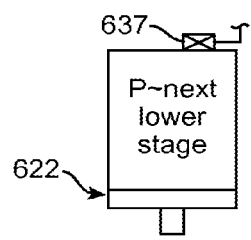

For example, FIGS. 6A-C show closure of the gas flow valve 637 in an expansion cycle, prior to the reciprocating piston reaching BDC. This valve timing serves to limit an amount of compressed gas ($V_O$) admitted to the cylinder, to less than the full volume of the cylinder. Inlet of such a reduced quantity ($V_O$) of compressed gas can desirably enhance an efficiency of energy recovery, by lowering a differential at BDC between the pressure of gas expanded within the chamber, and the pressure of the low pressure side. This low pressure side can be of a successive lower-pressure stage (in the case of a multi-stage expander), or can be of an outlet (in the case of a final stage or single-stage expander).

Figure 6F:
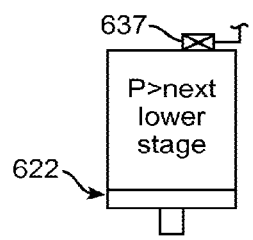

Active valve actuation can also enhance the power recovered from the expansion of compressed gas. For example, FIGS. 6D-F show closure of the gas flow valve 637 in an expansion cycle. Here, this valve timing serves to admit an amount of compressed gas ($V_+$) to the cylinder, that is greater than ($V_O$). The expansion of a larger volume of gas results in the piston being driven downward with higher energy, resulting in a greater amount of power being output from the system.

Active valve actuation to control power output during expansion, may be particularly relevant to stand-alone energy storage units that are not connected to the grid. Such control can allow maintenance of electrical output at a fixed frequency while the load and gas pressure are changing. In a technique known as "cut-off", active valve control has previously been used to control steam engines, where steam pressure and load vary. According to certain embodiments, a simple speed sensor feedback could be used for such valve control.

A larger power output from expansion may occur at the expense of efficiency, as the inlet compressed gas expands to a pressure greater than that of the low pressure side. This can reduce system efficiency by not extracting the maximum amount of energy from the compressed gas. This can also reduce system efficiency by creating a pressure differential at the end of the expansion stroke.

In a manner analogous to that described above for expansion, active valve actuation can also enhance the efficiency of a gas compression cycle. For example, as shown in FIGS. 6G-H, during the addition of gas and compression, the valve 638 between the cylinder device 622 and the storage unit 625 (high pressure side) remains closed, and pressure builds up within the cylinder.

In conventional compressor apparatuses, accumulated compressed gas may be contained within the vessel by a check valve, that is designed to mechanically open in response to a threshold pressure. Such use of the energy of the compressed air to actuate a check valve, detracts from the efficiency of energy recovery by consuming energy to perform work.

Figure 6I:
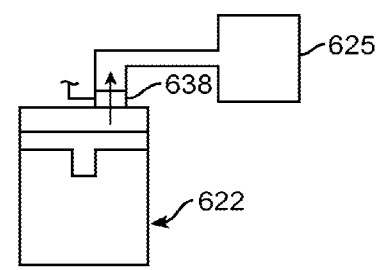

By contrast, as shown in FIG. 6I, embodiments of the present invention may actively open outlet gas flow valve 638 under desired conditions, for example where the built-up pressure in the cylinder matches or is near the pressure on the high pressure side. In this manner, energy from the compressed air within the cylinder is not consumed by the valve opening process, and efficiency of energy recovery is enhanced.

Active control of a gas inlet valve during a compression cycle, can serve to increase the flow rate of compressed gas. For example, where the compressed gas supply is low but there exists a high expected need for stored energy (e.g., the night preceding onset of a forecasted heat wave), the timing of opening of an inlet valve may be prolonged to admit more gas than can be compressed with the greatest efficiency. Such a mode of operation results in a higher flow rate of compressed gas, allowing the compressed gas storage unit to be replenished more rapidly in order to meet the expected future demand.

A larger flow rate may take place at the expense of efficiency, as compression results in a greater pressure differential between the chamber and high pressure side at the conclusion of the compression stroke. Efficiency of the compression process could also be eroded by an increase in temperature of the gas being compressed to a higher pressure.

Active valve actuation schemes may facilitate active valve actuation to achieve one or more of the aims described in connection with FIGS. 6A-6I.

Figure 7A:
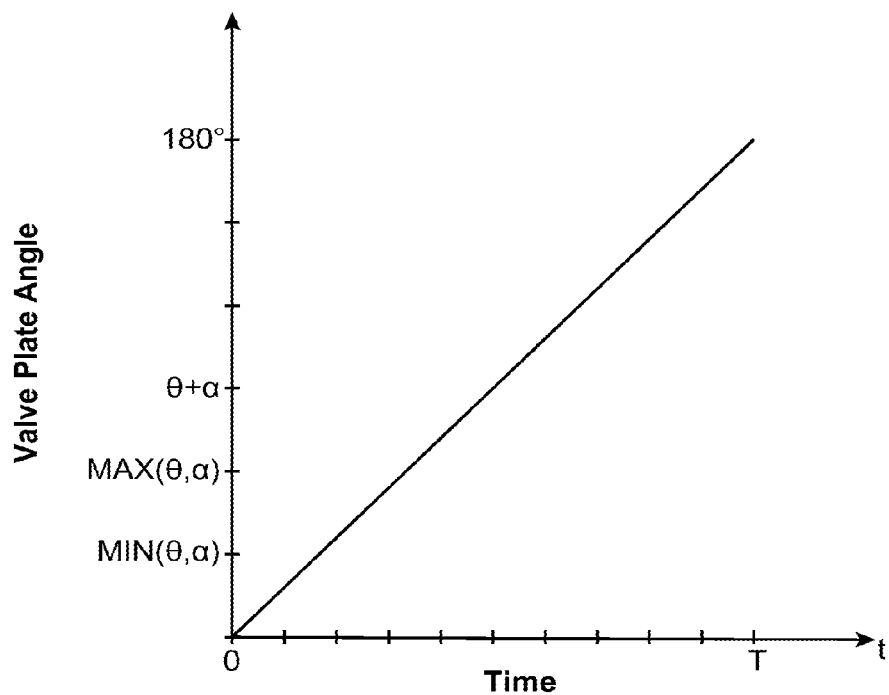
FIGS. 7AA-7CC show various gas flow valve actuation approaches.
Figure 7A:
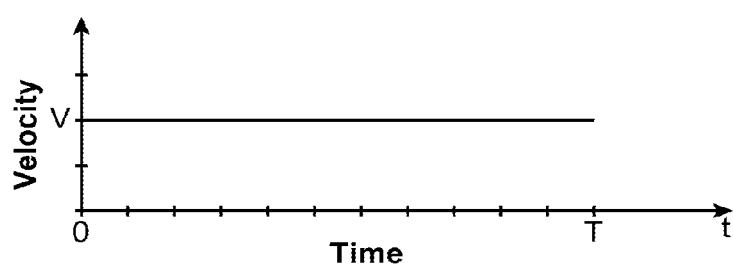

FIG. 7AA plots valve plate angle in degrees versus time for a non-actively controlled embodiment of FIGS. 3A-B, where the valve plate simply rotates at a fixed amount relative to crank angle according to the relation: valve plate angle (mod 180°)=(crankshaft angle−ϕ)/2. FIG. 7AB plots the velocity (shaft speed) over time of the motor responsible for actuation of the valve, showing a constant angular velocity. The motor speed may be controlled by a voltage, a current, a pulse width, or a frequency (such as with a stepper motor). A digital control signal may also be employed.

In contrast to such a passively controlled valve embodiment, by varying the speed of the valve plate during its rotation, the duration of full overlap between the valve plate opening and the port, can be enhanced. Specifically, the solid line in FIG. 7BA plots plate angle (again in degrees) versus time, for one embodiment of an actively controlled valve. Also shown along the X-axis in FIG. 7BA is the crank angle.

Over a first time period (to $T_T$), the valve plate is rotated at variable high speed to achieve full overlap between the port and the valve plate opening (at min(θ,α)). Over a second time period (to $t_3-T_T$), the valve plate is rotated at variable lower speed to prolong a duration of this full overlap between the port and plate valve that concludes at max(θ,α).

Over a third time period (to $t_3$), the valve plate is again rotated at variable higher speed to bring the valve to a fully closed state at θ+α. The relatively higher speed is continued past $t_3$ and reduced to a relatively lower speed at $t_4$.

Over a fourth time period (to $t_5$), the valve plate is rotated at variably lower speed. Over a fifth time period (to T), the valve plate is again rotated at variably higher speed in order to bring the valve speed to a relatively higher speed at the start of the next cycle, corresponding to a half rotation of the plate (180°). Note that the valve is closed between $t_3$ and T. The speeding up and slowing down of the valve plate during the first half of the cycle increases the effective area of the valve while open. The speed variations during the second half of the cycle are to match conditions at the beginning and end of the first half cycle and to match the desired speed.

Figure 7B:
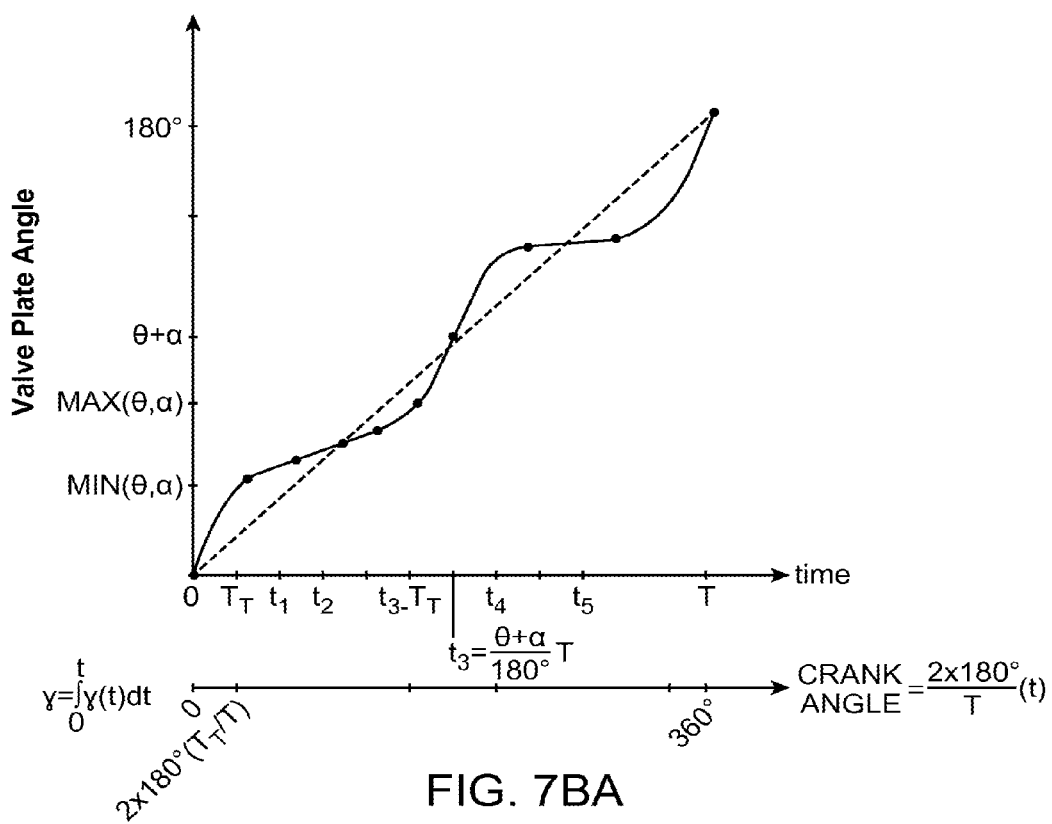
Figure 7B:
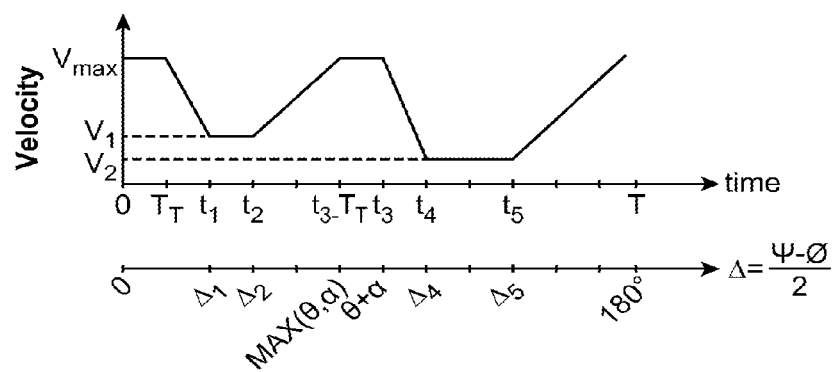

FIG. 7BB plots angular velocity over time of the motor (such as a stepper motor) responsible for actuation of the valve. FIG. 7BB also plots along the X-axis, the quantity delta (Δ), where Δ=(ψ−ϕ)/2, with ψ being the crank angle, and ϕ being the phase shift.

FIG. 7BB shows a plot of velocities varying between $V_{MAX}$ and lower velocities $V_1$ and $V_2$, in order to achieve the desired valve actuation profile. Note that velocity ramp-up and ramp-down rates may be different. Because the valve closed time is different from the valve open time, the velocity $V_2$ may typically be lower than the velocity $V_1$.

While effective to actively control the valve, the scheme of FIGS. 7BA-C offers complexity in the application of velocity control signals that vary over time. In particular, the hardware required to accommodate such variable speed performance may be costly to obtain and maintain.

Figure 7C:
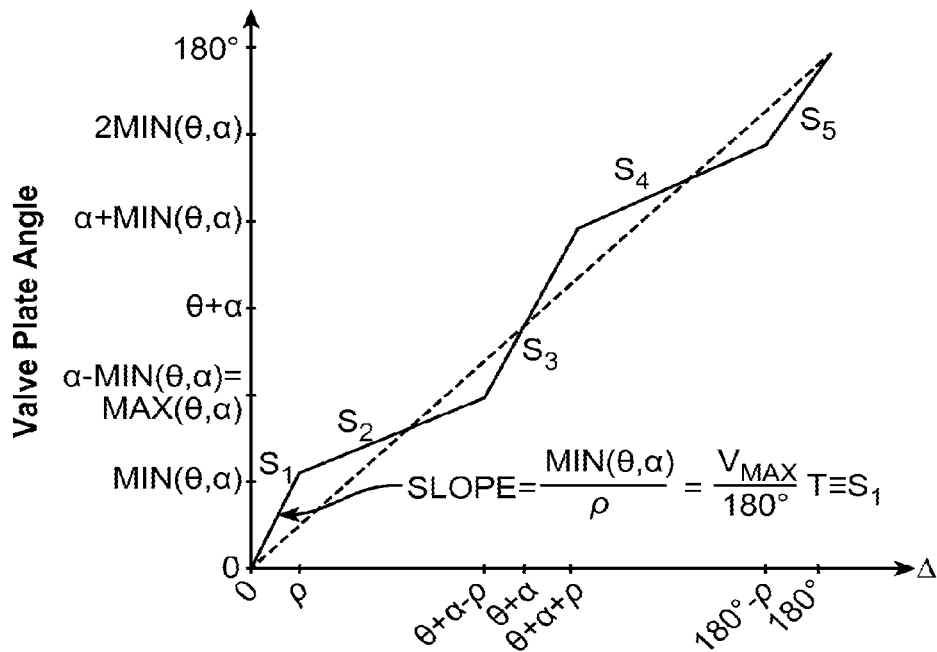
Figure 7C:
Figure 7C:
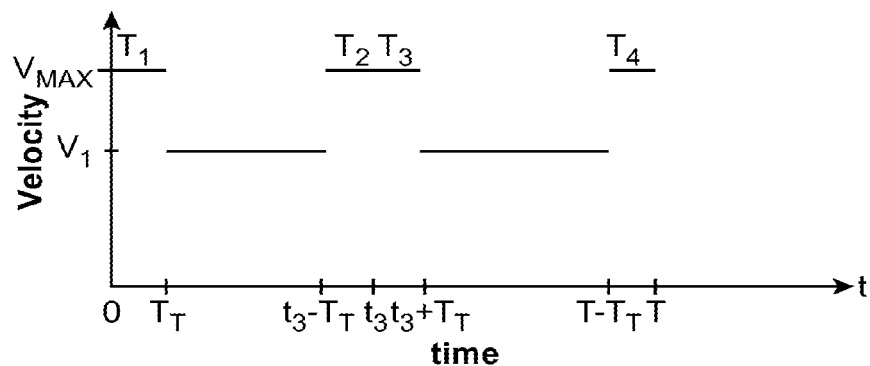

Accordingly, FIGS. 7CA-CC show an alternative active control scheme calling instead for the application of piecewise constant velocity control signals. In this particular embodiment, active control over the valve feeds a low-pass filter before driving the motor, allowing a control signal at only two velocities (low: $V_l$; and high: $V_{MAX}$).

In particular FIG. 7CA plots valve plate angle versus delta, which takes the form of a series of lines. The slopes of these lines may be related to the quantity rho (ρ), which is the value of delta (Δ) corresponding to the plate angle of min(θ,α). For example the slope ($S_1$) of the line from a plate angle of 0, may be expressed by the following relation:

$$S_1=\min(\theta,\alpha)/\rho=V_{MAX}*T/180°,$$

where T is the period of one crank revolution and $V_{MAX}$ is the maximum allowable valve plate speed (in degrees/second).

FIG. 7CB plots the varying signal of angular shaft velocity over time. Application of a low pass filter to this signal, helps to avoid attempting to accelerate or decelerate the motor faster than is physically possible. As described below in detail in connection with FIG. 13, such low pass filtering can be accomplished electronically in the hardware responsible for controlling the valve.

FIG. 7CC accordingly shows the resulting plot of velocity versus time, indicating the sequential application of only two constant velocities ($V_{MAX}$, $V_l$) to the motor in order to achieve active valve actuation.

Figure 13A:
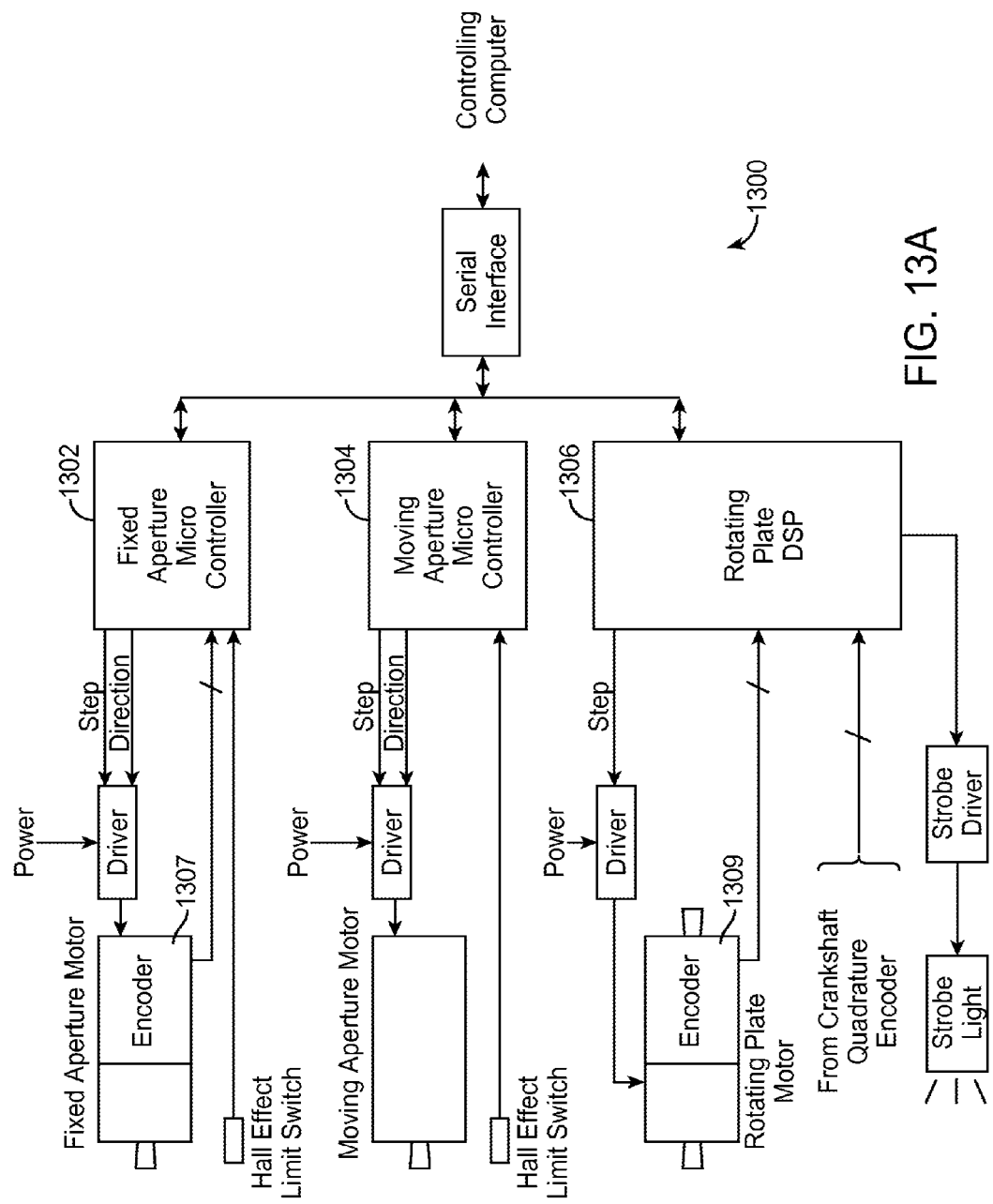
FIGS. 13A-B are diagrams of an embodiment of a valve control system.
Figure 13B:
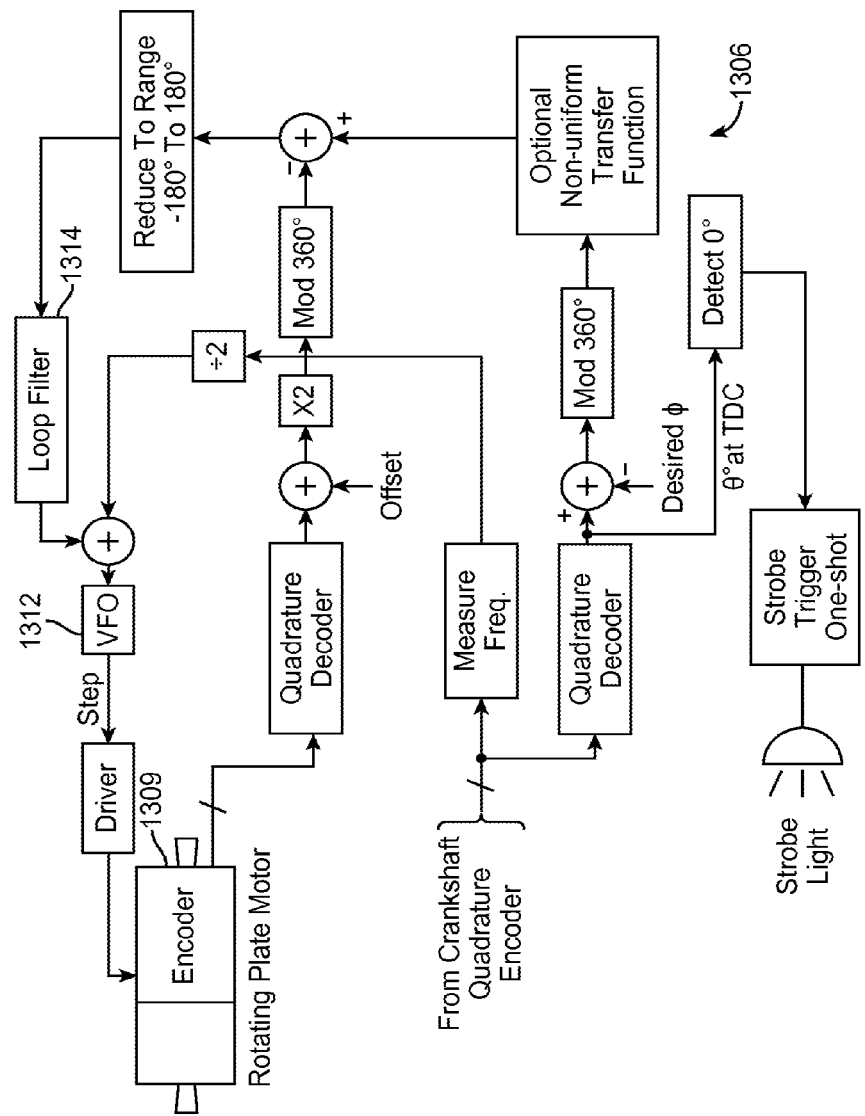

FIGS. 13A-B are diagrams showing a valve control circuit according to one embodiment. FIG. 13A is a simplified diagram of a physical circuit that may be used to control a rotary valve. This figure shows low-level control within each valve. The particular physical circuit 1300 includes three small controllers or processors: two microcontrollers 1302, 1304, and a digital signal processor (DSP) 1306. Alternatively, functionality could be implemented in a single controller.

The encoders 1307, 1309 shown in FIG. 13A are quadrature encoders that produce three outputs. These outputs are two quadrature outputs, and an index pulse.

FIG. 13B shows a functional block diagram of one embodiment of a control loop implemented by the rotating plate DSP 1306 in FIG. 13A. Variable frequency oscillator (VFO) 1312 is nominally set to drive the rotating plate motor at one-half the speed of the crankshaft.

This speed of the rotating plate motor is modified in a phase locked loop (PLL) configuration. The crank angle offset by the desired phase angle, is compared with the rotating plate angle. Here the rotating plate angle is scaled by two, because the rotating plate rotates at half the speed of the crankshaft. This error signal is applied to the VFO through a suitable loop filter 1314 to stably lock the phase.

A non-uniform transfer function 1306 may be applied to the offset crank angle to produce a desired plate angle. This may incorporate non-uniform rotation as shown in FIGS. 7BA and 7CA.

The strobe light may be used to illuminate the rotating valve plate and observe the phase angle. Using this approach, the calibration offset can be established.

Additional capabilities are possible. Examples include calibrating motor(s) relative to a known position, and a communication protocol.

In the embodiment just described, the location of the moveable member within the chamber is inferred from a signal received from a linkage thereto (e.g. a crankshaft). However, this is not required, and other embodiments could involve valve actuation based upon a signal indicating the location of the moveable member within the chamber.

For example, in certain embodiments a member may rotate within a chamber in response to expanding gas. Examples of such structures include but are not limited to a screw, a turbine, a quasi-turbine, a vane, a lobe, a scroll, or a gerotor. In such cases, valve actuation could be coordinated by a PLL based upon the location of the rotating member sensed directly within the chamber, for example through optical or magnetic principles.

Moreover, while embodiments described above employ PLL based upon a signal indicating rotation of a moveable member or linkage thereto, this is also not required. Alternative embodiments could coordinate valve actuation with other types of motion via a PLL.

For example, A phase-locked loop can work with an intermittent reference signal. When the signal is present, the loop could adjust the VCO control up or down to match. When the reference signal is not present, the VCO control could remain at its current value. Thus if valve actuation is to be coordinated with a type of motion other than rotation (such as reciprocating motion), the position of the member or linkage thereto could be sensed intermittently in order to provide the basis for valve actuation based upon a phase-locked loop.

For example, certain approaches could use a sensor to produce a pulse when a reciprocating moveable member such as a liquid or free piston is at or near TDC. This position of the moveable member could be detected utilizing sensors in communication with the chamber, for example an opto-interrupter or hall effect sensor in the case of a free piston, or an ultrasonic sensor to detect a position of a liquid piston. While the resulting pulse would occur only once per expansion cycle, it would be sufficient to phase lock the valve to the member that is moving in response to expanding gas, or being driven to compress gas within the chamber.

It is noted that the particular embodiment of FIGS. 13A-B utilizes a shaft encoder on the crankshaft, an arrangement which yields many pulses per revolution. Such a configuration desirably makes the response time of the resulting PLL lock much shorter.

1. A method comprising:
providing a gas flow valve to a chamber having a moveable member; and
coordinating actuation of a gas flow valve according to a position of the moveable member utilizing a phase lock loop (PLL).

2. A method as in claim 1 wherein the PLL is based upon a signal indicating the position.

3. A method as in claim 2 wherein the moveable member is configured to rotate within the chamber.

4. A method as in claim 3 wherein the moveable member comprises a rotor.

5. A method as in claim 1 wherein the moveable member is configured to transmit power from the chamber via a linkage.

6. A method as in claim 5 wherein the PLL is based upon a signal indicating a position of the linkage.

7. A method as in claim 6 wherein the moveable member is configured to reciprocate within the chamber.

8. A method as in claim 7 wherein the linkage is configured to convert reciprocating motion to shaft torque.

9. A method as in claim 8 wherein the linkage comprises a mechanical linkage.

10. A method as in claim 9 wherein the mechanical linkage comprises a crankshaft.

11. A method as in claim 5 wherein the linkage comprises a hydraulic linkage.

12. A method as in claim 11 wherein the hydraulic linkage comprises a pump/motor.

13. A method as in claim 11 wherein the PLL is based upon a signal indicating the position.

14. A method as in claim 1 wherein the gas flow valve is actuated by rotational motion.

15. A method as in claim 1 wherein the gas flow valve is actuated by linear motion.

As described in detail above, certain valve embodiment are particularly suited for implementation in conjunction with a host computer including a processor and a computer-readable storage medium. Such a processor and computer-readable storage medium may be embedded, and/or may be controlled or monitored through external input/output devices.

Figure 15:
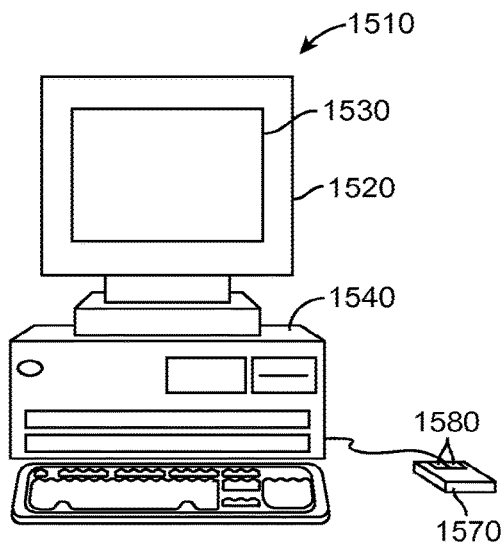
FIG. 15 shows a simplified view of a computer system suitable for use in controlling valve embodiments.

FIG. 15 is a simplified diagram of a computing device for processing information. This diagram is merely an example, which should not limit the scope of the claims herein. One of ordinary skill in the art would recognize many other variations, modifications, and alternatives. Embodiments can be implemented in a single application program such as a browser, or can be implemented as multiple programs in a distributed computing environment, such as a workstation, personal computer or a remote terminal in a client server relationship.

FIG. 15 shows computer system 1510 including display device 1520, display screen 1530, cabinet 1540, keyboard 1550, and mouse 1570. Mouse 1570 and keyboard 1550 are representative "user input devices." Mouse 1570 includes buttons 1580 for selection of buttons on a graphical user interface device. Other examples of user input devices are a touch screen, light pen, track ball, data glove, microphone, and so forth. FIG. 15 is representative of but one type of system for embodying the present invention. It will be readily apparent to one of ordinary skill in the art that many system types and configurations are suitable for use in conjunction with the present invention. In an embodiment, computer system 1510 includes a Pentium™ class based computer, running Windows™ XP™ or Windows 7™ operating system by Microsoft Corporation. However, the apparatus may use other operating systems/architectures.

As noted, mouse 1570 can have one or more buttons such as buttons 1580. Cabinet 1540 houses familiar computer components such as disk drives, a processor, storage device, etc. Storage devices include, but are not limited to, disk drives, magnetic tape, solid-state memory, bubble memory, etc. Cabinet 1540 can include additional hardware such as input/output (I/O) interface cards for connecting computer system 1510 to external devices external storage, other computers or additional peripherals, further described below.

Figure 15A:
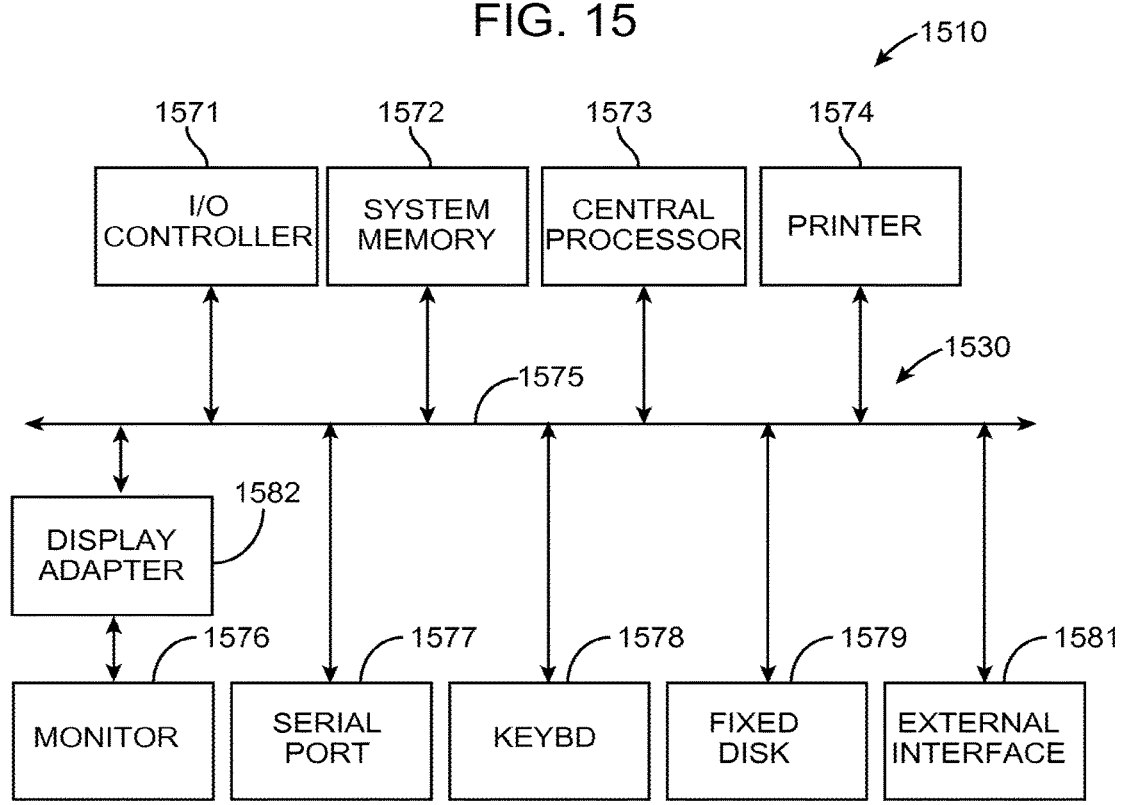
FIG. 15A is an illustration of basic subsystems in the computer system of FIG. 15.

FIG. 15A is an illustration of basic subsystems in computer system 1510 of FIG. 15. This diagram is merely an illustration and should not limit the scope of the claims herein. One of ordinary skill in the art will recognize other variations, modifications, and alternatives. In certain embodiments, the subsystems are interconnected via a system bus 1575. Additional subsystems such as a printer 1574, keyboard 1578, fixed disk 1579, monitor 1576, which is coupled to display adapter 1582, and others are shown. Peripherals and input/output (I/O) devices, which couple to I/O controller 1571, can be connected to the computer system by any number of approaches known in the art, such as serial port 1577. For example, serial port 1577 can be used to connect the computer system to a modem 1581, which in turn connects to a wide area network such as the Internet, a mouse input device, or a scanner. The interconnection via system bus allows central processor 1573 to communicate with each subsystem and to control the execution of instructions from system memory 1572 or the fixed disk 1579, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 14:
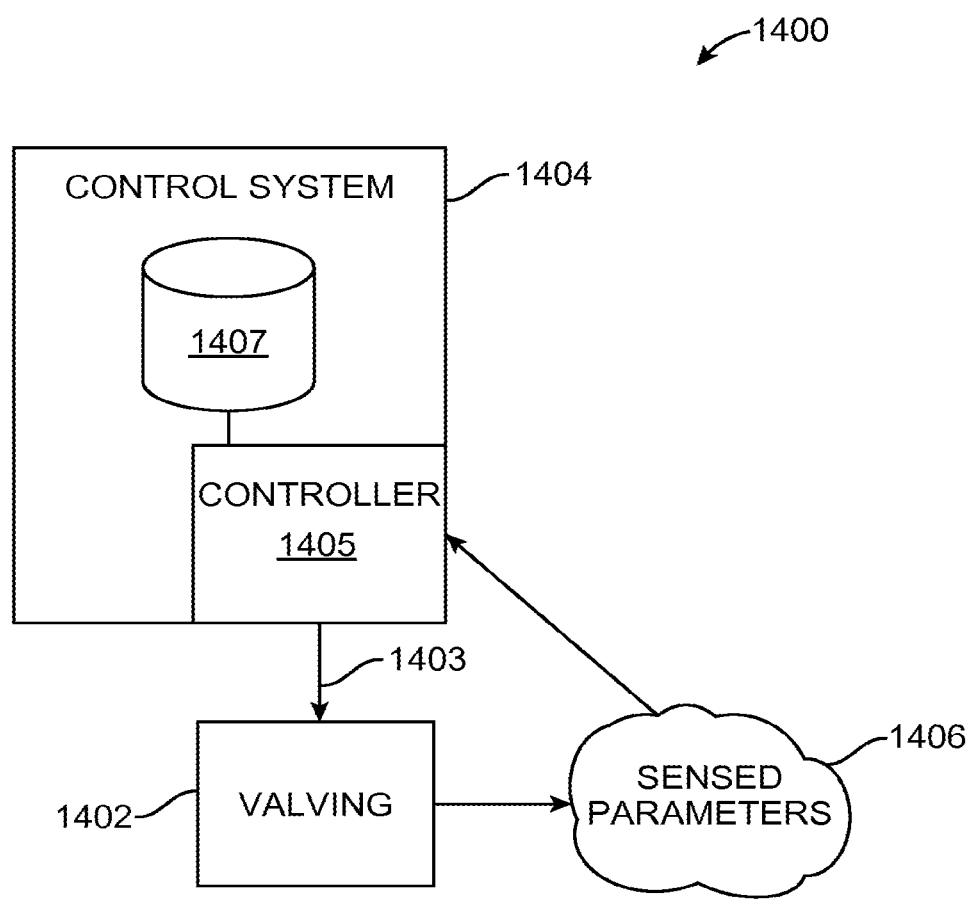
FIG. 14 shows a simplified view of a control loop for active valve control.

According to particular embodiments, active valve control may be part of a control loop based upon detected operating parameters of the system. Such a control loop may be implemented through a host computer as just described. FIG. 14 shows a simplified view of an embodiment of a control loop.

In particular, the active control loop 1400 comprises valving 1402 that is controlled based upon input signal(s) 1403 received from control system 1404 comprising a processor 1405 in communication with a computer-readable storage medium 1407. Such a computer-readable storage medium can be based upon magnetic, optical, semiconductor, or other principles, as is well known in the art.

According to certain embodiments, such inputs from the control system could comprise voltages supplied to a motor such as a stepper motor, that is responsible for actuating the valve. In particular embodiments, the timing and/or magnitude of the input signal(s) may be determined by the controller.

Performance of a gas compression (energy storage) or gas expansion (energy recovery) event, results in one or more system parameters 1406 that can be sensed. Examples of such system parameters include but are not limited to, temperature of the compressed or expanded gas exhausted through the valving, pressure of the compressed or expanded gas exhausted through the valving, temperature of liquid separated from exhaust through the valving, speed of a shaft transmitting power (such as a crankshaft), and torque of a shaft transmitting power.

The sensed parameters are in turn communicated back to the control system. Based upon these parameters and other factors, relevant instructions stored in the form of computer code in the storage medium, may cause the processor to actively change the inputs to the valving.

For example, sensed parameters indicating a high pressure of gas exhausted through the valving after performance of gas expansion, may indicate less efficient performance. Accordingly, the processor could instruct change in the valve timing to reduce a duration of openness of the valve responsible for intake of the compressed gas prior to expansion. This will in turn reduce the quantity of gas available for expansion within a fixed volume of a cylinder, and hence the final output pressure differential, thereby improving efficiency.

In another example, sensed parameters indicating a high temperature of gas exhausted through the valving after performance of gas compression, may also indicate less efficient performance. Accordingly, the processor could instruct change in the valve timing to reduce a duration of openness of the valve responsible for intake of the gas prior to compression. This will in turn reduce the quantity of gas available for compression within a fixed volume of a cylinder, but improve thermodynamic efficiency of the compression process.

In still another example, sensed parameters indicating a high torque of the shaft communicating power from expanding gas, may also indicate less efficient performance. Based upon this sensed data, the processor could instruct change in the valve timing to reduce a duration of openness of the valve responsible for intake of compressed gas for expansion. This will in turn reduce the quantity of gas available for expansion and hence the power of the output, while improving efficiency.

As indicated previously, efficiency of operation of the system may be balanced with an output of power (expansion), or of compressed gas (compression). Thus active valve control according to embodiments of the present invention is certainly not limited to the particular examples given above, and alternatives could be utilized to favor output over efficiency.

Moreover, as discussed in detail below in connection with FIG. 9, certain embodiments may provide other forms of desired output (such as control over temperature). Accordingly, various embodiments could focus upon active valve control approaches to achieve those desired outputs, while balancing efficiency versus power.

Ideally efficient operation generally occurs when the valves are opened with the pressure being equal across the valve. In a practical system, perturbing the opening and closing times around this ideal can improve efficiency.

Thus various control loops may be employed based upon sensed quantities including but not limited to, inlet pressure, in-chamber pressure, and outlet pressure, in order to adjust these parameters. Additionally, efficiency may be estimated from such values as shaft RPM and torque, and air flow rate in conjunction with the pressures and temperatures mentioned earlier.

In certain situations, a goal may be to maximize efficiency. However, in other situations other goals are possible, for example maximizing power output, or matching a desired power output, or some desired combination of these. The required output power could come from additional computation that may consider factors as time of day, time of year, weather, electricity pricing models, and/or historical demand patterns of a particular user or consumer population.

The particular embodiments described so far are for purposes of illustration only, and should not be taken as limiting. For example, while the above embodiments have featured one valve plate rotating relative to port(s) present in a fixed housing, this is not required and alternative embodiments could feature multiple valve plates rotating relative to one another.

And while the above embodiments feature valve elements moveable in a rotational manner to effect opening and closure, this is also not required by the present invention. According to alternative embodiments, other forms of relative motion between valve elements could be used to effect opening and closure.

One example of such alternative relative motion, is linear motion. Such linear motion could be achieved, for example, utilizing operation of a crank, gear, or other linkage attached to a shutter and moveable by operation of a gear driven by a motor. In such an alternative embodiment, appropriate seals and bearings could be employed to impart the desired functional characteristics for the valve under different pressure conditions.

In one specific embodiment, the valve may take the form of a sliding "D" valve, as has been previously used on steam engines. The sliding valve element could be linked to an eccentric on the crankshaft to control the flow of steam into the cylinder. This is described generally in "Steam-Engine Design", from the Lost Technology Series reprinted by Lindsay Publications, (1983), which is incorporated by reference in its entirety herein for all purposes. Also incorporated by reference herein for all purposes is "Modern Steam Engines" by Joshua Rose M. E, Henry Carey Baird & Co., Philadelphia, Pa. (1887) reprinted by Astragal Press (2003), which is incorporated by reference in its entirety herein. According to certain embodiments of the present invention, one sliding element of such a D valve could be used to control steam flow, with another sliding aperture used to control duration.

In embodiments of valves employing linear motion, the direction of sliding of the elements need not be in the same or even opposite direction relative to one another. In certain embodiments the elements could be actuable in directions offset from one another by some angle, in order to achieve a desired valve area/timing profile.

While the embodiments shown and described above have featured circular valve elements, this is also not required, and alternative embodiments could utilize other valve shapes. For example, one alternative embodiment could utilize gas flow through nested cylinders experiencing relative rotation (or linear motion/sliding) to selectively overlap of opening in the side, in a manner analogous to a sleeve valve.

While the rotating plate is described here are substantially planar, other shapes may be employed. Examples of such shapes are any surface of revolution including but not limited to, a portion of a sphere, a portion of a cone, a portion of a cylinder, a portion of a paraboloid, or a portion of a hyperboloid. The corresponding fixed surfaces could be similarly shaped. While such a change in shape does not affect the operation of the valve, it may have other beneficial effects, such as reduction of dead volume.

A valve according to various embodiments may function as an inlet valve and/or as an outlet valve to a gas expansion and/or compression chamber. Where the same chamber serves for both compression and expansion of gas, the valve may be configured to operate in a bi-directional manner.

In certain embodiments, the valve may be configured to allow the flow of a gas-liquid mixture that has been created in an upstream mixing chamber. In such a configuration, embodiments of the valve design desirably offer an unobstructed straight path to the flowing gas-liquid mixture. This discourages coalescence of entrained liquid droplets, allowing their passage to effect the desired heat exchange with compressing/expanding gas within the chamber.

Figure 10A:
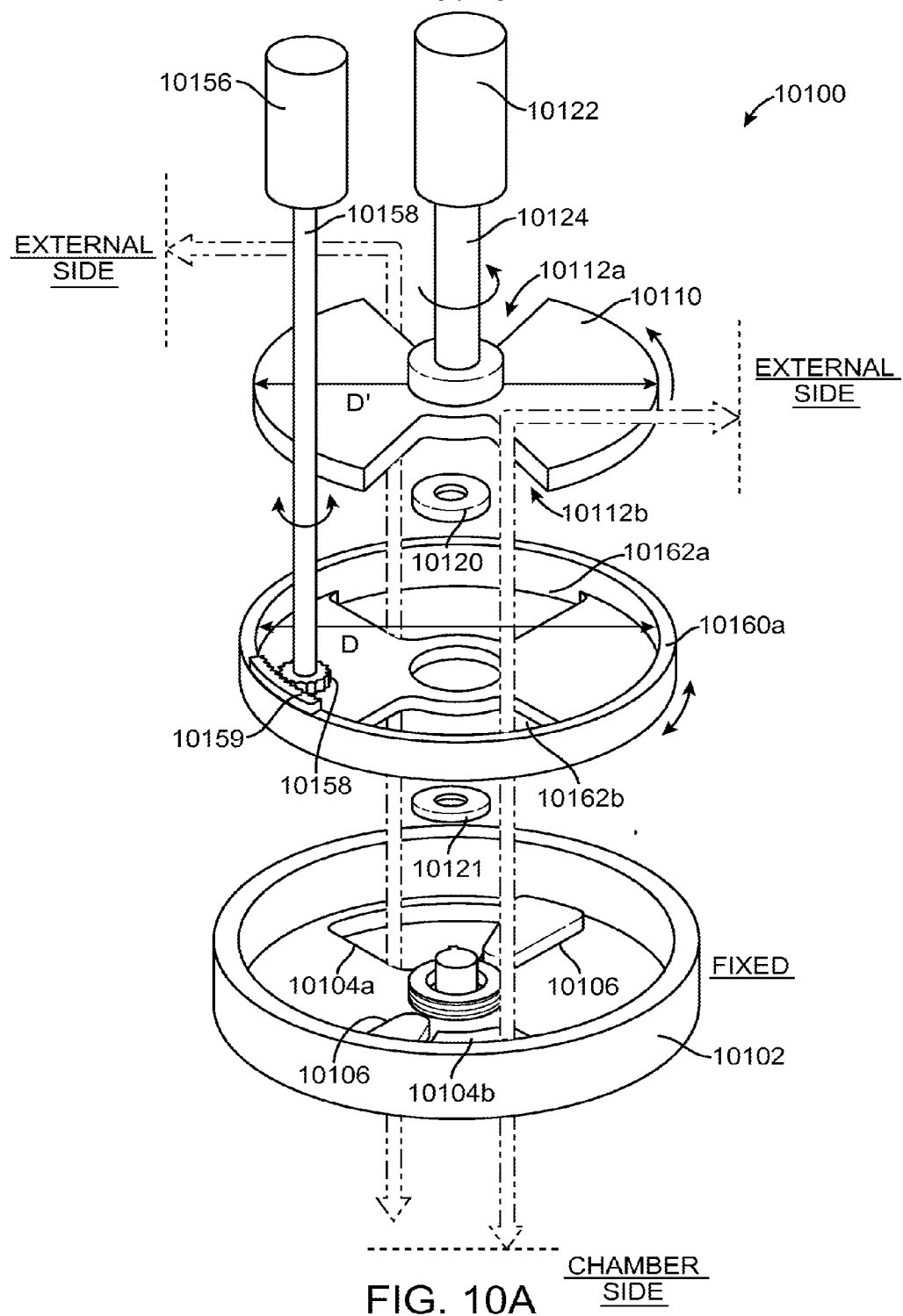
FIGS. 10A-I show various views of an alternative rotary gas flow valve embodiment.
Figure 10B:
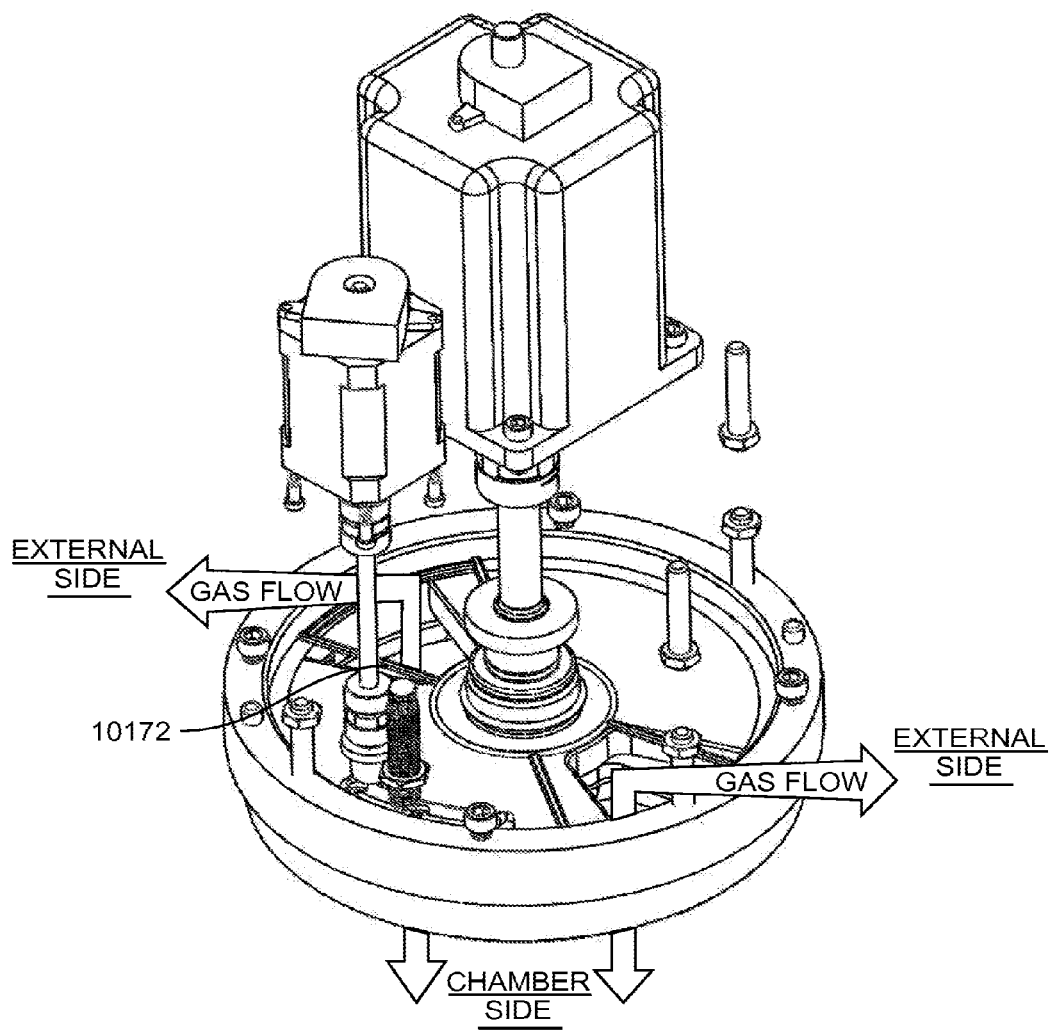

FIGS. 10A-10H show various views of one embodiment of a rotary gas flow valve. FIG. 10A is an exploded view showing certain valve components, but omitting the top cover. FIG. 10B shows those elements of FIG. 10A in assembled form.

In particular, the rotary valve 10100 comprises a lower housing 10102 defining ports 10104*a* and 10104*b*. Lower housing 10102 is fixed in place, and does not rotate.

Lower housing 10102 further includes two raised edges 10106 proximate to the respective ports. The function of these raised edge features is discussed below.

The size, shape, and orientation of the ports in the lower housing, is designed to match openings that are present in a rotatable valve plate. Specifically, the rotary valve 10100 also comprises valve plate 10110 defining openings 10112*a* and 10112*b* corresponding in size and shape with the ports 10104*a* and 10104*b*.

Valve plate 10110 is supported by bearing 10120, and is rotated by stepper motor 10122 via drive shaft 10124. Rotation of valve plate 10110 relative to stationary lower housing 10102 to align openings 10112*a*, 10112*b* with respective ports 10104*a*, 10104*b*, results in opening of the valve. Continued rotation of valve plate 10110 relative to stationary lower housing 10102 that does not align openings 10112*a*, 10112*b* with respective ports 10104*a*, 10104*b*, results in closure of the valve.

Figure 10C:
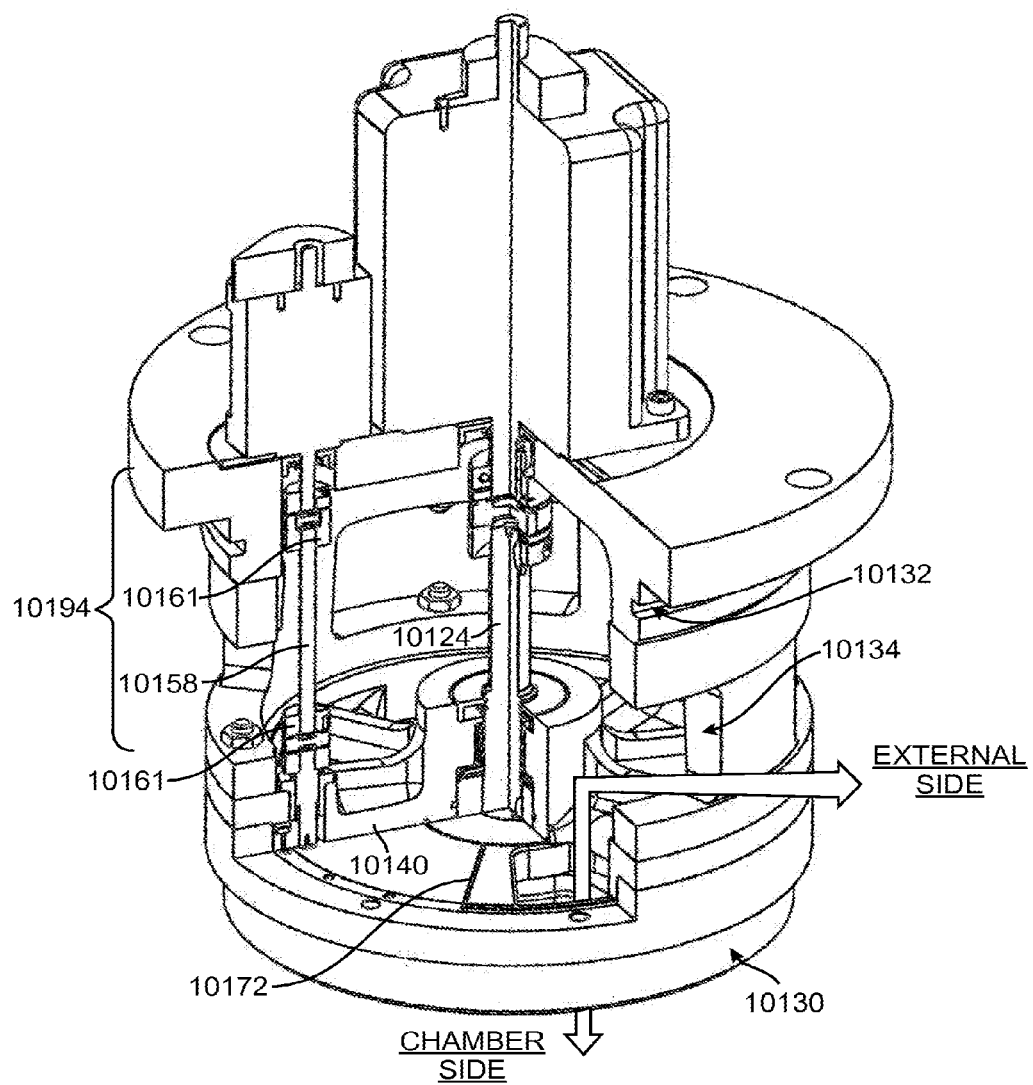

FIG. 10C shows one particular embodiment of a valve unit as assembled and installed, including the inner cover 10140 and the upper housing 10194. In particular, the valve unit fits into a side of a compressor and/or expander cylinder, where it seals at its lower end by a metal to metal seal at location 10130 and at its upper end by an O-ring at location 10132. Gases flow to/from the chamber through ports in the valve, and to/from the external environment through passages 10134 in the side of the valve.

Figure 10D:
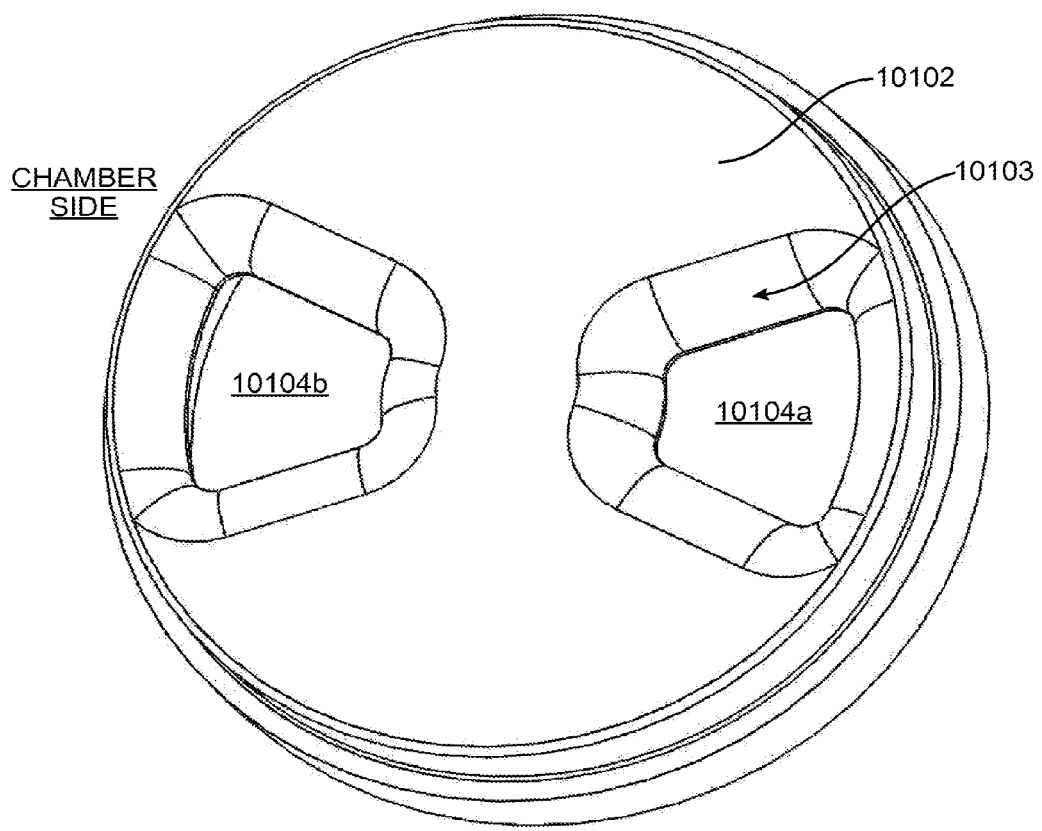
Figure 10E:
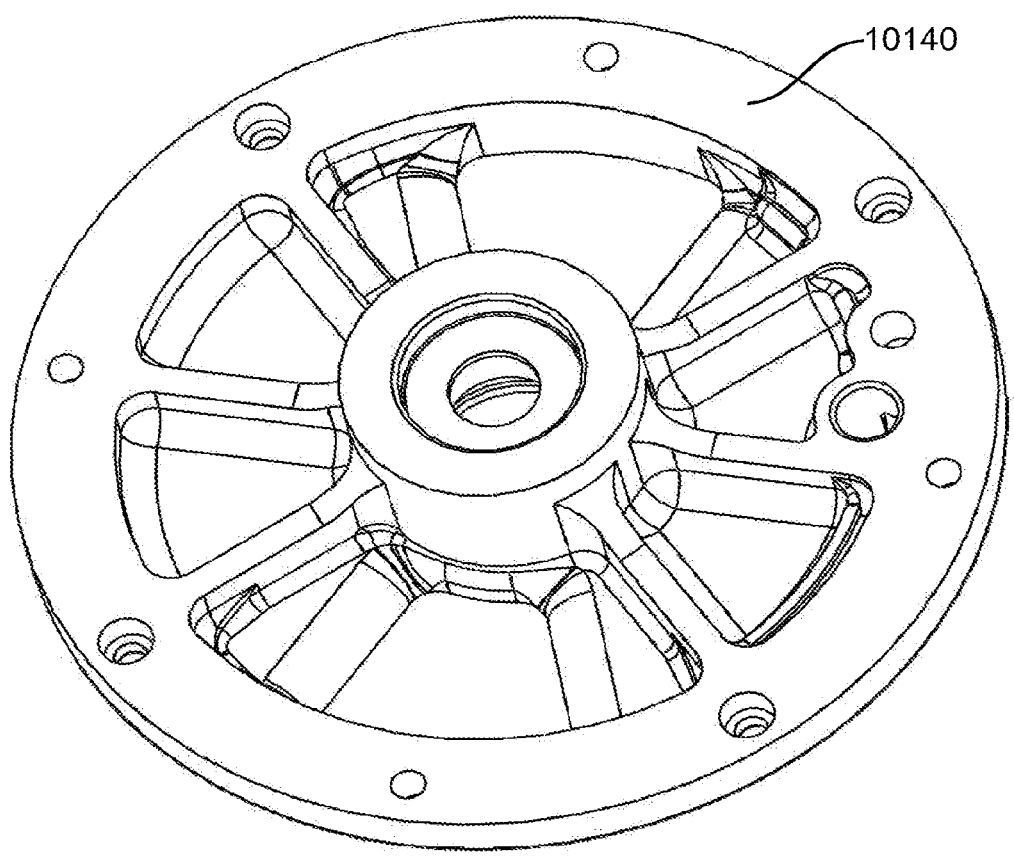

Various elements of the valve may offer streamlined surfaces to flowing gas, thereby avoiding resistance leading to pressure losses. For example, FIG. 10D shows the rear surface 10103 of lower housing 10102 facing the chamber, that is not visible in the view of FIG. 10A. FIG. 10E shows inner cover 10140 offering a streamlined profile to the valve's external side.

During operation, stepper motor 10122 receives a synchronizing signal from within the chamber. In one embodiment, this synchronizing signal is from a pulse generator driven off of a linkage (such as a crankshaft) that is in communication with the moveable element (such as a solid piston) present within the gas expansion and/or compression cylinder.

The stepper motor 10122 may drive the valve at half compressor speed. Such a configuration allows the ports 10104*a*, 10104*b* and respective openings 10112*a*, 10112*b* to comprise pairs of 45 degree wide openings, that are located 180 degrees apart. This desirably results in a balanced rotating mass for the valve plate.

Because the port width is 45 degrees and the aperture width is also 45 degrees, the total duration from open to close of the valve is 90 degrees. Since the valve is rotating at half compressor speed, the valve is open for 180 degrees of compressor rotation or one half a crankshaft revolution.

The stepper motor 10122 may be fitted with an encoder and with an electronic index marker. This allows accurate synchronization of the stepper motor with the compressor. The electronic index maker is aligned with a known position of the valve opening such that it can be electronically compared with the piston position.

The use of a stepper motor to control rotational movement of the valve plate, may offer several potential benefits. One such benefit is the ability to shift the relationship of the valve to the compressor, at any time. In particular, the stepper motor can be controlled to allow timing of the valve to be advanced or retarded.

Another possible benefit is the ability to vary the pulse rate driving the stepper motor. For example, varying the pulse rate of the stepper motor within one revolution may allow the valve to open more quickly and/or to remain fully open for a longer time.

Specifically, a stepper motor allows the rotational speed to be changed within a single rotation. Thus the valve can be opened more quickly, allowed to stay fully open for a longer period, and then sped up to close within the prescribed period.

Under certain circumstances, a high degree of control over the state of openness of the valve may need to be exercised. In order to provide such an ability to further adjust the flow of gases through the valve, the embodiment of FIGS. 10A-H also includes a fixed aperture 10160 that is rotatably supported upon lower housing 10102 by bearing 10121.

The fixed aperture 10160 defines cutouts 10162a, 10162b whose size, location, and shape correspond with those of ports 10104a, 10104b and openings 10112a, 10112b. The cutouts 10162a, 10162b are also designed to accommodate the raised edges 10106 of the lower housing 1002. In particular, these raised edges 1006 serve to block off gas flow from getting around the front edge of the fixed aperture so that as the trailing edge is moved to shorten the duration of the valve opening, the gases are denied a "short-circuit" path at the front edge.

Figure 10F:
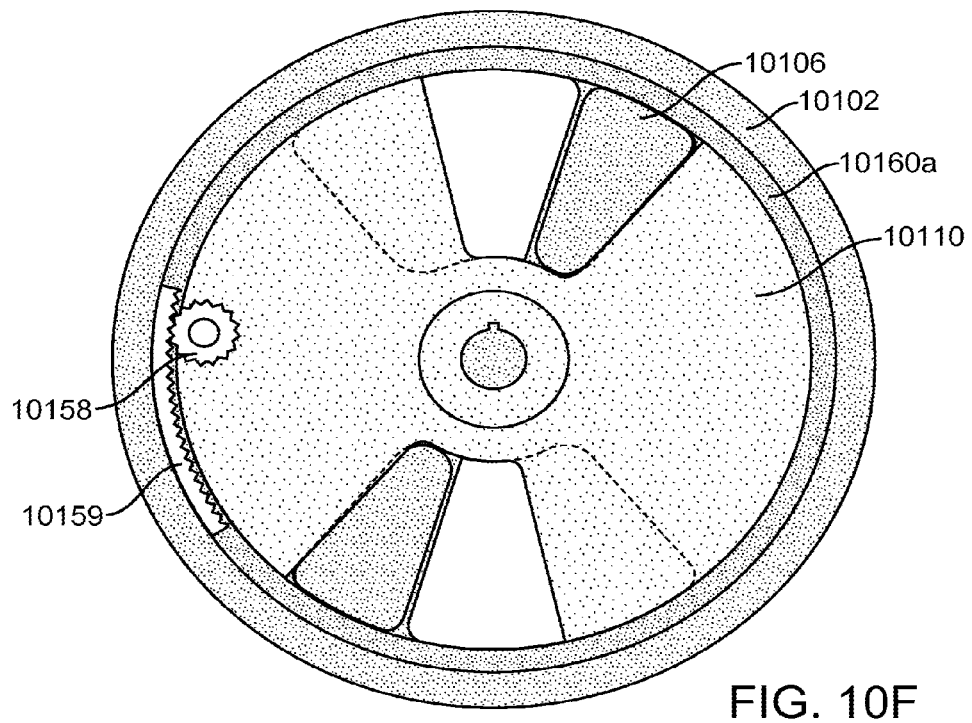
Figure 10G:
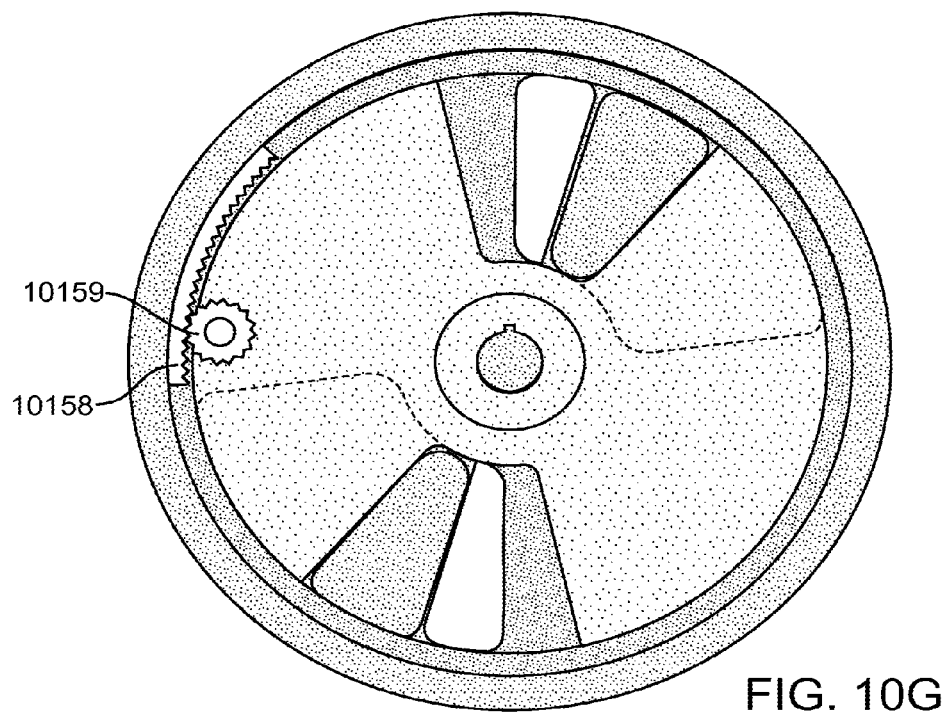

FIGS. 10F and 10G show the valve with the fixed aperture in different positions. In FIG. 10F the fixed aperture is rotated such that the alignment of the cutouts of the valve plate with the ports in the housing, result in the valve being fully open. In this position the front edge of the cut-out is aligned with the raised edge of the raised feature, thereby blocking any short-circuit gas flow path.

In FIG. 10G the fixed aperture is rotated such that the alignment of the cutouts of the valve plate with the ports in the housing, result in the valve being only partially open. In this manner, rotation of the fixed aperture in either direction can be used to effectively control an amount of openness of the valve. In this position the front edge of the cut-out remains aligned with the raised edge of the raised feature in order to prevent a short-circuit gas flow path.

The position of the fixed aperture is adjusted by a second stepper motor 10156 which drives a pinion shaft 10158 through flexible couplings 10161. The pinion in turn drives an internal gear segment 10159 that is attached to a raised perimeter 10160a of the fixed aperture.

Figure 10H:
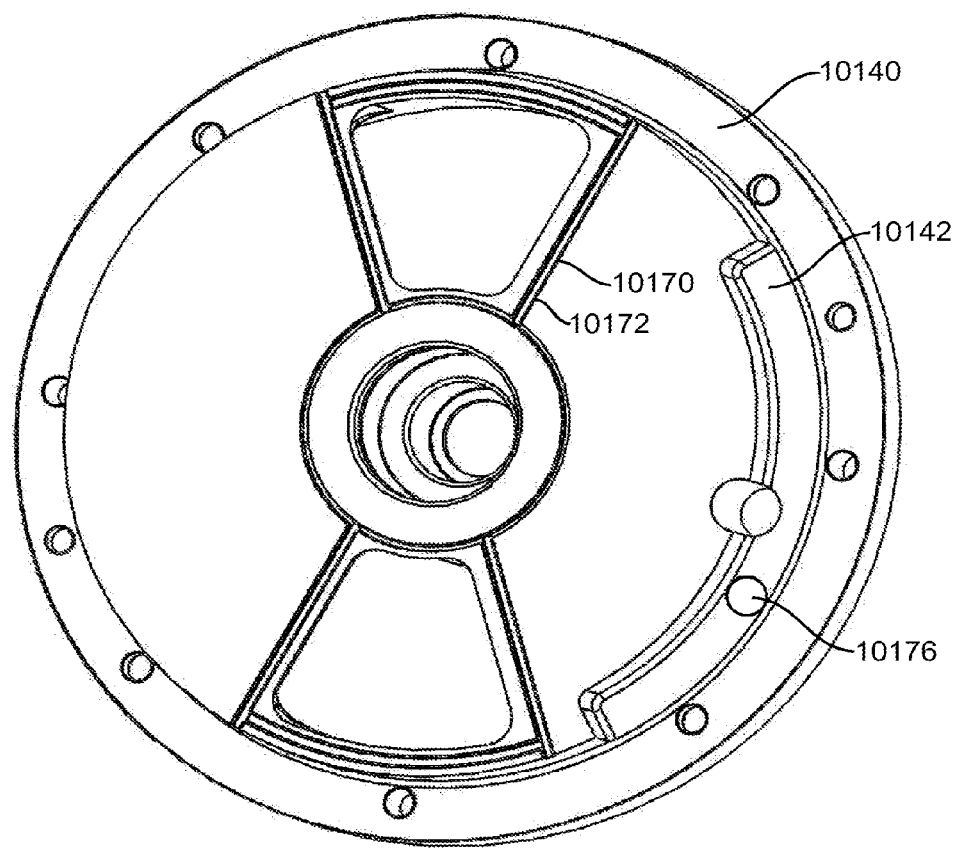

In particular, the outer diameter D of the fixed aperture is larger than the diameter D' of the valve plate. The raised profile of the perimeter 10160a makes room for the gear segment 10159. FIG. 10H shows a perspective view of the underside of the inner cover 10140 showing recess 10142 where the gear segment engages the pinion shaft.

In this particular embodiment, a substantial gear reduction allowed the second stepper motor driving the fixed aperture to be made smaller. This gear reduction also enhances accuracy of positioning of the fixed aperture.

The start position of the fixed aperture can be verified by a small magnet (not shown in FIG. 10H) attached to the gear segment (also not shown in FIG. 10H). This magnet is read by a Hall effect sensor 10176.

A seal may be present around the perimeter of the fixed aperture, in order to help prevent the leakage of gases.

During operation, the different sides (chamber, external) of the valve will typically experience substantially different pressures. Such differential pressures acting on the exposed surface of the valve, can give rise to friction.

Friction may be reduced in a number of ways. For example, the rotating element (valve plate and/or fixed aperture) can be made fairly thick and thus stiff in bending. Bearings having a low coefficient of friction (such as axial needle thrust bearings) can then be used to support the rotating element near its center of rotation.

Since the friction is acting at the smallest possible radius, the resulting torque to be overcome may be kept minimal. The size of the stepper motors and power draws can thus be minimized.

In the particular embodiment shown, a first needle thrust bearing 10121 is present between the fixed aperture and the lower housing, and a second needle thrust bearing 10120 is present between the fixed aperture and the valve plate. Another needle thrust bearing is present between the valve plate and the cover. Seals may retrain light grease on all the bearings.

The presence of pressure differentials across the valve may also create the possibility of unwanted gas leakage. Such leakage can be inhibited in a number of ways.

For example, leakage can be reduced by maintaining small clearances between the valve components. Leakage can also be reduced by making leak path distances as long as possible. The raised edges in the lower housing also serve to restrain leakage, as does a seal around the edge of the fixed aperture.

Gas leakage can further be inhibited by using fixed seals 10170 mounted in dove-tailed grooves 10172 present on the underside of the inner cover 10140, as shown in FIG. 10H. This positioning allowed the seals to seal against the rotating face of the valve plate, thereby blocking a possible escape path for leaking gases to the external environment.

One potential advantage offered by embodiments of valves, is the ability to operate relative to a location of a piston within the chamber. This is in contrast with conventional compressor valve designs, that are configured to open or close based upon a pressure differential. Because the pressure differential experienced by a valve will change depending upon whether the chamber is functioning in compression or expansion, valve embodiments according to the present invention can function in an apparatus suited to both.

Another potential advantage offered by valve embodiments, is the ability to vary valve events relative to piston location. One example of a valve event that can be varied relative to piston location, is the duration of valve opening.

An instance where the duration of valve opening may desirably be changed, is early closure to admit for expansion an amount of gas that is less than a full volume of the chamber, thereby controlling an amount of power output. Another instance of changing the duration of valve opening, is early closure to exhaust less than the full volume of gas expanded in the chamber, thereby reducing a pressure differential encountered by gas being inlet for the next expansion cycle.

Still another possible advantage offered by some embodiments, is a reduction in pressure losses. This is achieved by having the gases flow along straight paths through the port openings.

While the above embodiment relates to a valve design utilizing a separate fixed aperture element, this is not required by the present invention. Certain embodiments could employ relative motion between just two pieces.

Moreover, while the above embodiment relates to a valve design having a first plate rotatable relative to a stationary housing, this is also not required. An alternative embodiment of a valve design could comprise two or more elements that are moveable relative to one another.

While the above embodiment features valve elements moveable in a rotational manner by a stepper motor, this is not required by the present invention. According to alternative embodiments, motion could be imparted to valve elements by other than a stepper motor, for example by an air motor, a AC motor, or a DC motor (such as a brushless DC motor), in order to effect opening and closure of the valve.

According to alternative embodiments, the valve(s) could also be operated by gears, belts, or chains off the crankshaft. Variable timing could be accomplished by a hydraulic or pneumatic phase displaceable pulley or gear.

Certain valve embodiments according to the invention could employ vane or scroll-type structures. Rotation of the vanes/scrolls relative to one another could be accomplished with pressurized oil or air, with reversion to the unactuated position accomplished through the use of return springs.

Figure 10I:
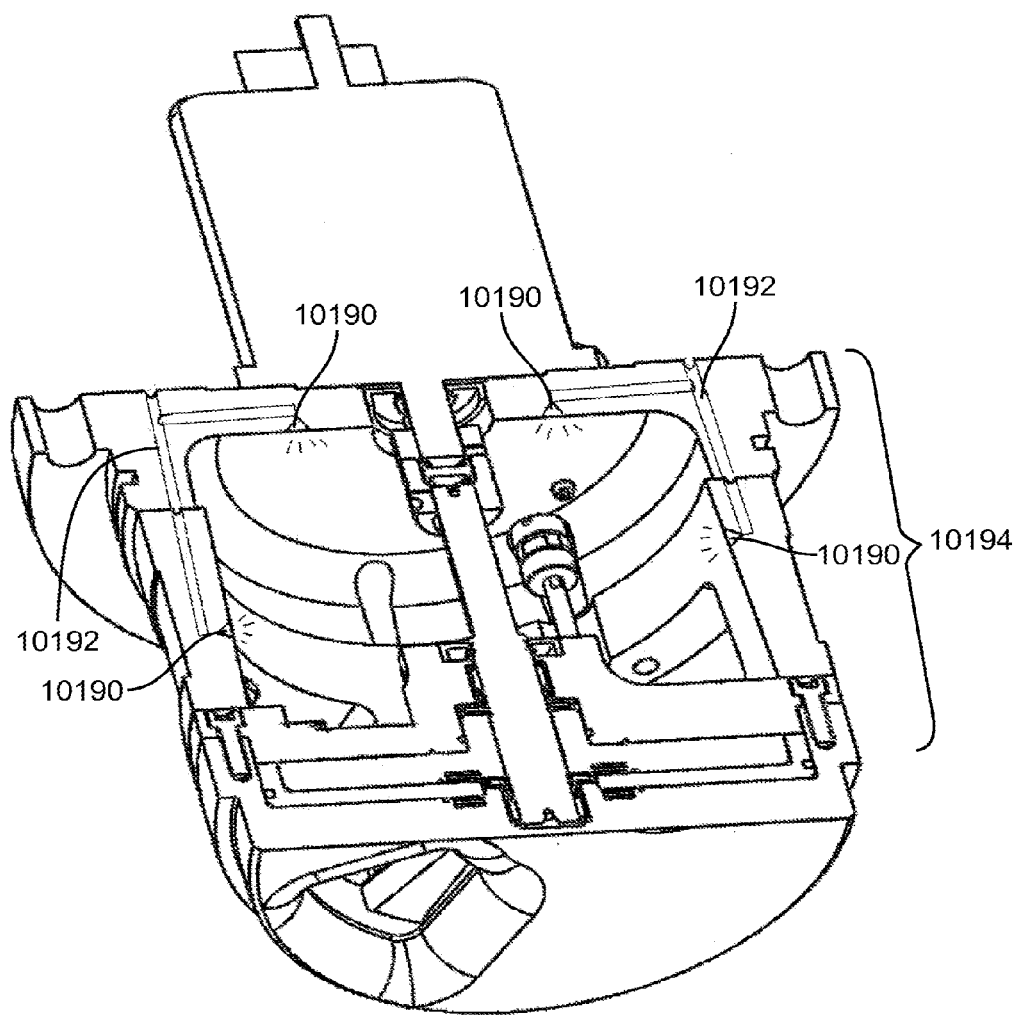
Figure 11A:
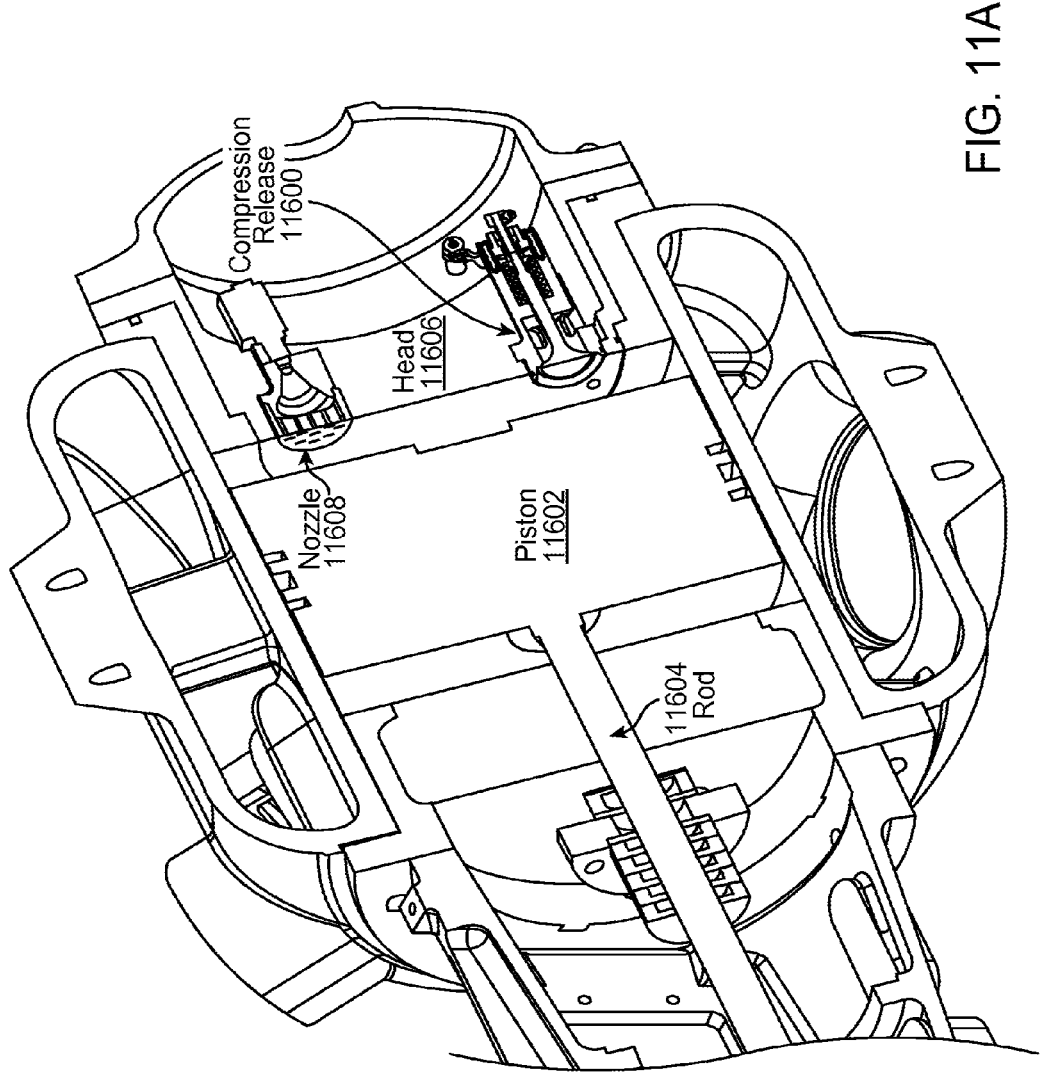
FIGS. 11A-D show views of an embodiment of a compression release mechanism.
Figure 11B:
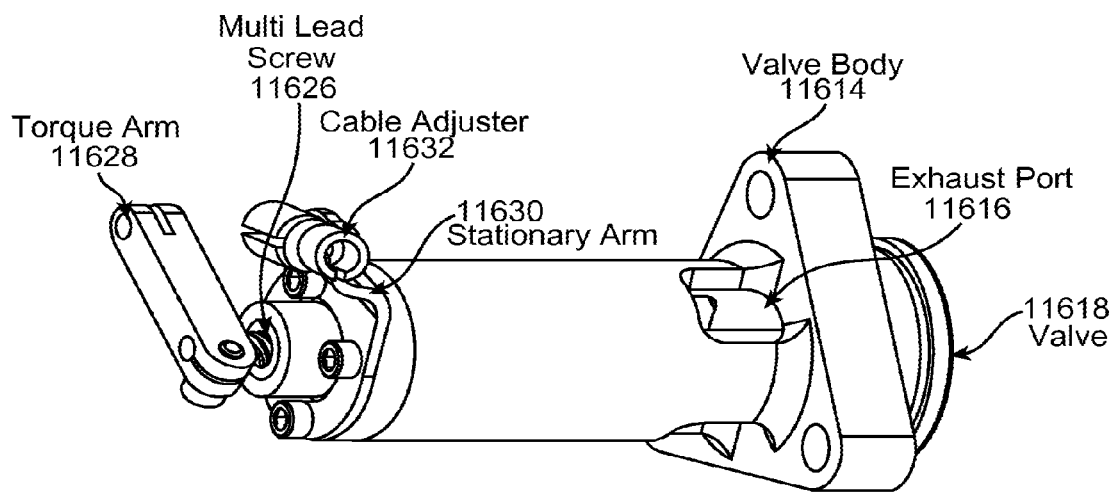
Figure 11C:
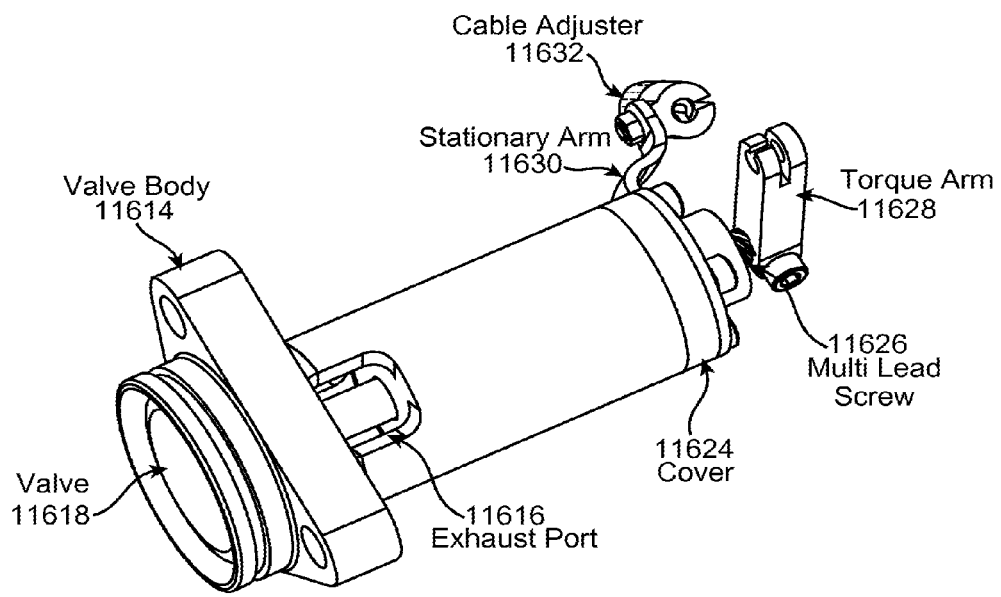
Figure 11D:
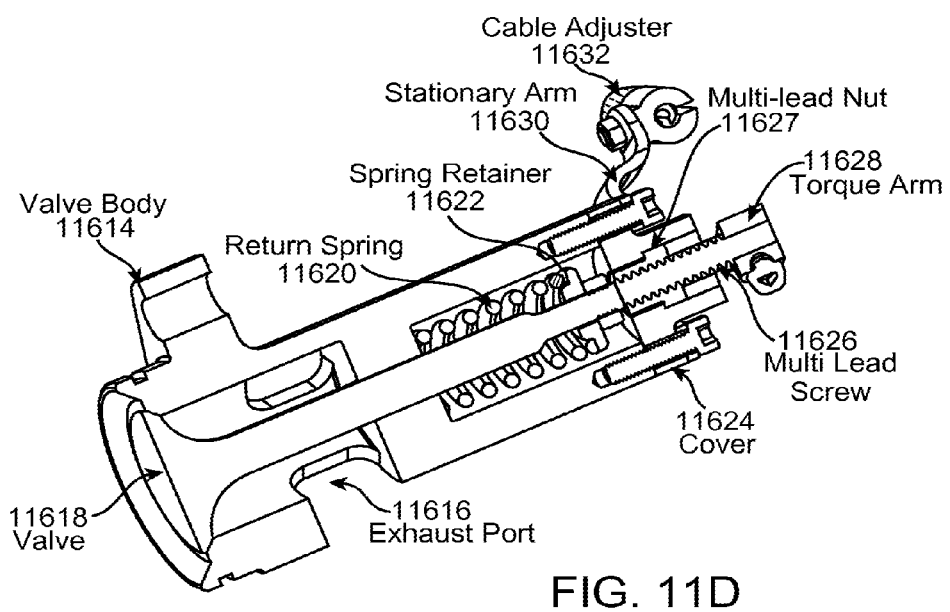

Embodiments of valve structures according to the present invention, could be adapted to receive a flow of liquid for injection into the flowing gas. For example, FIG. 10I shows a perspective view of an embodiment of a valve having nozzles 10190 that are in fluid communication with a fluid source, through passages 10192 present in an upper housing 10194. In certain embodiments the nozzles could be configured for threadable engagement with the housing, in order to facilitate removal, replacement, inspection, and/or maintenance.

1. A valve comprising:
a first plate defining a first opening in a first plane;
a second plate defining a second opening in a second plane parallel to the first plane, the second plate moveable relative to the first plate to align the second opening with the first opening; and
a bearing between the first plate and the second plate.

2. A valve according to claim 1 wherein the second plate is rotatable relative to the first plate.

3. A valve according to claim 2 wherein the bearing comprises a thrust bearing.

4. A valve according to claim 2 further comprising:
a third opening in the second plate and in the second plane, the third opening symmetric to the second opening to balance a mass of the second plate; and
a fourth opening in the first plate and in the first plane, the fourth opening aligned with the third opening when the second opening is aligned with the first opening.

5. A valve according to claim 2 further comprising:
a stepper motor; and
a drive shaft in communication with the stepper motor and with the second plate.

6. A valve according to claim 2 wherein:
the valve is in fluid communication with a cylinder having a piston disposed therein; and
rotation of the second plate is synchronized with movement of the piston.

7. A valve according to claim 6 wherein rotation of the second plate is synchronized based upon a synchronizing signal from a pulse generator driven off of a linkage in communication with the piston.

8. A valve according to claim 7 wherein the linkage comprises a crankshaft.

9. A valve according to claim 6 further comprising:
a stepper motor; and
a drive shaft in communication with the stepper motor to rotate the second plate.

10. A valve according to claim 9 wherein the stepper motor is fitted with an encoder and/or an electronic index marker for synchronization with the piston.

11. A valve according to claim 2 further comprising a nozzle in fluid communication with a liquid source.

12. A valve according to claim 2 further comprising:
a third plate defining a third opening in a third plane, the third plate positioned between the first plate and the second plate, the third plate moveable relative to the first plate to align the third opening with the first and second openings; and
a second bearing between the first plate and the third plate, wherein the bearing is between the third plate and the second plate.

13. A valve according to claim 12 further comprising a gear segment in communication with a motor to rotate the third plate.

14. A method comprising:
providing a first plate defining a first opening in a first plane;
providing a second plate defining a second opening in a second plane;
supporting the first plate on a bearing; and
moving the first plate relative to the second plate to align the first opening with the second opening and allow gas to flow therethrough.

15. A method according to claim 14 wherein the first plate is rotated relative to the second plate to align the first opening with the second opening.

16. A method according to claim 15 wherein the first plate is supported on a thrust bearing.

17. A method according to claim 15 wherein the first plate is rotated in a first direction to align the first opening with the second opening, and then continued to be rotated in the first direction to prevent alignment of the first opening with the second opening.

18. A method according to claim 15 wherein the first plate is rotated by a stepper motor.

19. A method according to claim 18 wherein a timing of pulses of the stepper motor are varied.

20. A method according to claim 15 further comprising:
providing a third plate defining a third opening in a third plane;
supporting the third plate on a second thrust bearing; and
rotating the third plate relative to the second plate to control a quantity of gas flowed through the second opening.

21. A method according to claim 20 wherein the third plate is rotated by a gear

1. An apparatus comprising:
a member disposed within a chamber and moveable in response to gas expansion;
a physical linkage in communication with the member;
a valve selectively actuable to permit a compressed gas to enter the chamber, the valve comprising,
a first plate defining a first opening,
a second plate defining a second opening and moveable relative to the first plate to align the second opening with the first opening, and
a bearing between the first plate and the second plate;
a nozzle configured to spray liquid droplets; and
a gas-liquid separator configured to separate liquid from expanded gas received from the chamber.

2. An apparatus according to claim 1 wherein the nozzle is configured to impart a rotational motion to liquid flowing therethrough.

3. An apparatus according to claim 1 wherein the nozzle is positioned within the chamber.

4. An apparatus according to claim 1 wherein the nozzle is positioned within the valve.

5. An apparatus according to claim 1 further comprising a gas-liquid mixing chamber positioned upstream of the valve.

6. An apparatus according to claim 5 wherein the nozzle is positioned in the gas-liquid mixing chamber.

7. An apparatus according to claim 1 wherein the second plate is rotatable relative to the first plate.

8. An apparatus according to claim 1 wherein the bearing comprises a thrust bearing.

9. An apparatus according to claim 1 further comprising a stepper motor in communication with the second plate.

10. An apparatus according to claim 9 wherein the chamber is in selective fluid communication with the gas-liquid separator through a second valve comprising:
a third plate defining a third opening,
a fourth plate defining a fourth opening and moveable relative to the third plate to align the fourth opening with the third opening, and
a second bearing between the third plate and the fourth plate.

11. An apparatus according to claim 10 further comprising a second stepper motor in communication with the fourth plate.

12. An apparatus according to claim 1 wherein the member comprises a reciprocating piston.

13. An apparatus according to claim 12 wherein the physical linkage is configured to convert reciprocating motion of the piston into shaft torque.

14. An apparatus according to claim 13 wherein the physical linkage comprises a mechanical linkage.

15. An apparatus according to claim 14 wherein the mechanical linkage comprises a crankshaft.

16. An apparatus according to claim 11 wherein the physical linkage comprises a pneumatic/hydraulic linkage.

17. An apparatus according to claim 16 wherein the pneumatic/hydraulic linkage comprises a pneumatic/hydraulic motor.

18. An apparatus according to claim 1 further comprising an electrical generator in communication with the physical linkage.

19. An apparatus according to claim 1 further comprising:
a second member disposed within a second chamber and moveable by the physical linkage to compress gas therein;
a second valve selectively actuable to permit a gas to enter the second chamber, the second valve comprising,
a third plate defining a third opening,
a fourth plate defining a fourth opening and moveable relative to the third plate to align the fourth opening with the third opening, and
a second bearing between the third plate and the fourth plate; and
a second gas-liquid separator configured to separate liquid from compressed gas received from the second chamber.

20. An apparatus according to claim 19 wherein the second member comprises a reciprocating piston, and the physical linkage comprises a crankshaft The fixed aperture feature disclosed in the embodiment of FIG. 10A provides variable valve area, rather than variable valve duration. In certain applications, however, it may be desirable to utilize a valve design exhibiting variable duration as well as variable valve area.

Accordingly, FIGS. 12A-I show various views of an alternative embodiment of a valve design which retains the variable valve area functionality, and also provides for variable valve duration. Operation of a similar valve has been discussed previously in connection with FIGS. 5A-C.

Figure 12A:
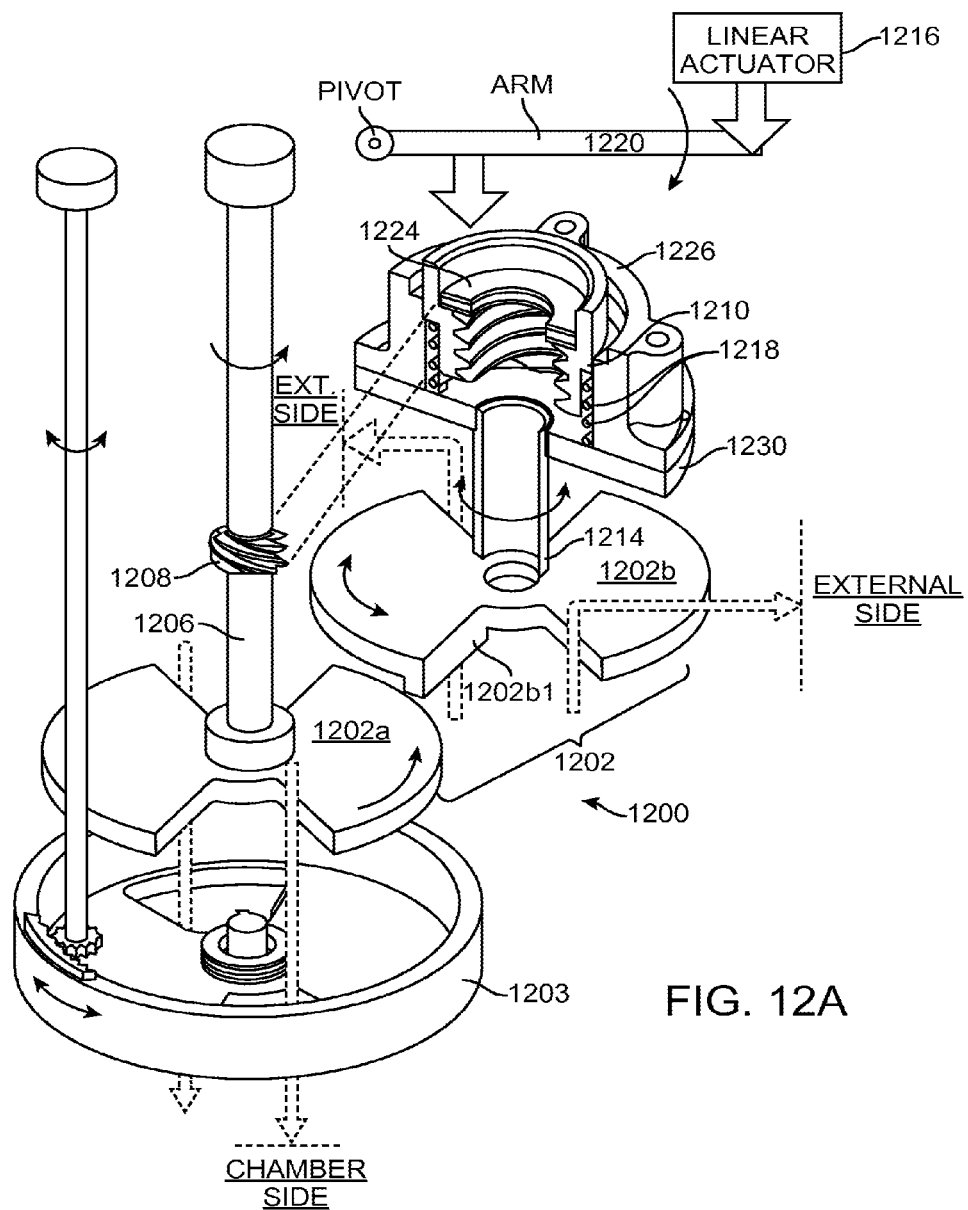
FIGS. 12A-I show various views of an alternative embodiment of a rotary valve.
Figure 12B:
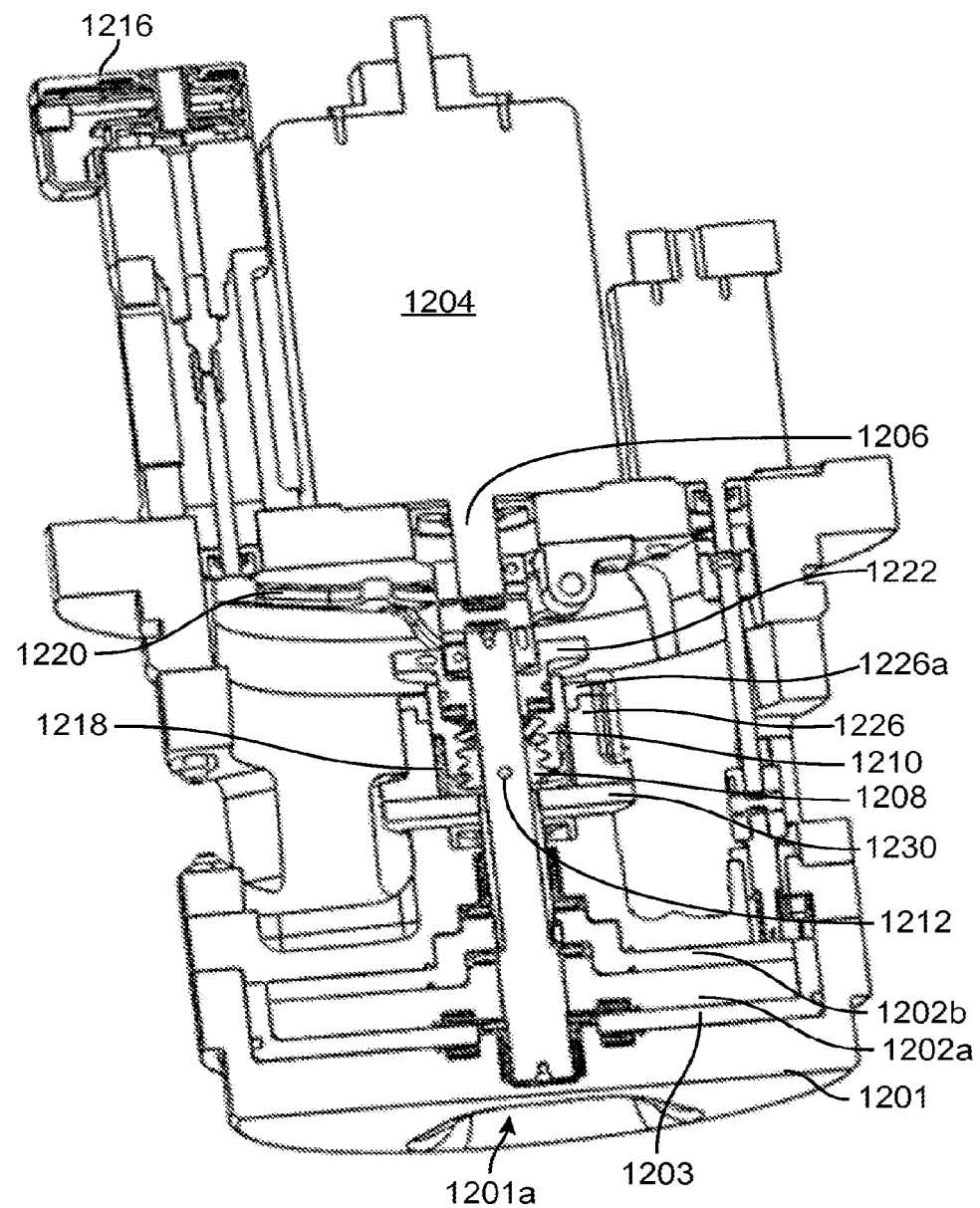
Figure 12C:
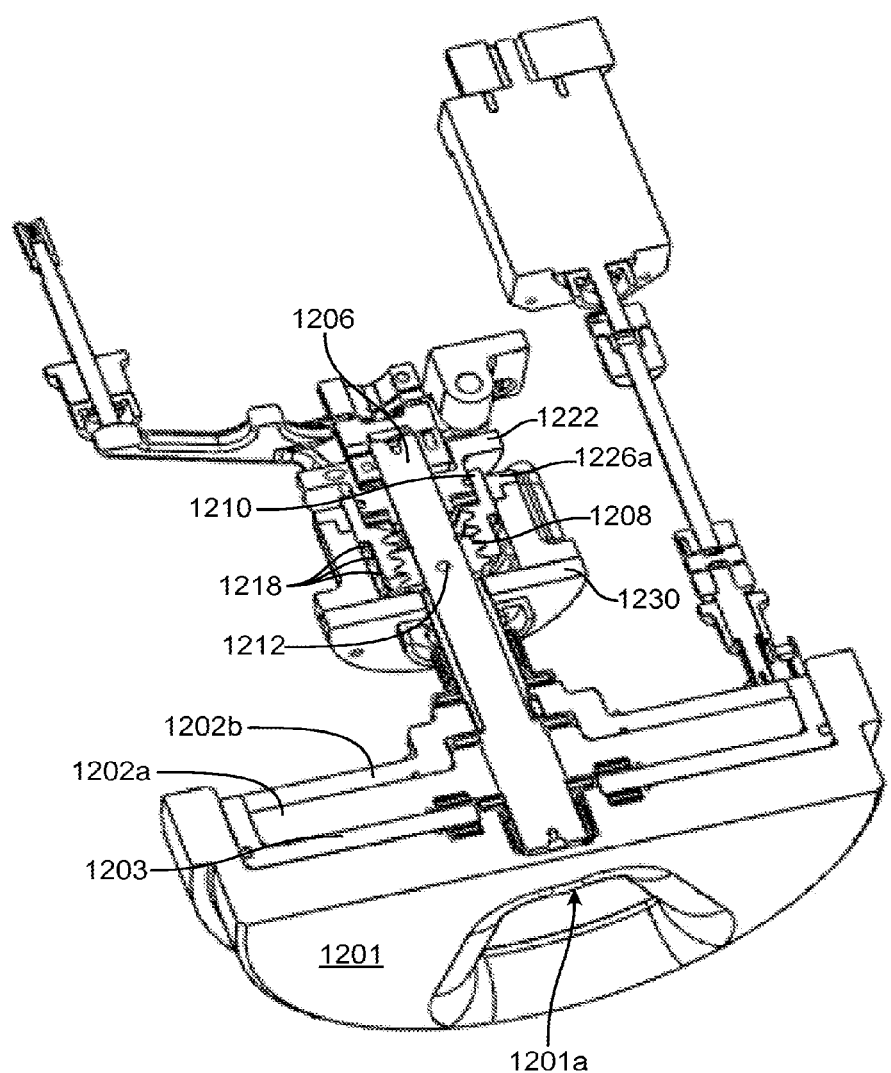
Figure 12D:
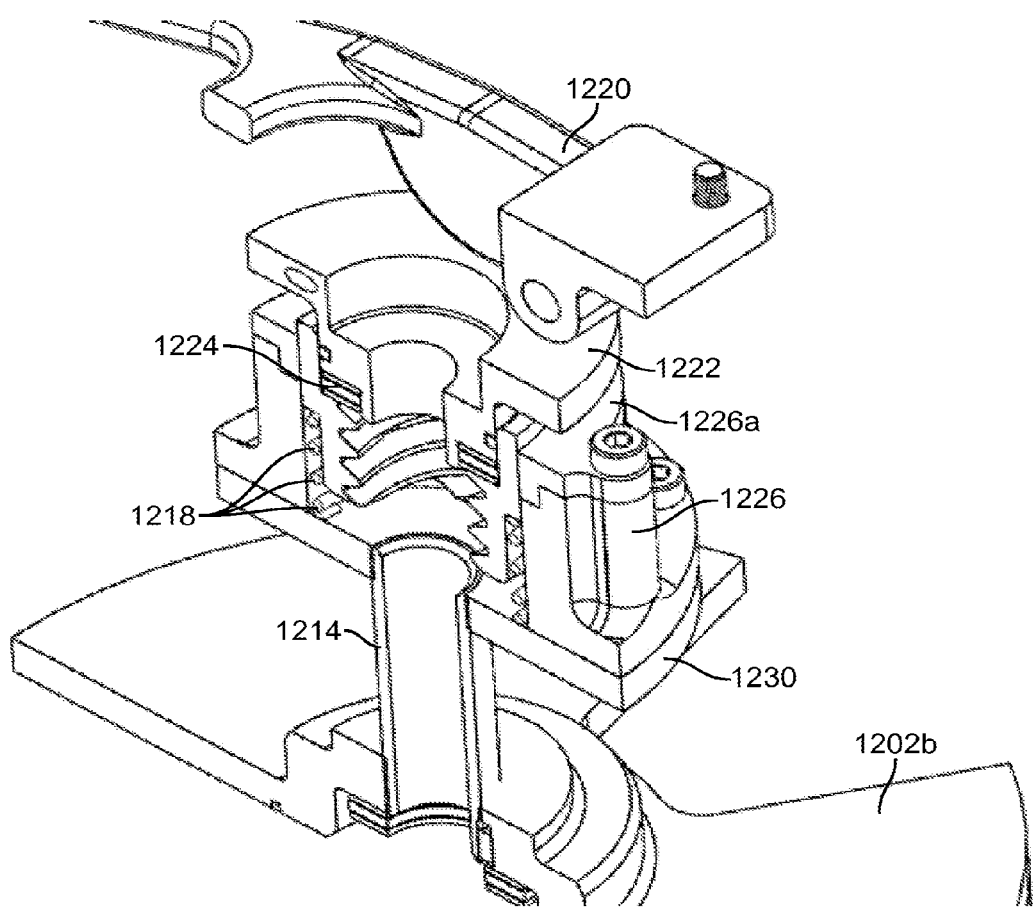
Figure 12E:
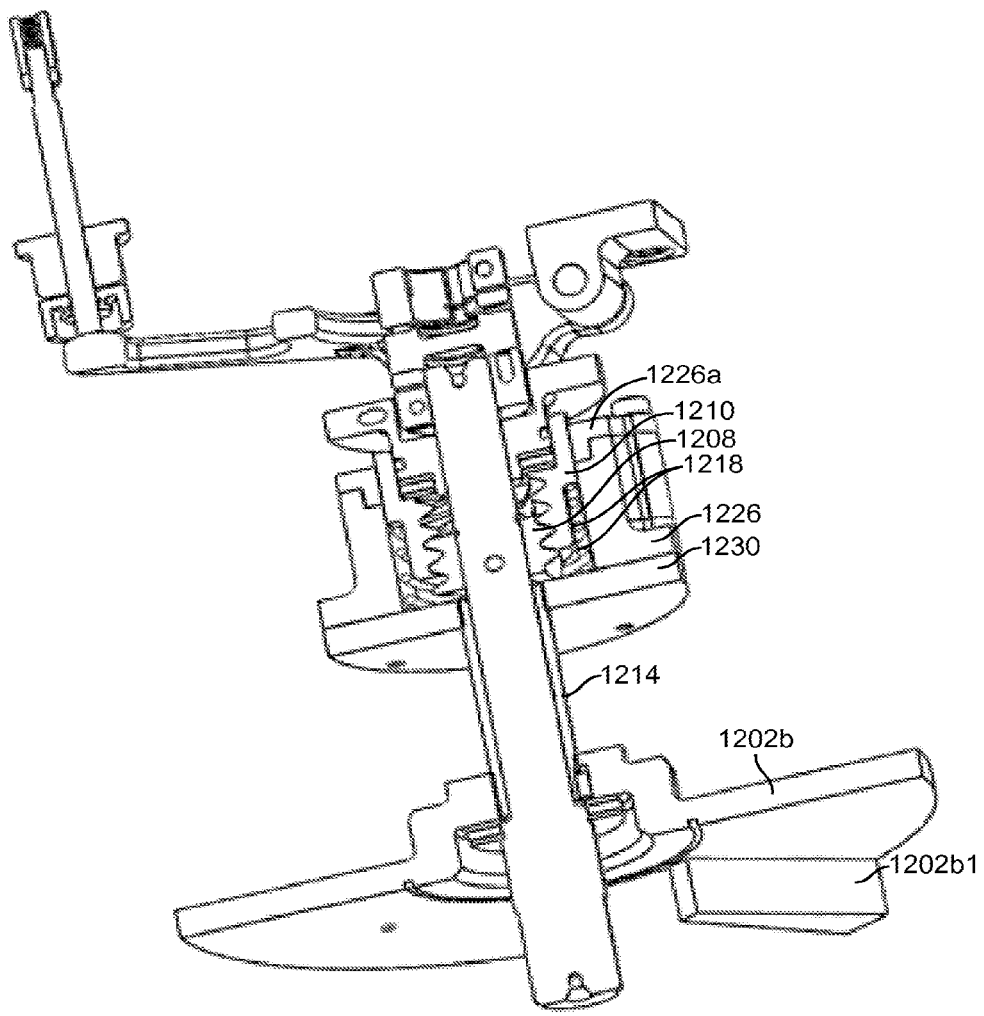
Figure 12F:
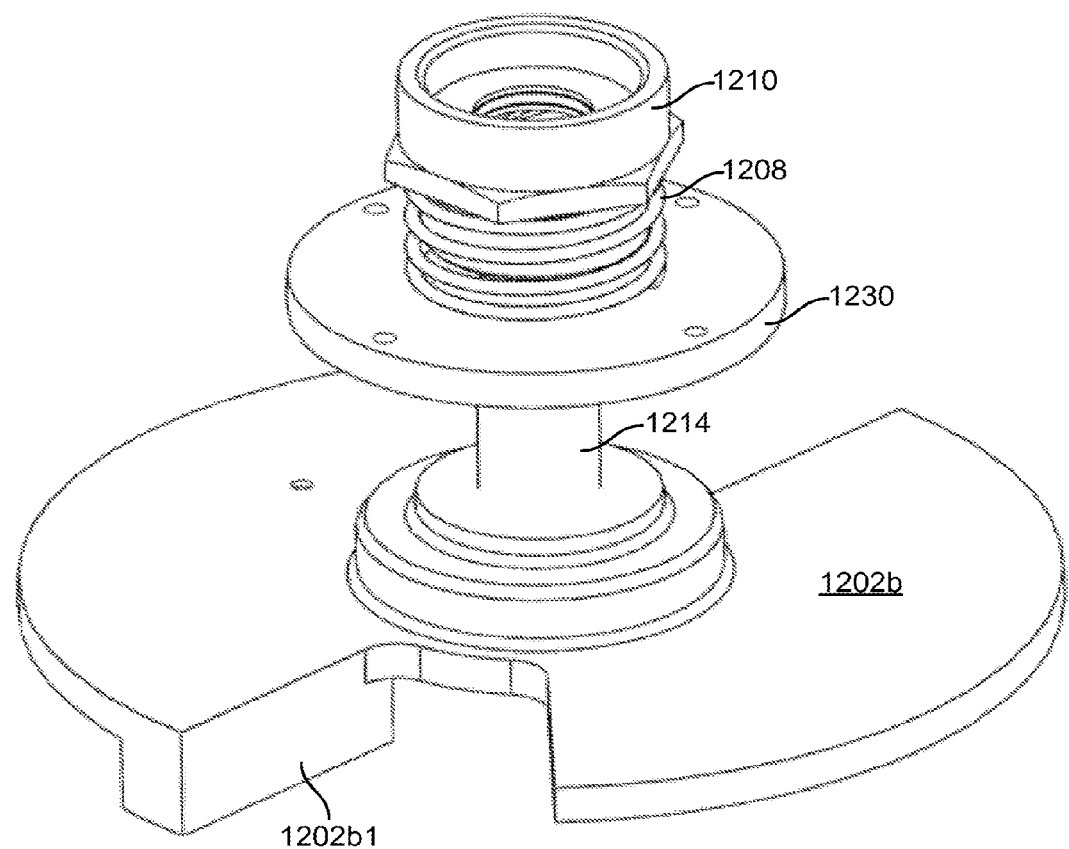
Figure 12G:
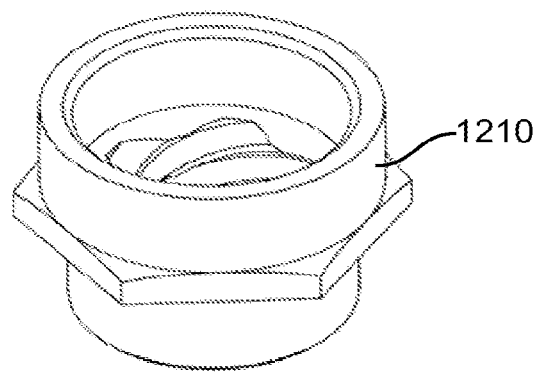
Figure 12H:
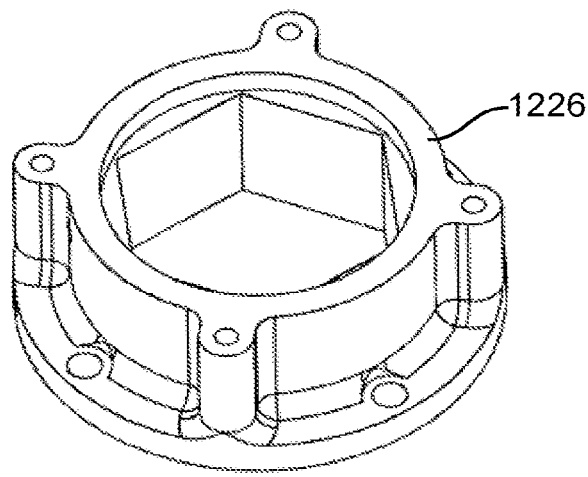
Figure 12I:
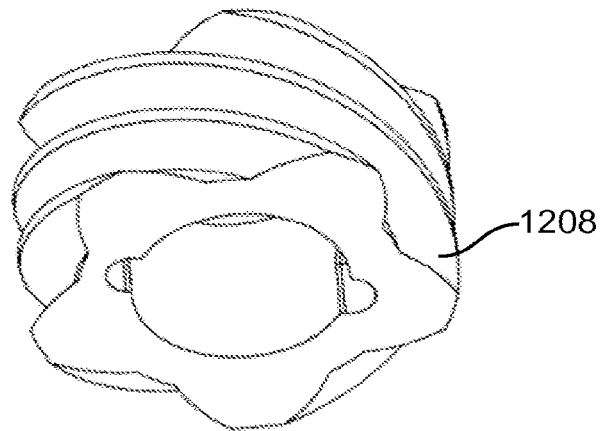

In particular, FIG. 12A shows an exploded view of an alternative embodiment of a valve structure 1200 according to the present invention, which includes a fixed housing 1201 defining ports therein, and a valve plate 1202 and a fixed aperture 1203 that are each rotatable relative to the fixed housing and independent of one another. FIG. 12B shows a cross-sectional view of the fully assembled valve.

In order to provide true variable valve opening duration, the embodiment of FIGS. 12A-I features a moving aperture 1209 that functions to change the width of the opening in the valve plate 1202. Since the plate 1202 is being constantly rotated by the stepper motor 1204, a controllable mechanism was designed to impart a linear motion along the axis of the valve drive shaft 1206, that could be converted into rotational motion in order to control the width of the valve opening.

This rotational motion was then used to move the moving aperture 1209 relative to the valve plate 1202 in an accurately controlled manner. This allowed the effective width of the valve opening to be varied over a range of approximately 45 degrees.

In the embodiment of FIGS. 12A-I, a multi-start high lead screw 1208 (shown enlarged in FIG. 12I) is used to convert linear motion into rotational motion. Such a multi-start high lead screw has a very high lead angle in the threads, and therefore it is possible to back-drive the screw by pushing on a nut 1210 (shown enlarged in FIG. 12G) in contact therewith.

In the particular embodiment of FIGS. 12A-I, the screw was affixed to the valve drive shaft via a pin 1212. The nut was slideably affixed to a moving aperture 1209 via a hollow shaft 1214 coincident with the drive shaft of the valve plate 1202.

When a linear actuator 1216 used to drive the mechanism is in the retracted position, a spring 1218 having one end supported by a control flange 1230 and the other end acting on the nut, forces the valve to return to the fully open position.

The motion from the linear actuator is imparted onto the sliding nut by use of a lever arm 1220, that both reduces the force required by the actuator and amplifies the motion of the nut so that the actuator positions the nut more accurately. The lever arm acts on a rotating collar 1222 that is isolated from the rotation of the valve by an anti-friction thrust bearing 1224, such that only linear motion is imparted into the nut.

When the linear actuator is extended, the nut is pushed down within a hexagonal guide 1226 (shown enlarged in FIG. 12H), thereby causing the hollow shaft 1214 with the moving aperture 1209 (including projecting portion 1209a), to rotate relative to the valve plate that is attached to the drive shaft. The motion of the hollow shaft and half-valve plate is counter-clockwise due to the left hand thread. This motion also compresses the return spring 1218.

While the embodiment of FIG. 12 shows the fixed aperture as being positioned proximate to the chamber side, this is not required. Alternative embodiments could position the fixed aperture distal from the chamber side, thereby potentially reducing an amount of dead volume attributable to valve structure.

And while the embodiment of FIG. 12 shows the moving aperture as being positioned distal to the chamber side, this is not required. Alternative embodiments could position the moving aperture on the other side of the plate valve, proximate to the chamber side.

While the above valve embodiments have been described in connection with inlet of compressed gas or gas-liquid mixtures to an expansion cylinder, other uses are certainly possible. For example, in certain applications, a valve according to an embodiment of the present invention could be utilized to flow gas from an expansion, compression, or expansion/compression chamber.

Embodiments of the present invention could also include a compression release structure. As described below, such a compression release could allow the crankshaft of the machine to be rotated at low speed with minimum force and pressure loading. Such low speed rotation may be beneficial for one or more prospective uses.

For example, one use for such low speed rotation is to displace any fluids trapped in the cylinder that may have accumulated after extended periods of non-operation. Another use for such low speed rotation is to allow the machine to be slowly rotated so that rotary valves driven by stepper motors can be synchronized with the crankshaft position of the machine. Still another use would be as a safety device, where the compression release valve is operated if certain operating limits have been exceeded.

As described above, rotary valves may allow the same apparatus to be used as a compressor and as an expander (an air motor) in order to drive a generator. In certain embodiments the rotary valves may be driven by stepper motors synchronized with the crankshaft utilizing electronic position indicators.

To achieve synchronization the crank of the compressor may first be rotated slowly. This allows the system to locate the electronic marker on the crankshaft, and adjust the positioning of the stepper motors so that their electronic markers are in the correct relationship.

During this initial operation the timing of the valves relative to the piston may not be correct, and could result in high pressure loads. To avoid this condition, the compression release valves could be opened prior to rotating the crank. Then, once the rotary valves have been properly synchronized with the electronic indicia, compression release valves would be closed.

As shown in FIGS. 11A-D, some embodiments of the compression release 11100 may be located within a head 11106 (shown transparent in FIG. 11A for illustration) of a cylinder containing a double-acting piston 11102 connected to a piston rod 11104. The views presented are simplified for illustration, and thus the piston may in fact be hollow rather than solid.

The compression release may be present in the cylinder head together with liquid spray nozzle(s) 11108. Although not shown in FIG. 11A, the opposite head 11107 of the cylinder could also include a corresponding compression release and liquid spray nozzle(s).

In certain embodiments the compression release is in the form of a poppet type valve comprising a body 11114 with exhaust ports 11116, a valve 11118, return spring 11120, spring retainer 11122, cover 11124, multi-lead screw 11126, multi-lead nut 11127, torque arm 11128, stationary arm 11130, and cable adjuster 11132. In certain embodiments the valve may be unitized so that it can be preassembled prior to installation in the compressor.

The valve is normally held closed by the spring, which is sized to provide a closing force is greater than the suction force of air that might act on the area of the face of the valve. Therefore, the valve will only actuate is when pushed open by the multi-lead screw converting the torque supplied by a control cable acting on the torque arm, into axial force.

The multi-lead screw provides the mechanical advantage of a ramp, but also has a high lead such that it lifts the valve at a rate of one-half inch per turn. Since the lever moves about one-quarter turn, this lifts the valve open one-eighth of an inch.

The cable can be operated by a linear actuator or comparable device. According to certain embodiments a linear actuator could be fitted to act directly on the valve, thereby eliminating the cable.

When the valve is opened the cylinder is in direct communication with the atmospheric pressure, so it can neither build pressure nor pull a vacuum. Gases are exhausted to just outside the cylinder head where drain lines communicate with the outside atmosphere. The exhaust ports could also connect to pipes connected to a vent tank where any water could be reclaimed.

When the compressor first starts to rotate water in the cylinder would be pushed out through the compression release valve, which is located near the bottom of the cylinder. The compression release valve could also be opened while the compressor is running in order to prevent damage (for example where sensors detect malfunctioning valves). This would help prevent adverse high pressure conditions that might result.

Embodiments of gas storage units according to the present invention may be suited to work in conjunction with compressed gas energy systems. Various such energy recovery systems are described in the '683 application.

Figure 8:
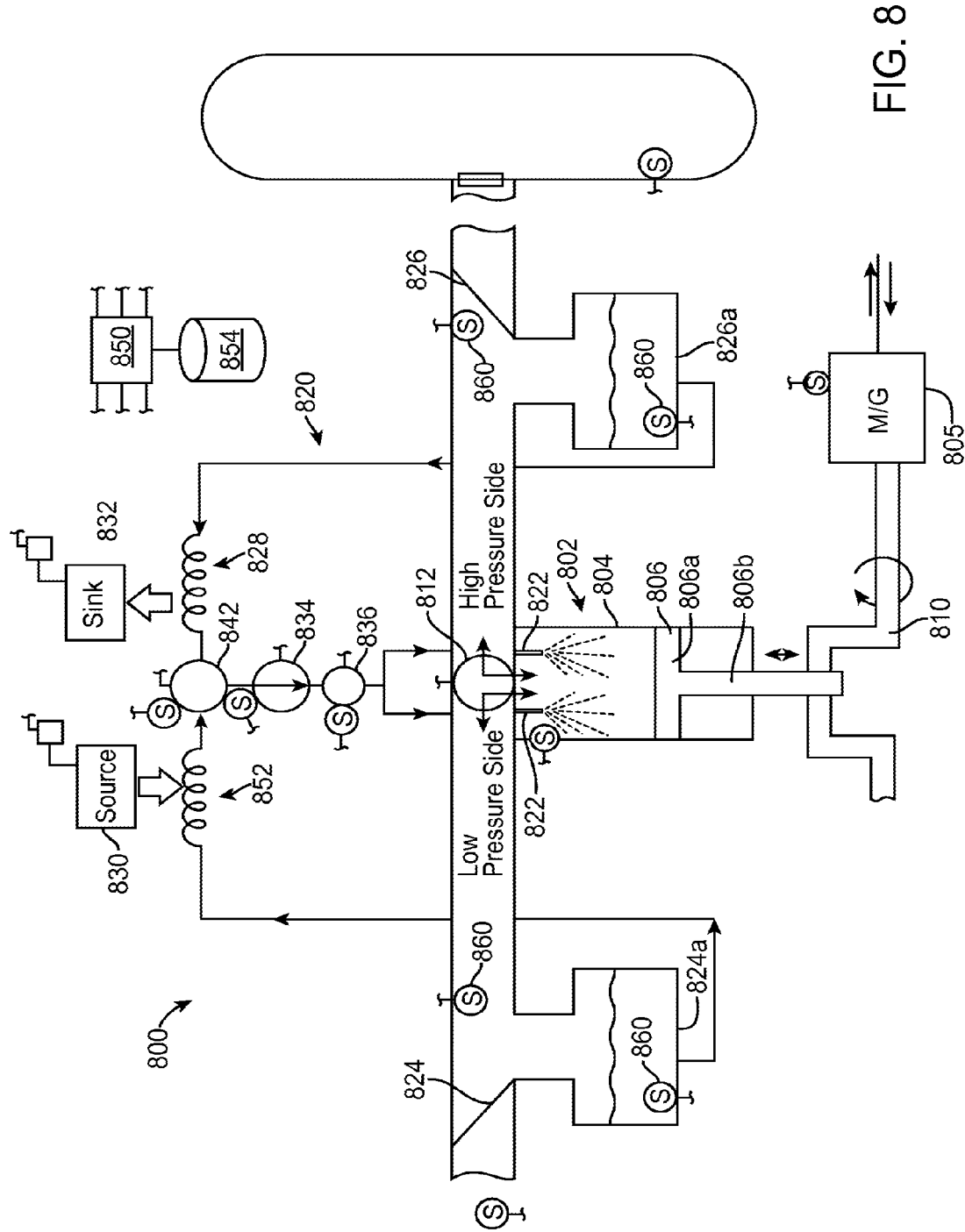
FIG. 8 shows a simplified view of an embodiment of an energy storage system.

FIG. 8 shows a simplified view of one embodiment of such a compressed gas energy system. In particular, the system 800 includes a compressor/expander 802 comprising a cylinder 804 having piston 806 moveably disposed therein. The head 806a of the piston is in communication with a motor/generator 808 through a piston rod 806b and a linkage 810 (here a crankshaft).

In a compression mode of operation, the piston may be driven by the motor/generator 805 acting as a motor to compress gas within the cylinder. The compressed gas may be flowed to a gas storage tank 870, or may be flowed to a successive higher-pressure stage for additional compression.

In an expansion mode of operation, the piston may be moved by expanding gas within the cylinder to drive the motor/generator acting as a generator. The expanded gas may be flowed out of the system, or flowed to a successive lower-pressure stage for additional expansion.

The cylinder is in selective fluid communication with a high pressure side or a low pressure side through valving 812. In this particular embodiment, the valving is depicted as a single multi-way valve. However, the present invention is not limited to such a configuration, and alternatives are possible.

For example, in lieu of a single, multi-way valve, some embodiments of the present invention may include the arrangement of multiple one-way, two-way, or three-way valves in series. Examples of valve types which could be suitable for use in accordance with embodiments of the present invention include, but are not limited to, spool valves, gate valves, cylindrical valves, needle valves, pilot valves, rotary valves, poppet valves (including cam operated poppet valves), hydraulically actuated valves, pneumatically actuated valves, and electrically actuated valves (including voice-coil actuated valves).

When operating in the compression mode, gas from the low pressure side is first flowed into the cylinder, where it is compressed by action of the piston. The compressed gas is then flowed out of the cylinder to the high pressure side.

When operating in the expansion mode, gas from the high pressure side is flowed into the cylinder, where its expansion drives the piston. The expanded gas is subsequently exhausted from the cylinder to the low pressure side.

Embodiments of the present invention utilize heat exchange between liquid and gas that is undergoing compression or expansion, in order to achieve certain thermodynamic efficiencies. Accordingly, the system further includes a liquid flow network 820 that includes pump 834 and valves 836 and 842.

The liquid flow network is configured to inject liquid into the cylinder to perform heat exchange with expanding or compressing gas. In this embodiment, the liquid is introduced through nozzles 822. In other embodiments, a bubbler may be used, with the gas introduced as bubbles through the liquid.

The liquid that has been injected into the cylinder to exchange heat with compressed gas or expanding gas, is later recovered by gas-liquid separators 824 and 826 located on the low- and high-pressure sides respectively. Examples of gas-liquid separator designs include vertical type, horizontal type, and spherical type. Examples of types of such gas-liquid separators include, but are not limited to, cyclone separators, centrifugal separators, gravity separators, and demister separators (utilizing a mesh type coalescer, a vane pack, or another structure).

Liquid that has been separated may be stored in a liquid collector section (824a and 826a respectively). A liquid collector section of a separator may include elements such as inlet diverters including diverter baffles, tangential baffles, centrifugal, elbows, wave breakers, vortex breakers, defoaming plates, stilling wells, and mist extractors.

The collected separated liquid is then thermally conditioned for re-injection. This thermal conditioning may take place utilizing a thermal network. Examples of components of such a thermal network include but are not limited to liquid flow conduits, gas flow conduits, heat pipes, insulated vessels, heat exchangers (including counterflow heat exchangers), loop heat pipes, thermosiphons, heat sources, and heat sinks For example, in an operational mode involving gas compression, the heated liquid collected from gas-liquid separator 826 is flowed through heat exchanger 828 that is in thermal communication with heat sink 832. The heat sink may take one of many forms, including an artificial heat sink in the form of a cooling tower, fan, chiller, or HVAC system, or natural heat sinks in the form of the environment (particularly at high latitudes or altitudes) or depth temperature gradients extant in a natural body of water.

In an operational mode involving gas expansion, the cooled liquid collected from gas-liquid separator 824 is flowed through heat exchanger 852 that is in thermal communication with heat source 830. Again, the heat source may be artificial, in the form of heat generated by industrial processes (including combustion) or other man-made activity (for example as generated by server farms). Alternatively, the heat source may be natural, for example geothermal or solar in nature (including as harnessed by thermal solar systems).

Flows of liquids and/or gases through the system may occur utilizing fluidic and/or pneumatic networks. Examples of elements of fluidic networks include but are not limited to tanks or reservoirs, liquid flow conduits, gas flow conduits, pumps, vents, liquid flow valves, gas flow valves, switches, liquid sprayers, gas spargers, mixers, accumulators, and separators (including gas-liquid separators and liquid-liquid separators), and condensers. Examples of elements of pneumatic networks include but are not limited to pistons, accumulators, gas chambers liquid chambers, gas conduits, liquid conduits, hydraulic motors, hydraulic transformers, and pneumatic motors.

As shown in FIG. 8, the various components of the system are in electronic communication with a central processor 850 that is in communication with non-transitory computer-readable storage medium 854, for example relying upon optical, magnetic, or semiconducting principles. The processor is configured to coordinate operation of the system elements based upon instructions stored as code within medium 854.

The system also includes a plurality of sensors 860 configured to detect various properties within the system, including but not limited to pressure, temperature, volume, humidity, and valve state. Coordinated operation of the system elements by the processor may be based at least in part upon data gathered from these sensors.

The particular system shown in FIG. 8 represents only one embodiment of the present invention, and alternative embodiments having other features are possible. For example, while FIG. 8 shows an embodiment with compression and expansion occurring in the same cylinder, with the moveable element in communication through a linkage with a motor/generator, this is not required.

Figure 9:
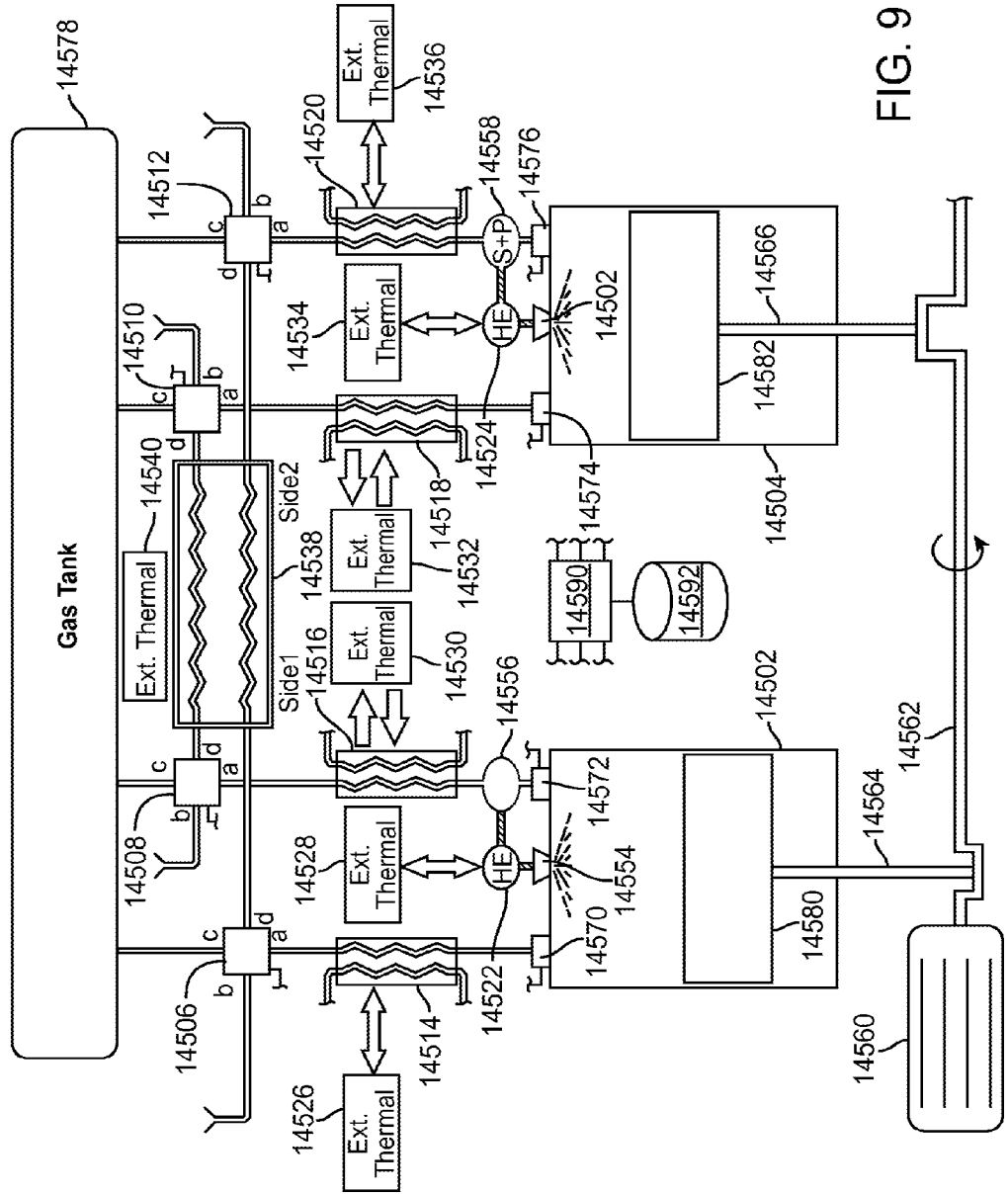
FIG. 9 shows a simplified view of an alternative energy storage system embodiment.

FIG. 9 shows an alternative embodiment utilizing two cylinders, which in certain modes of operation may be separately dedicated for compression and expansion. Embodiments employing such separate cylinders for expansion and compression may, or may not, employ utilize a common linkage (here a mechanical linkage in the form of a crankshaft) with a motor, generator, or motor/generator.

For example, FIG. 9A is a table showing four different basic configurations of the apparatus of FIG. 9. The table of FIG. 9A further indicates the interaction between system elements and various thermal nodes 14625, 14528, 14530, 14532, 14534, 14536, and 14540, in the different configurations. Such thermal nodes can comprise one or more external heat sources, or one or more external heat sinks, as indicated more fully in that table. Examples of such possible such external heat sources include but are not limited to, thermal solar configurations, geothermal phenomena, and proximate heat-emitting industrial processes. Examples of such possible such external heat sinks include but are not limited to, the environment (particularly at high altitudes and/or latitudes), and geothermal phenomena (such as snow or water depth thermal gradients).

Figure 9B:
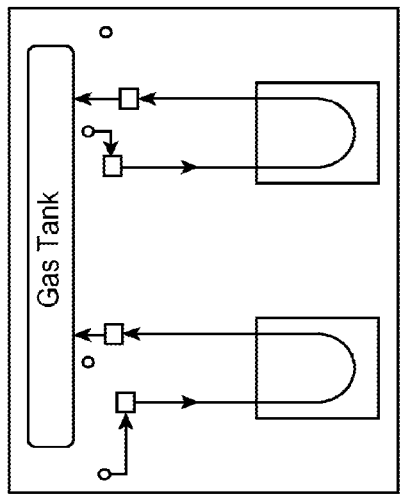
FIGS. 9BA-BF show simplified views of the gas flow paths in various operational modes of the system of FIG. 9.
Figure 9B:
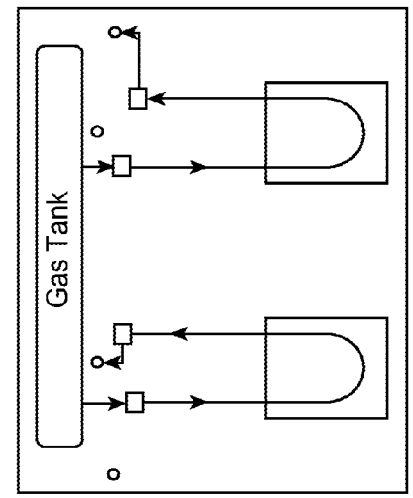
Figure 9B:
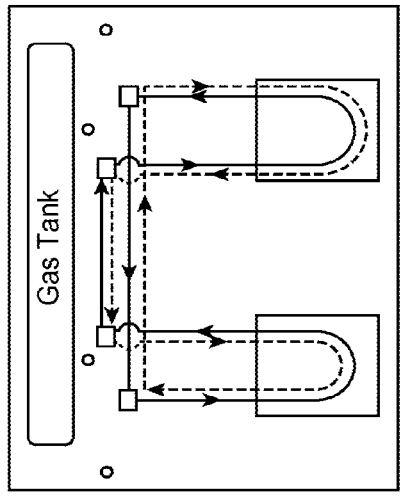
Figure 9B:
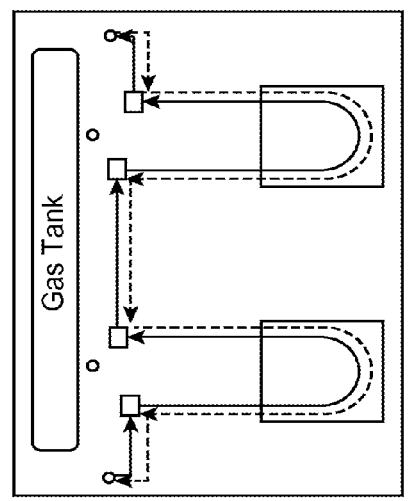
Figure 9B:
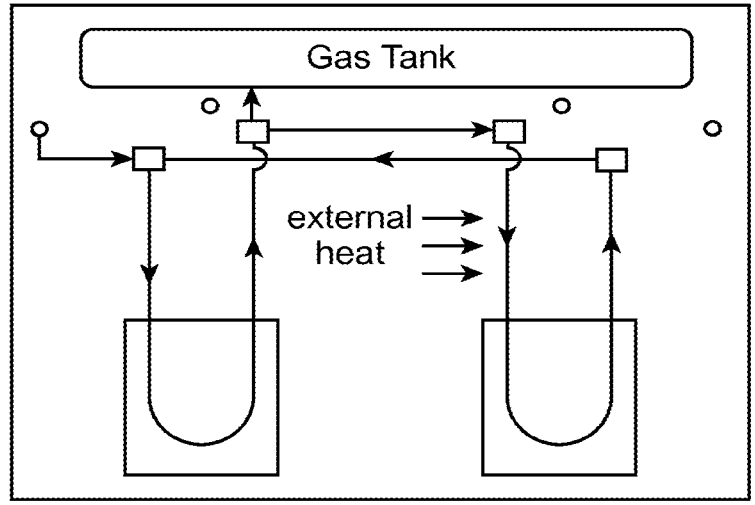
Figure 9B:
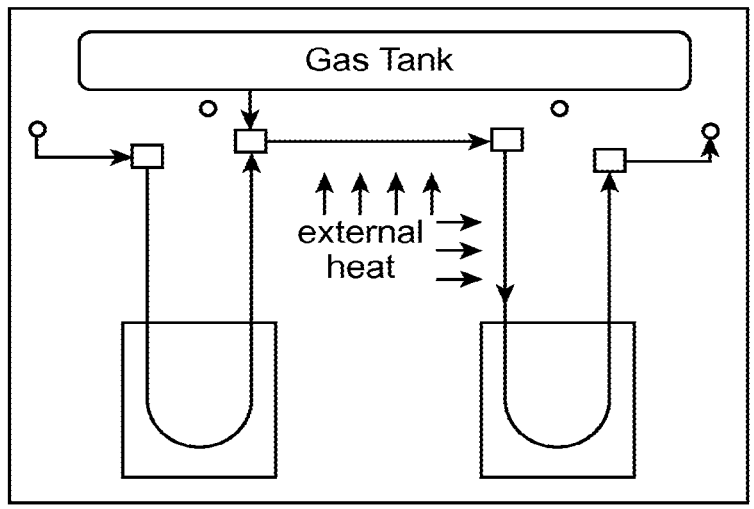

FIGS. 9BA-9BD are simplified views showing the various basic operational modes listed in FIG. 9A. The four different basic modes of operation shown in FIG. 9A may be intermittently switched, and/or combined to achieve desired results. FIGS. 9BE-BF show operational modes comprising combinations of the basic operational modes.

One possible benefit offered by the embodiment of FIG. 9 is the ability to provide cooling or heating on demand. Specifically, the change in temperature experienced by an expanding or compressed gas, or an injected liquid exchanging heat with such an expanding or compressed gas, can be used for temperature control purposes. For example, gas or liquid cooled by expansion could be utilized in an HVAC system. Conversely, the increase in temperature experienced by a compressed gas, or a liquid exchanging heat with a compressed gas, can be used for heating.

By providing separate, dedicated cylinders for gas compression or expansion, embodiments according to FIG. 9 may provide such temperature control on-demand, without reliance upon a previously stored supply of compressed gas. In particular, the embodiment of FIG. 9 allows cooling based upon immediate expansion of gas compressed by the dedicated compressor.

While FIGS. 8-9 show embodiments involving the movement of a solid, single-acting piston, this is not required. Alternative embodiments could utilize other forms of moveable elements. Examples of such moveable elements include but are not limited to double-acting solid pistons, liquid pistons, flexible diaphragms, screws, turbines, quasi-turbines, multi-lobe blowers, gerotors, vane compressors, scroll compressors, and centrifugal/axial compressors.

Moreover, embodiments may communicate with a motor, generator, or motor/generator, through other than mechanical linkages. Examples of alternative linkages which may be used include but are not limited to, hydraulic/pneumatic linkages, magnetic linkages, electric linkages, and electromagnetic linkages.

While the particular embodiments of FIGS. 8-9 show a solid piston in communication with a motor generator through a mechanical linkage in the form of a crankshaft, this is not required. Alternative embodiments could utilize other forms of mechanical linkages, including but not limited to gears such as multi-node gearing systems (including planetary gear systems). Examples of mechanical linkages which may be used include shafts such as crankshafts, gears, chains, belts, driver-follower linkages, pivot linkages, Peaucellier-Lipkin linkages, Sarrus linkages, Scott Russel linkages, Chebyshev linkages, Hoekins linkages, swashplate or wobble plate linkages, bent axis linkages, Watts linkages, track follower linkages, and cam linkages. Cam linkages may employ cams of different shapes, including but not limited to sinusoidal and other shapes. Various types of mechanical linkages are described in Jones in "Ingenious Mechanisms for Designers and Inventors, Vols. I and II", The Industrial Press (New York 1935), which is incorporated by reference in its entirety herein for all purposes.

Stubborn Poppet Valve

Embodiments relate to fluid flow valves comprising a member (such as a poppet or plate) moveable relative to a stationary seat, where the state of the member may be maintained against countervailing forces with relatively small expenditure of energy. According to one embodiment, a poppet displaced from seating in the valve seat, may be held in position against opposing forces tending to close the valve, until a desired flow of gas through the valve has taken place. The poppet may then be released as desired, such that those opposing forces serve to passively close the valve. The moveable member may be secured in position against the countervailing forces utilizing mechanical, magnetic, electromagnetic, or hydraulic mechanisms. Such valve embodiments may be particularly suited to controlling flows of gases for compression and/or expansion as an energy storage medium.

FIGS. 16A-D are simplified views showing operation of a valve embodiment during a compression cycle in a structure comprising a reciprocating piston housed within a cylinder. These figures show that in compression, the valve embodiment functions entirely passively as a conventional check valve.

Specifically, FIG. 16A shows that during a gas intake step where the piston 1600 is moving toward the Bottom Dead Center (BDC) position, the cylinder 1602 may intake gas through the valve 1604 in communication with the low pressure side 1606. In FIG. 1A the pressure differential between the chamber 1608 and the low pressure side, dispose the poppet 1610 away from its valve seat 1612 such that the valve 1604 is in the open state. By contrast, the pressure differential between the high pressure side 1614 and the chamber 1608, dispose the poppet 1616 into its valve seat 1618, such that the valve 1620 is in the closed state. Also shown are liquid 1650, mechanisms 1652 and 1654, and mechanical linkage 1656 comprising piston rod 1658.

FIG. 16B shows that at the point of the valve reaching BDC, the valve states are passively maintained in their present valve states by the existing pressure differentials between the chamber and the high- and low-pressure sides.

FIG. 16C shows that upon the piston reversing direction and beginning to move toward TDC, the pressure within the chamber rises. Upon the pressure differential between the chamber and the low pressure side exceeding a predetermined cracking pressure ($V_{crack-low}$) of the low pressure side valve 1604, that valve is passively closed.

FIG. 16D shows that as the piston continues to move upward with both valves closed, pressure within the cylinder builds until it exceeds a cracking pressure ($V_{crack-low}$) of the high pressure side valve 1620. At this point, the poppet 1616 is displaced upwardly away from its valve seat 1618 by the pressure differential between the chamber and the high pressure side, thereby passively opening the valve 1620. Compressed gas is then exhausted to the high pressure side, where it may be stored, further compressed, or expanded to perform useful work, depending upon the particular application.

The compression cycle is then repeated as the piston reaches TDC and reverses direction to intake additional gas for compression, as shown in FIG. 1A.

In summary, the valves in the compression cycle shown in FIGS. 16A-D act entirely passively, with their actuation attributable solely to the pressure differentials arising between the chamber and the low- and high-pressure sides. This is desirable insofar as no outside energy other than that responsible for driving the piston, is consumed.

FIGS. 17A-17E now show operation of the valve embodiment of FIGS. 16A-D during a corresponding expansion cycle. These figures show that in expansion, the valve embodiment continues to function in a nearly passive manner. In particular, only a force that holds and maintains a poppet in its existing state against opposing forces, is needed. At no point during the expansion cycle shown below, is energy required to be consumed to actively open a valve against countervailing forces.

Figure 17A:
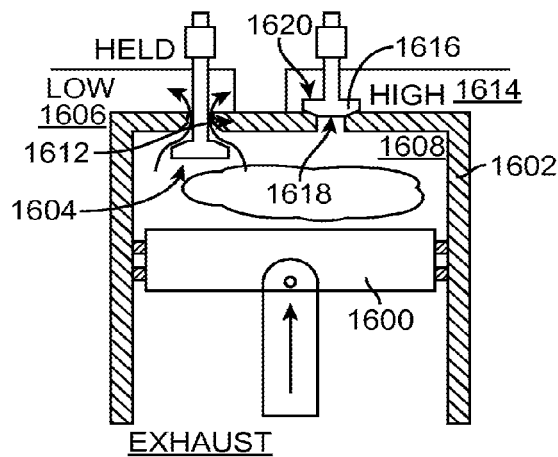
FIGS. 17A-17E show operation of the valve embodiment of FIGS. 16A-D during a corresponding expansion cycle.

FIG. 17A shows the exhaust of gas which has been expanded during a previous (downward) stroke of the piston. In this step, the natural pressure differential extant between the high pressure side 1614 and the chamber 1608 does not exceed $V_{crack-high}$, such that the poppet 116 is biased downward into its corresponding seat 1618, and valve 1620 is in the closed state.

Also in FIG. 17A, the poppet 1610 of the valve 1604 is maintained (held) in a position away from the valve seat 1612. Poppet 1610 had previously assumed this open position, due to a naturally-arising pressure differential between the chamber and the low pressure side exceeding $V_{crack-low}$ during a previous expansion step (see discussion of FIG. 17E below). Maintenance of the valve 1604 in this open state allows the expanded gas to be exhausted from the cylinder.

Figure 17B:
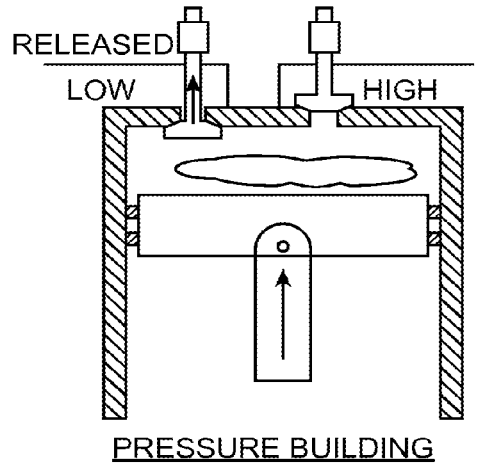

FIG. 17B shows that at some later point as the piston continues to move upward, the poppet 1610 is released from its held position. As the pressure differential extant between the chamber and the low pressure side does not exceed $V_{crack-low}$, the poppet 1610 becomes seated in the valve seat 1612 and the valve 1604 is passively closed.

Because the pressure differential between the chamber and the high pressure side has not yet exceeded $V_{crack-high}$, the valve 1620 remains sealed and pressure builds within the cylinder as the piston continues to move upward.

Figure 17C:
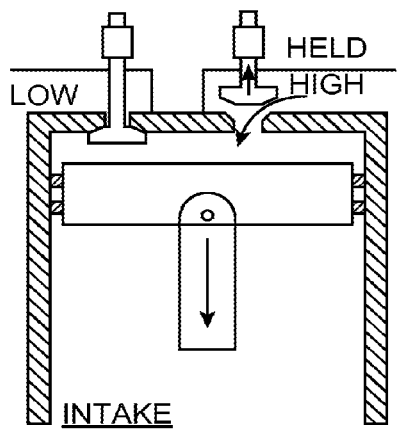

FIG. 17C shows that as the piston approaches and reaches the TDC position, the pressure builds within the chamber such that the pressure differential eventually exceeds $V_{crack-high}$, causing poppet 1616 to move away from the valve seat and valve 1620 to open. This in turn allows gas from the high pressure side to flow into the chamber for expansion. In FIG. 17C, the displaced poppet 1616 is maintained in position away from the valve seat, for example utilizing a mechanical or hydraulic mechanism as is discussed further below.

Figure 17D:
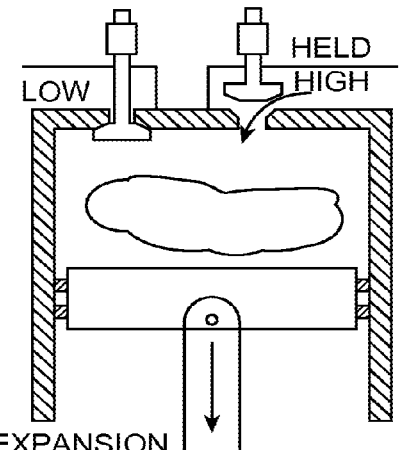

FIG. 17D shows the piston continuing to move downward toward BDC as more gas from the high pressure side enters through valve 1620 (being maintained in the open position) and expands within the chamber. Because the pressure within the chamber has not exceeded the cracking pressure of the low pressure side valve 1604, it remains closed.

Figure 17E:
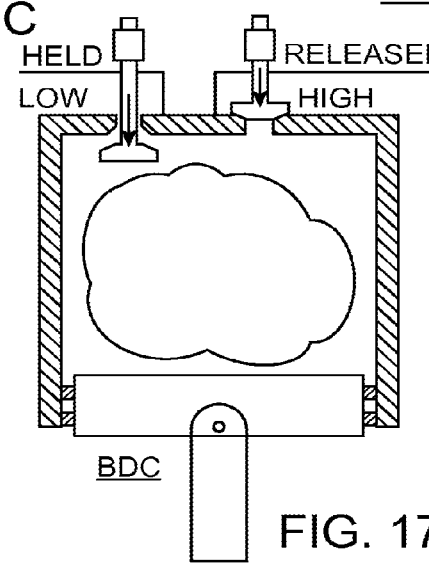

FIG. 17E shows the piston approaching and reaching BDC. The poppet 1616 is released, and the naturally-arising pressure differential between the high pressure side and the low pressure within the chamber closes the valve 1620.

Moreover the drop in pressure due to expansion of gas within the cylinder, causes the pressure differential between the chamber and the low pressure side to exceed $V_{crack-low}$. Accordingly the low pressure side valve 1604 is passively opened and then held in the open position. This allows the chamber to be poised for the exhaust stage previously described in connection with FIG. 17A.

Figure 17F:
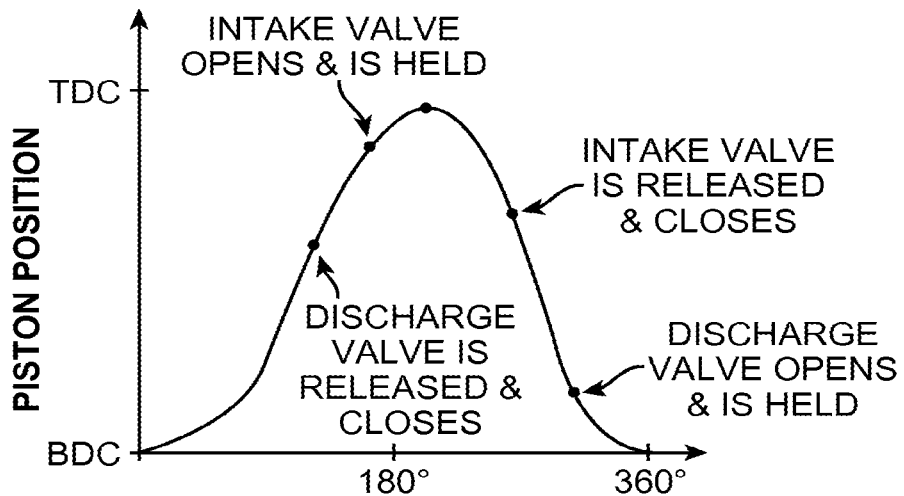
FIG. 17F plots piston position versus crank angle during the expansion cycle shown in FIGS. 17A-E.
Figure 17G:
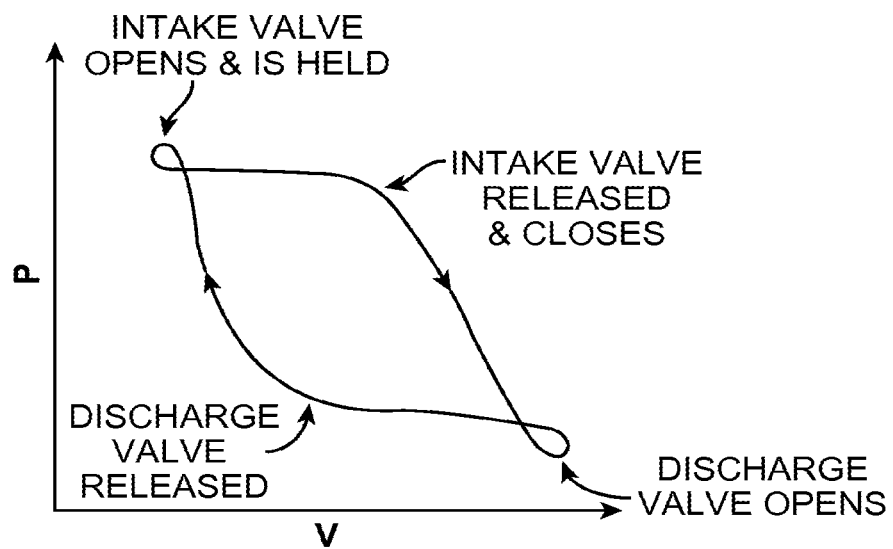
FIG. 17G plots pressure versus volume for the expansion cycle of FIGS. 17A-E.

FIG. 17F plots piston position versus crank angle during the expansion cycle shown in FIGS. 17A-E. FIG. 17G plots pressure versus volume for the expansion cycle of FIGS. 17A-E. In both FIGS. 17F and 17G, the intake valve corresponds to the valve allowing selective fluidic communication between the chamber and the high pressure side. The discharge valve corresponds to the low pressure side valve.

To summarize: the expansion cycle of FIGS. 17A-E utilizes the naturally-occurring pressure differentials in order to achieve valve actuation. Specifically, releasing the moveable member from its held state closes the discharge valve on the low pressure side prior to the piston reaching full TDC. This creates a residual pressure within the chamber that can be leveraged to passively actuate the intake valve on the high pressure side.

Moreover, during the expansion cycle of FIGS. 17A-E, the valves act nearly passively. The only additional energy consumed, is that which is used to maintain them in a state already achieved by passive actuation. As disclosed below, this additional energy can be relatively small, and need not be applied continuously.

Specifically, the force to maintain a valve in its previously-actuated state, may take one of several forms. For example FIGS. 18A-C show simplified schematic views of a valve embodiment which relies upon a mechanism 1801 operating based on mechanical principles to maintain valve state against countervailing forces. In FIG. 18A the valve 1800 is passively actuated to achieve an open state, with the pin 1802 withdrawn from the corresponding opening 1804 in the shaft of the valve poppet. In FIG. 18B, the valve 1800 is secured in the open state by causing pin 1802 to enter and remain within the opening 1804 (for example utilizing a solenoid). In FIG. 18C removal of the pin from the opening, allows the valve 1800 to be passively closed by the countervailing force.

FIGS. 19A-C show a simplified schematic view of an alternative embodiment of a valve, which relies upon a mechanism 1901 operating based on hydraulic principles to maintain valve state against countervailing forces. In FIG. 19A the valve 1900 is passively actuated to achieve an open state, with the secondary valve 1902 open to allow flow of displaced fluid. In FIG. 19B, the valve 1900 is secured in the open state by closing secondary valve 1902, thereby preventing fluid flow. In FIG. 19C, opening of the secondary valve 1902 permits fluid flow and releases the poppet, allowing the valve 1900 to be closed passively by the countervailing force.

Neither of the embodiments of FIG. 18A-C or 19A-C require the continuous application of force in order to hold the valves in their open state. Instead, the force is applied momentarily to either to hold or release the valve. This reduces energy consumed by valve actuation.

Valve operation may be controlled based upon signals received from a central processor in communication with a computer-readable storage medium. Executable code present in such a storage medium may instruct the processor to control a timing of valve closure and/or opening, for example by determining a time of release of a held moveable member such as a poppet/plate.

While the above embodiments have described the use of mechanisms operating based upon mechanical or hydraulic principles to hold the valve in a previously-attained state, this is not required. Alternative embodiments could employ mechanisms operating according to other principles, including but not limited to magnetic, electrostatic, or pneumatic principles.

And while the above embodiments have described valves in which the moveable portion is capable of being held in the open state, this is also not required. Alternative valve embodiments could be configured to be held in the closed state against countervailing forces that would otherwise cause the valve to be open.

Moreover, while the above example has related to valves having a poppet moveable relative to a valve seat, this is also not required. Alternative embodiments could employ other structures, such as a moveable plate. Still other types of moveable elements for valves include but are not limited to sleeves, needles, and balls.

Furthermore, while the above embodiments have described valves for use with a reversible compressor/expander comprising a solid piston reciprocating within a cylinder, this is also not required. Embodiments of valves could be employed with other types of structures, including but not limited to those employing rotating members enclosed within walls, for example screws, turbines, quasi-turbines, gerotors, vane compressors/expanders, scroll compressors/expanders, and liquid ring compressors/expanders.

1. An apparatus comprising:
   a valve comprising a member moveable between a first state to engage a seat and block a flow of fluid therethrough, and a second state to disengage from the seat and allow the flow of fluid; and
   a mechanism selectively configurable to maintain the state of the member against a countervailing force exceeding a valve actuation force.

2. An apparatus as in claim 1 wherein the mechanism is configured to maintain the member in the second state.

3. An apparatus as in claim 1 wherein the mechanism is configured to maintain the member in the first state.

4. An apparatus as in claim 1 wherein the actuation force comprises a pressure differential.

5. An apparatus as in claim 4 wherein the fluid flow comprises a gas flow.

6. An apparatus as in claim 1 wherein the member comprises a poppet.

7. An apparatus as in claim 1 wherein the member comprises a plate.

8. An apparatus as in claim 1 wherein the mechanism operates according to mechanical principles.

9. An apparatus as in claim 1 wherein the mechanism operates according to hydraulic or pneumatic principles.

10. An apparatus as in claim 1 wherein the mechanism operates according to magnetic principles.

11. An apparatus as in claim 1 wherein the seat is positioned between a compressed gas storage unit and a chamber.

12. An apparatus as in claim 11 wherein the chamber is defined by a piston within a cylinder.

13. An apparatus as in claim 11 wherein the chamber is defined by a rotating element enclosed within walls.

14. An apparatus as in claim 11 further comprising:
a second valve comprising a second member moveable between a first state to engage a second seat and block a flow of fluid therethrough, and a second state to disengage from the second seat and allow the flow of fluid; and
a second mechanism selectively configurable to maintain the state of the second member against a second countervailing force exceeding a second valve actuation force, wherein the second seat is positioned between the chamber and a low pressure side.

15. An apparatus as in claim 14 wherein the second mechanism is configured to maintain the second member in the second state.

16. An apparatus as in claim 14 wherein the second mechanism is configured to maintain the second member in the first state.

17. A method comprising:
providing a chamber in selective fluid communication with a compressed gas storage unit through an intake valve comprising a member selectively moveable to disengage from a seat;
creating a residual pressure within the chamber to passively actuate the member to disengage from the seat;
maintaining the member disengaged from the seat while compressed gas from the compressed gas storage unit enters the chamber; and
causing the mechanism to release the member such that the member becomes engaged with the seat, while the compressed gas expands within the chamber in an absence of combustion.

18. A method as in claim 17 further comprising providing a discharge valve allowing selective communication between the chamber and a low pressure side, wherein creating the residual pressure comprises closing the discharge valve while the compressed gas expands within the chamber.

19. A method as in claim 18 wherein:
the discharge valve comprises a second member selectively moveable to engage a second seat; and
closing the discharge valve comprises causing a second mechanism to release the second member such that the second member becomes engaged with the second seat.

20. A method as in claim 17 wherein the chamber is defined by a piston within a cylinder.

21. A method as in claim 17 wherein the chamber is defined by a rotating element enclosed within walls.

22. A method as in claim 17 wherein the member comprises a poppet.

23. A method as in claim 17 wherein the member comprises a plate.

24. A method as in claim 17 wherein the mechanism operates based upon mechanical principles.

25. A method as in claim 17 wherein the mechanism operates based upon hydraulic or pneumatic principles.

26. A method as in claim 17 wherein the mechanism operates based upon magnetic principles.

Valve embodiments as described herein may be particularly suited to controlling flows of gas within systems employing compressed gas as a storage medium as described in the '223 Publication. However such valves may be employed in other applications calling for the control of fluid flows. Moreover embodiments are not limited to use in conjunction with gases, and alternatively may be used to control flows of other types of fluids, for example liquids.

Figure 20:
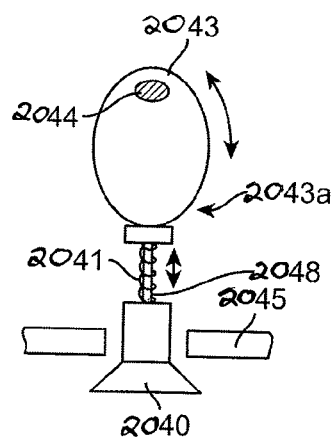
FIG. 20 is a simplified schematic view of a cam-based valve design which may be used in accordance with certain embodiments.

Embodiments of valves for use in accordance with the present invention may be designed to exhibit specific time profiles of opening and/or closing. For example, FIG. 20 shows one possible embodiment wherein valve plate 2040 is actuated relative to valve plate 2045 through shaft 2048, by contact between a cam follower 2042 and a surface 2043a of cam 2043 as the cam rotates about shaft 2044. The cam follower is held in contact with the cam surface by spring 2041. In this embodiment, the particular shape of the cam, and the corresponding orientation of its surfaces relative to the cam follower, can be designed to determine the time profile of the actuation of the valve, in the closing and opening directions. Valve timing may be varied by providing a mechanism to vary the angle or effective profile of the cam.

What is claimed is:

1. A method comprising:
providing a chamber in selective fluid communication with a high pressure side through a first valve comprising a first poppet selectively moveable to disengage from a first seat, wherein the high pressure side is in fluid communication with a compressed gas storage unit;
securing the first poppet disengaged from the first seat against a first countervailing force utilizing a first mechanism;
actively controlling the first mechanism to release the first poppet to engage the first seat while a volume of compressed gas from the high pressure side expands in an absence of combustion within the first expansion chamber to exchange heat with a liquid;
a mechanical linkage comprising a piston rod communicating out of the chamber, a power of the compressed gas expanding against a piston; and
generating from the mechanical linkage an electrical output to meet a load, wherein the first mechanism is actively controlled to maintain the electrical output at a fixed frequency while the load and a gas pressure of the compressed gas storage unit are changing.

2. A method as in claim 1 wherein the mechanical linkage further comprises a crankshaft.

3. A method as in claim 1 wherein the first mechanism is configured to operate based on hydraulic principles.

4. A method as in claim 1 wherein the first mechanism is configured to operate based on mechanical principles.

5. A method as in claim 4 wherein the first mechanism comprises a pin.

6. A method as in claim 4 wherein the first valve comprises a cam-operated poppet valve.

7. A method as in claim 6 wherein a timing of the first valve is controlled by varying an effective cam profile.

8. A method as in claim 6 wherein the first valve further comprises a spring.

9. A method as in claim 1 wherein the chamber comprises one stage of a multi-stage apparatus, and a low pressure side is in fluid communication with another stage.

10. A method as in claim 1 wherein the controlling references a variable frequency oscillator (VFO).

11. A method as in claim 1 wherein the controlling is according to a phase lock loop (PLL).

12. A method as in claim 1 further comprising:
providing the chamber in selective fluid communication with a low pressure side comprising another stage through a second valve comprising a second poppet selectively moveable to disengage from a second seat;
securing the second poppet disengaged from the second seat against a second countervailing force utilizing a second mechanism; and
controlling the second mechanism to release the second poppet to engage with the second seat and retain expanded gas within the chamber.

13. A method as in claim 12 wherein the second mechanism is configured to operate based on hydraulic principles.

14. A method as in claim 12 wherein the second mechanism is configured to operate based on mechanical principles.

15. A method as in claim 14 wherein the second mechanism comprises a pin.

16. A method as in claim 14 wherein the second valve comprises a cam-operated poppet valve.

17. A method as in claim 16 wherein a timing of the second valve is controlled by varying an effective cam profile.

18. A method as in claim 16 wherein the second valve further comprises a spring.

* * * * *